(12) United States Patent
Tsuruta

(10) Patent No.: US 7,903,885 B2
(45) Date of Patent: Mar. 8, 2011

(54) DATA CONVERTING APPARATUS AND METHOD

(75) Inventor: Hideyo Tsuruta, Katano (JP)

(73) Assignee: Panasonic Corporation, Osaka (JP)

( * ) Notice: Subject to any disclaimer, the term of this patent is extended or adjusted under 35 U.S.C. 154(b) by 1515 days.

(21) Appl. No.: 11/259,132

(22) Filed: Oct. 27, 2005

(65) Prior Publication Data

US 2006/0098730 A1    May 11, 2006

(30) Foreign Application Priority Data

Nov. 11, 2004    (JP) .................................. 2004-328257

(51) Int. Cl.
*G06K 9/46*     (2006.01)
*H04B 1/66*     (2006.01)

(52) U.S. Cl. .......................................... 382/232; 375/240

(58) Field of Classification Search .......... 382/232–233, 382/276; 348/384.1, 388.1; 375/240, 240.01
See application file for complete search history.

(56) References Cited

U.S. PATENT DOCUMENTS

| 5,880,786 | A | 3/1999 | Oku et al. | |
|---|---|---|---|---|
| 7,142,559 | B2 * | 11/2006 | Choi et al. | 370/466 |
| 2002/0186963 | A1 * | 12/2002 | Toyoda et al. | 386/117 |
| 2005/0105895 | A1 * | 5/2005 | Ju | 386/96 |

FOREIGN PATENT DOCUMENTS

| JP | 4-052741 | 2/1992 |
|---|---|---|
| JP | 08-065686 | 3/1996 |
| JP | 09-084005 | 3/1997 |
| JP | 3172950 | 3/2001 |
| JP | 2001-119727 | 4/2001 |

* cited by examiner

*Primary Examiner* — Daniel G Mariam

(74) *Attorney, Agent, or Firm* — Wenderoth, Lnd & Ponack, L.L.P.

(57) ABSTRACT

A data converting apparatus includes a video encode or decode operation unit which decodes a bit stream into a video signal; an IO buffer into which the bit stream transferred from an encoded-video recorder is stored; and a DMAC which controls a process of determining, in accordance with free space of the IO buffer and an OP buffer, either a first path going through a main memory or a second path bypassing the main memory as the transfer path, and having the bit stream, that is stored in the IO buffer, inputted into the video encode or decode operation unit via the determined transfer path.

36 Claims, 39 Drawing Sheets

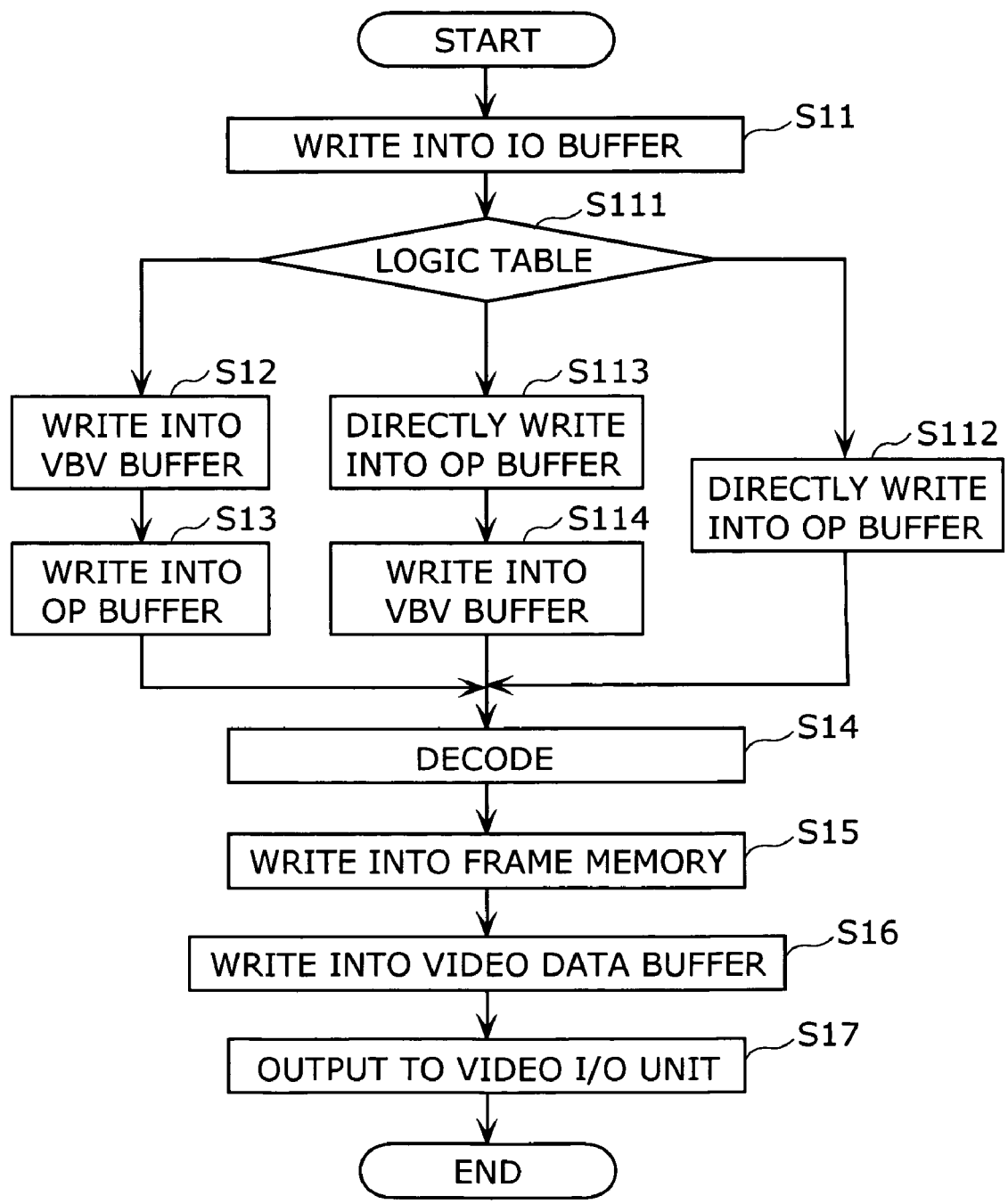

FIG. 5

| STATE | VBVB | OPB | IOB | TRANSFER PATH | POINTER(IOB) | POINTER(VBVB) | POINTER(OPB) |
|---|---|---|---|---|---|---|---|
| D1 | NULL | !FULL | !OW | B/IF→IOB | IO_WP | — | — |
|  |  |  |  | IOB→OPB | IO_RP1,IO_RP2 | — | OP_WP |
|  |  |  |  | OPB→OPERATION UNIT | — | — | OP_RP |
| D2 | NULL | FULL | !OW | B/IF→IOB | IO_WP | — | — |
|  |  |  |  | IOB→VBVB | IO_RP2 | VBV_WP | — |
|  |  |  |  | OPB→OPERATION UNIT | — | — | OP_RP |
|  |  |  |  | VBVB→OPB | IO_RP1 | VBV_RP | OP_WP |
| D3 | !NULL | FULL | !OW | B/IF→IOB | IO_WP | — | — |
|  |  |  |  | IOB→VBVB | IO_RP2 | VBV_WP | — |
|  |  |  |  | OPB→OPERATION UNIT | — | — | OP_RP |
|  |  |  |  | VBVB→OPB | IO_RP1 | VBV_RP | OP_WP |
| D4 | !NULL | !FULL | !OW | B/IF→IOB | IO_WP | — | — |
|  |  |  |  | IOB→OPB | IO_RP2 | — | OP_WP |
|  |  |  |  | IOB→VBVB | IO_RP1 | VBV_WP | — |
|  |  |  |  | OPB→OPERATION UNIT | — | — | OP_RP |
| D5 | !NULL | FULL | OW | B/IF→IOB | IO_WP | — | — |
|  |  |  |  | IOB→VBVB | IO_RP1 | VBV_WP | — |
|  |  |  |  | VBVB→OPB | IO_RP2 | VBV_RP | OP_WP |
|  |  |  |  | OPB→OPERATION UNIT | — | — | OP_RP |
| D6 | !NULL | !FULL | OW | B/IF→IOB | IO_WP | — | — |
|  |  |  |  | IOB→VBVB | IO_RP2 | VBV_WP | — |
|  |  |  |  | VBVB→OPB | IO_RP1 | VBV_RP | OP_WP |
|  |  |  |  | OPB→OPERATION UNIT | — | — | OP_RP |

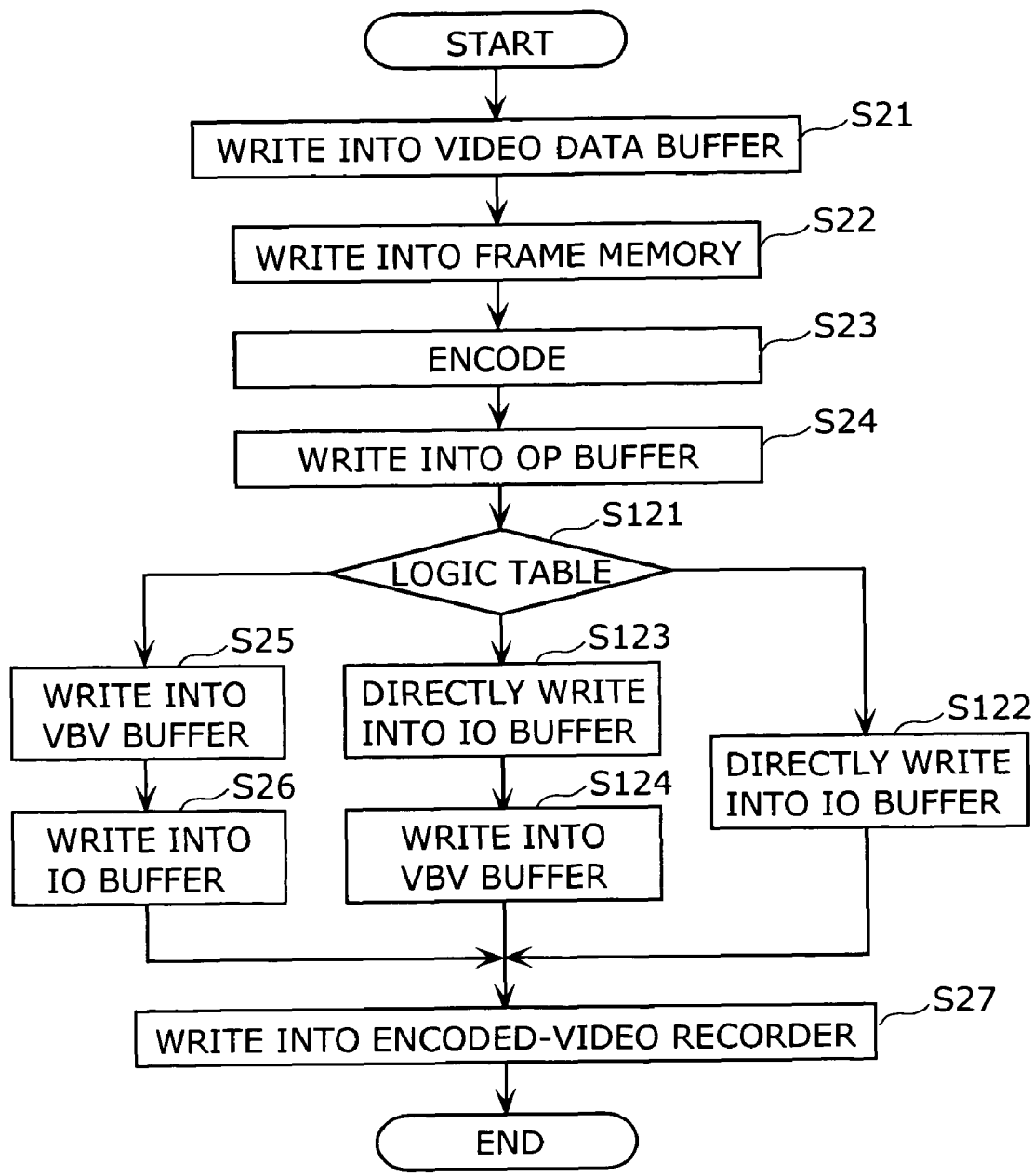

FIG. 7

| STATE | VBVB | IOB | OPB | TRANSFER PATH | POINTER(OPB) | POINTER(VBVB) | POINTER(IOB) |
|---|---|---|---|---|---|---|---|
| E1 | NULL | ! FULL | ! OW | OPERATION UNIT→OPB | OP_WP | — | — |
|  |  |  |  | OPB→IOB | OP_RP1, OP_RP2 | — | IO_WP |
|  |  |  |  | IOB→B/IF | — | — | IO_RP |
| E2 | NULL | FULL | ! OW | OPERATION UNIT→OPB | OP_WP | — | — |
|  |  |  |  | OPB→VBVB | OP_RP2 | VBV_WP | — |
|  |  |  |  | IOB→B/IF | — | — | IO_RP |
|  |  |  |  | VBVB→IOB | OP_RP1 | VBV_RP | IO_WP |
| E3 | ! NULL | FULL | ! OW | OPERATION UNIT→OPB | OP_WP | — | — |
|  |  |  |  | OPB→VBVB | OP_RP2 | VBV_WP | — |
|  |  |  |  | IOB→B/IF | — | — | IO_RP |
|  |  |  |  | VBVB→IOB | OP_RP1 | VBV_RP | IO_WP |
| E4 | ! NULL | ! FULL | ! OW | OPERATION UNIT→OPB | OP_WP | — | — |
|  |  |  |  | OPB→IOB | OP_RP1 | — | IO_WP |
|  |  |  |  | OPB→VBVB | OP_RP2 | VBV_WP | — |
|  |  |  |  | IOB→B/IF | — | — | IO_RP |
| E5 | ! NULL | FULL | OW | OPERATION UNIT→OPB | OP_WP | — | — |
|  |  |  |  | OPB→VBVB | OP_RP2 | VBV_WP | — |
|  |  |  |  | VBVB→IOB | OP_RP1 | VBV_RP | IO_WP |
|  |  |  |  | IOB→B/IF | — | — | IO_RP |
| E6 | ! NULL | ! FULL | OW | OPERATION UNIT→OPB | OP_WP | — | — |
|  |  |  |  | OPB→VBVB | OP_RP2 | VBV_WP | — |
|  |  |  |  | VBVB→IOB | OP_RP1 | VBV_RP | IO_WP |
|  |  |  |  | IOB→B/IF | — | — | IO_RP |

150, 151, 152, 153, 154, 155, 156, 157, 158

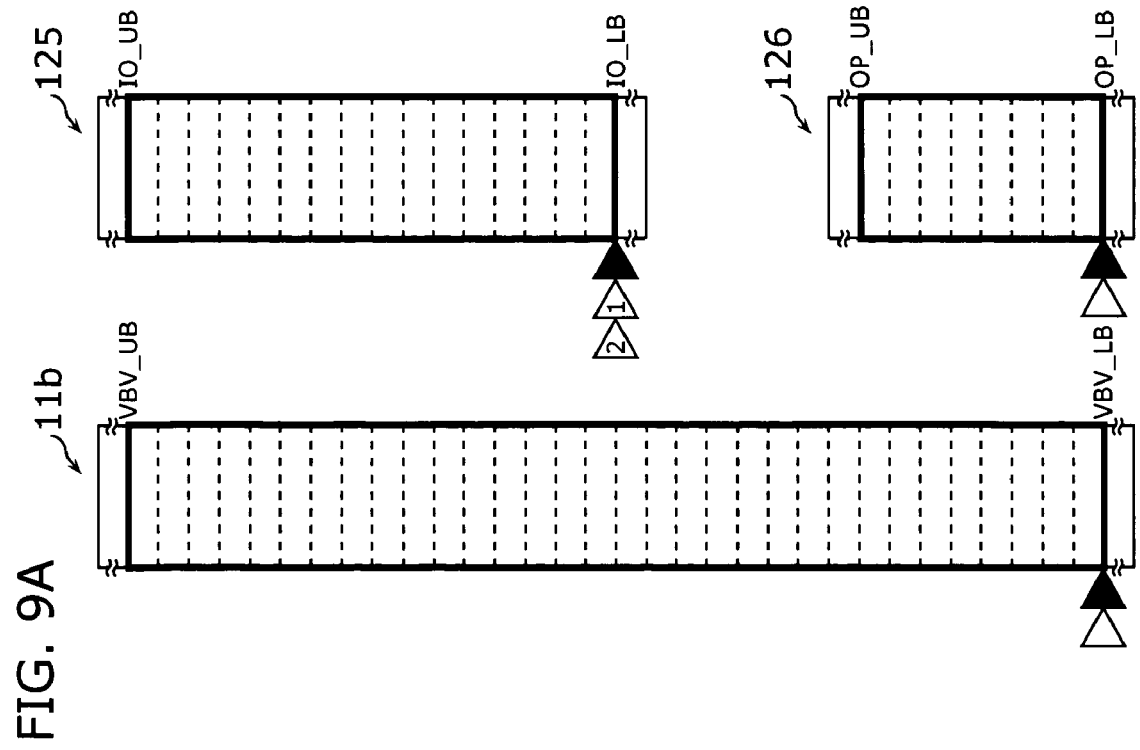

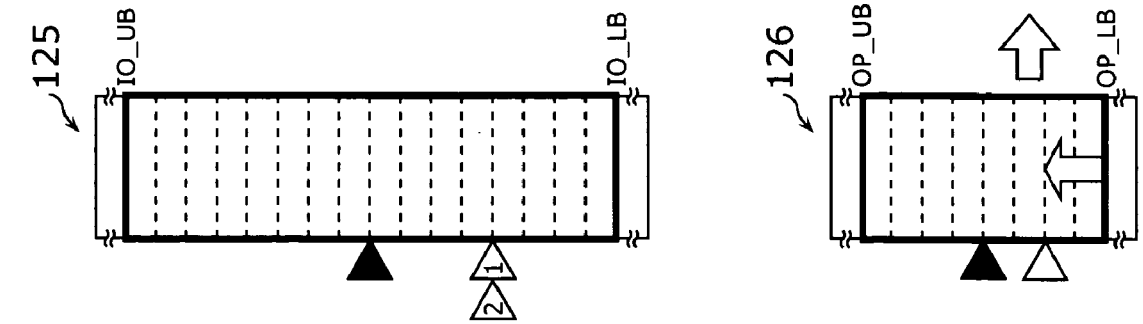
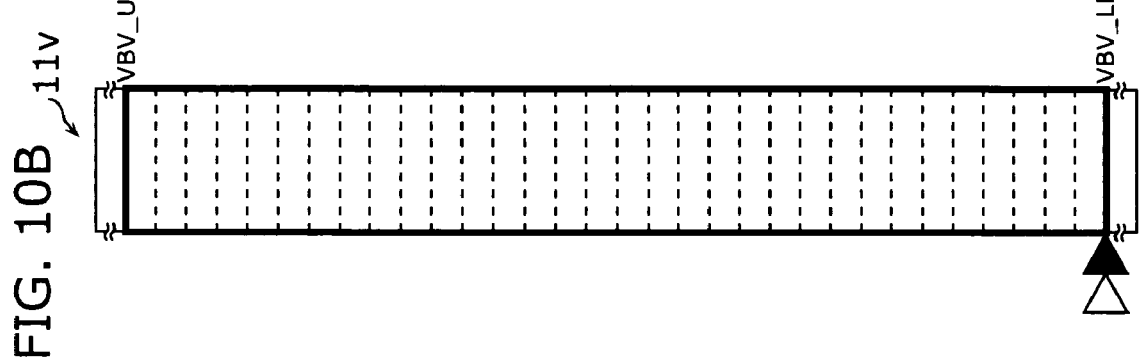
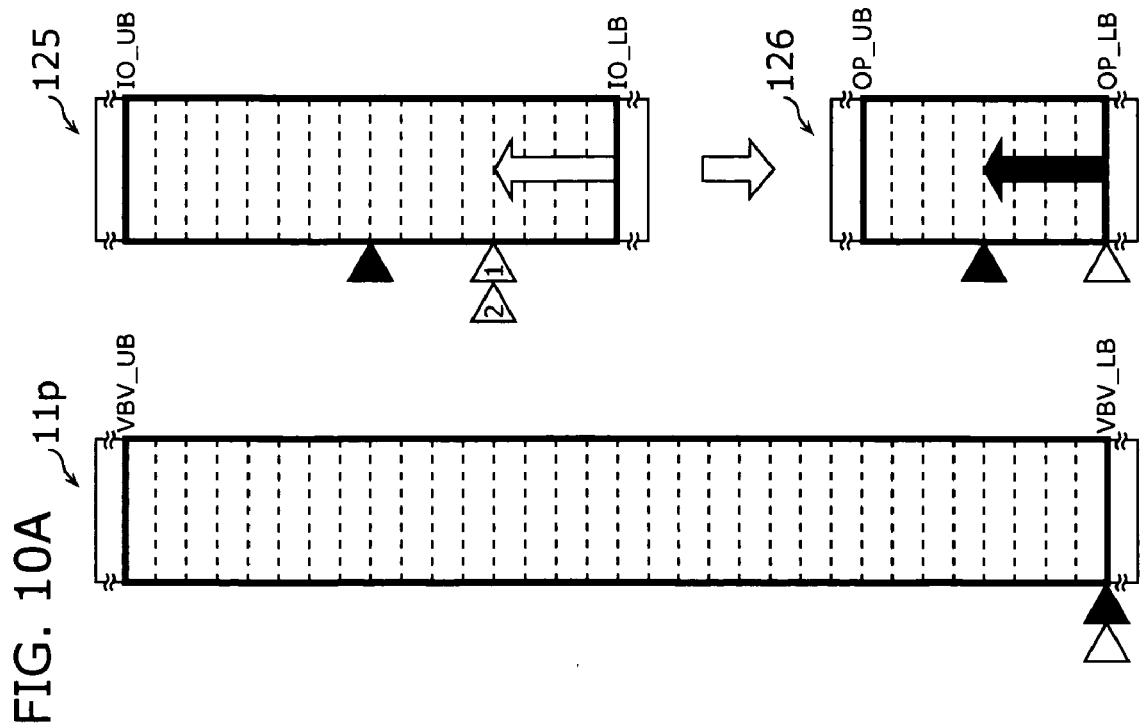

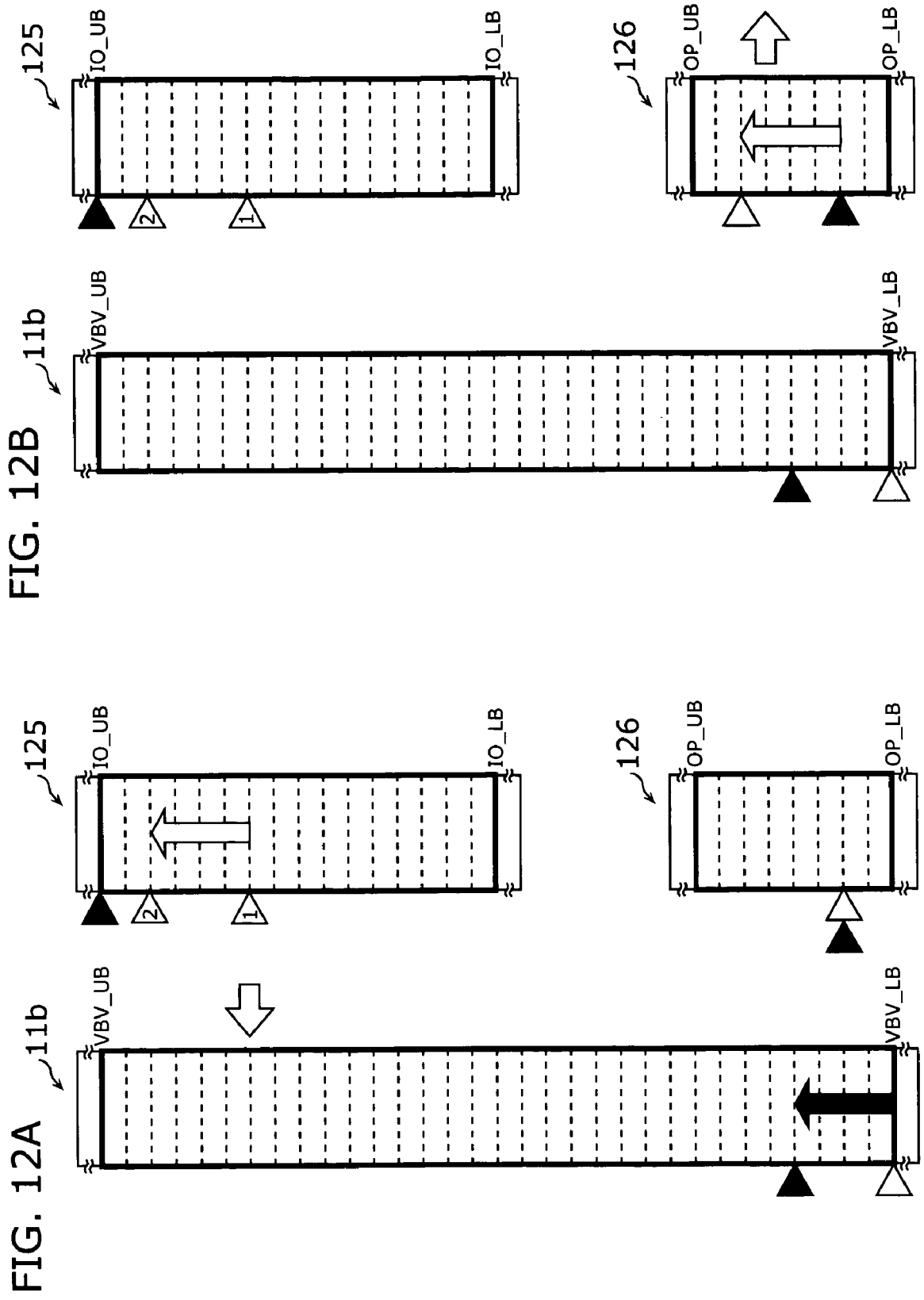

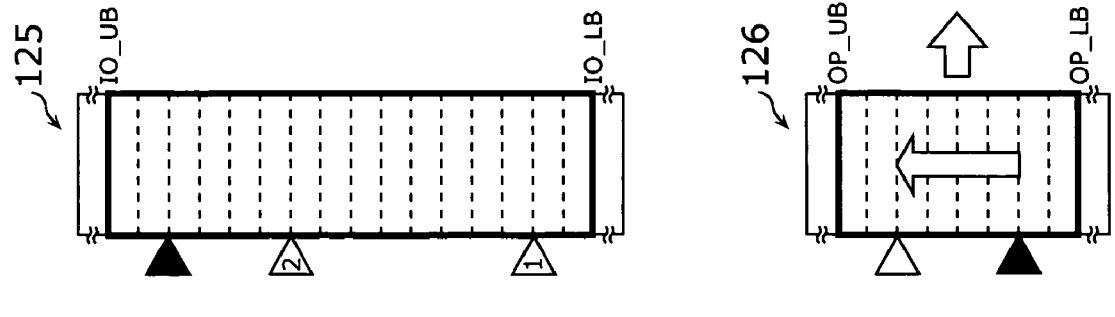
FIG. 15B
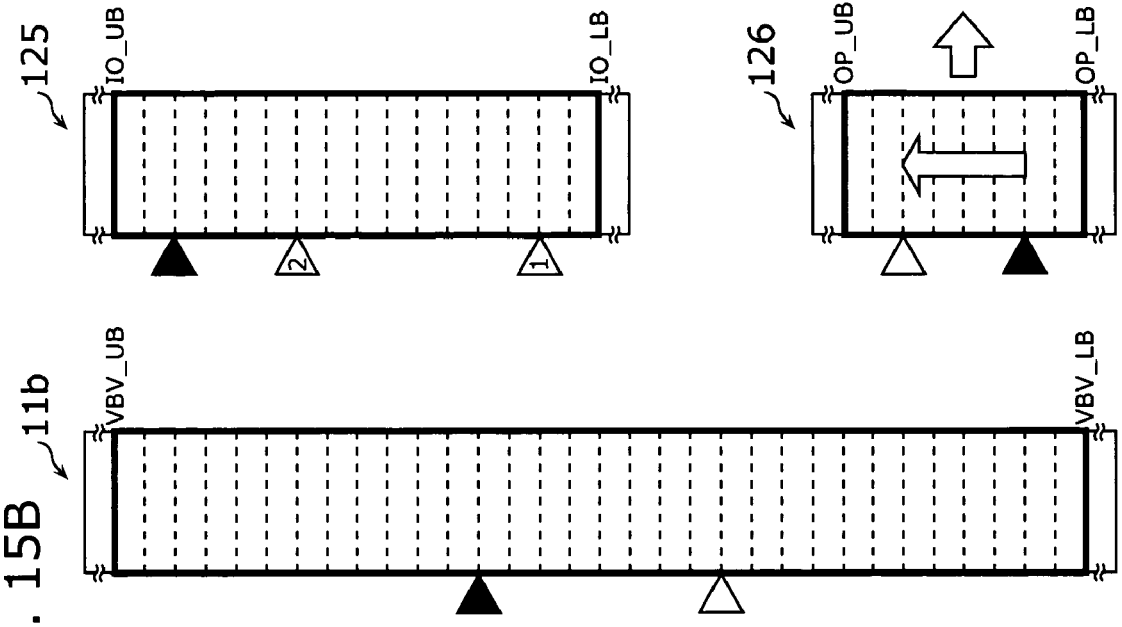
FIG. 15A
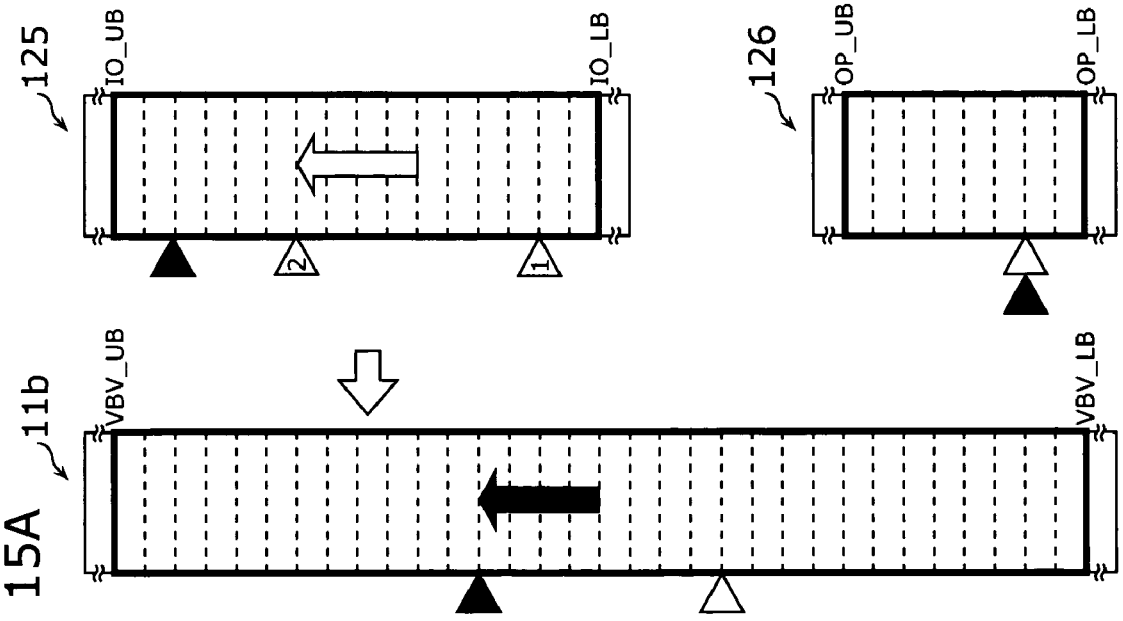

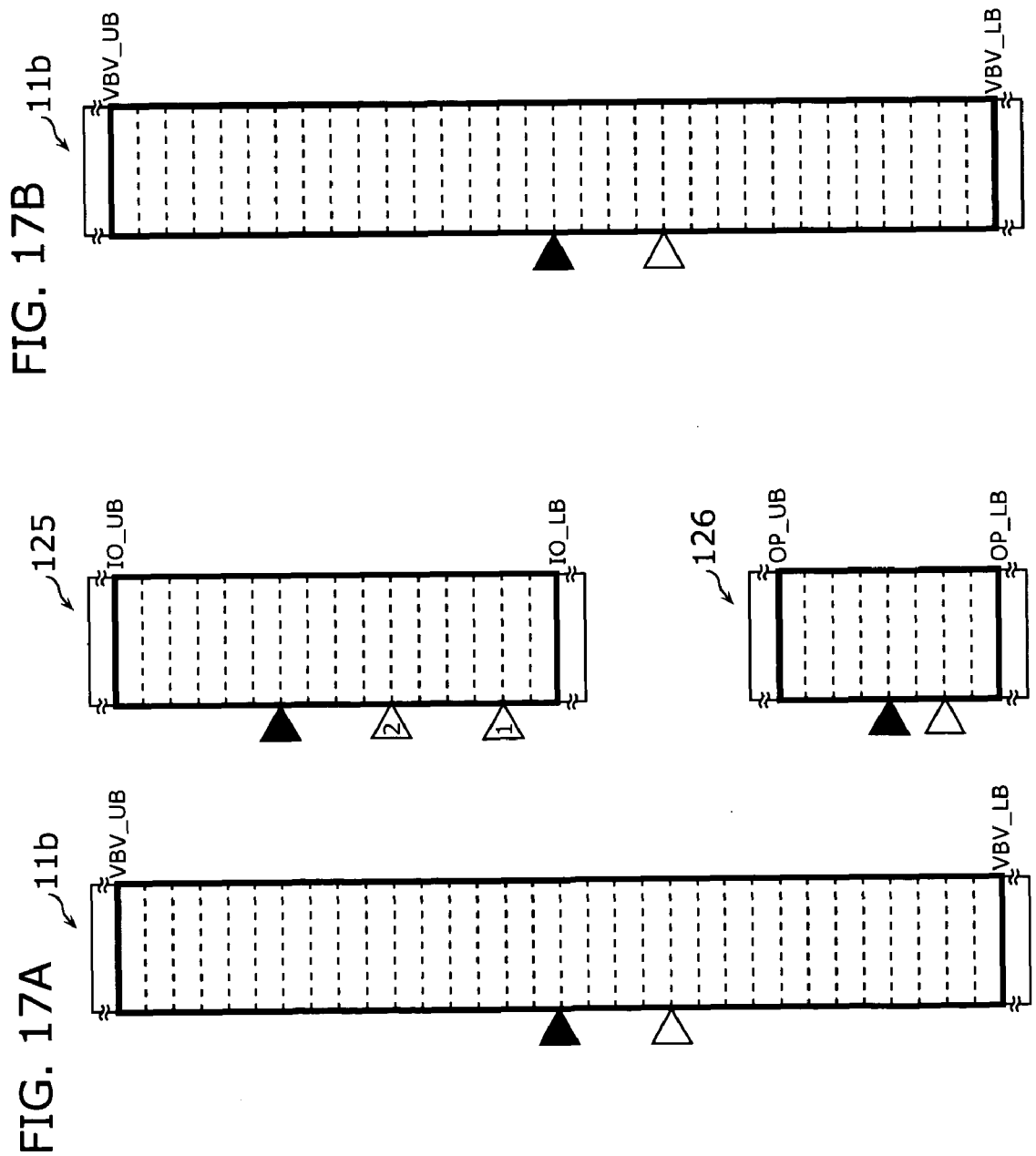

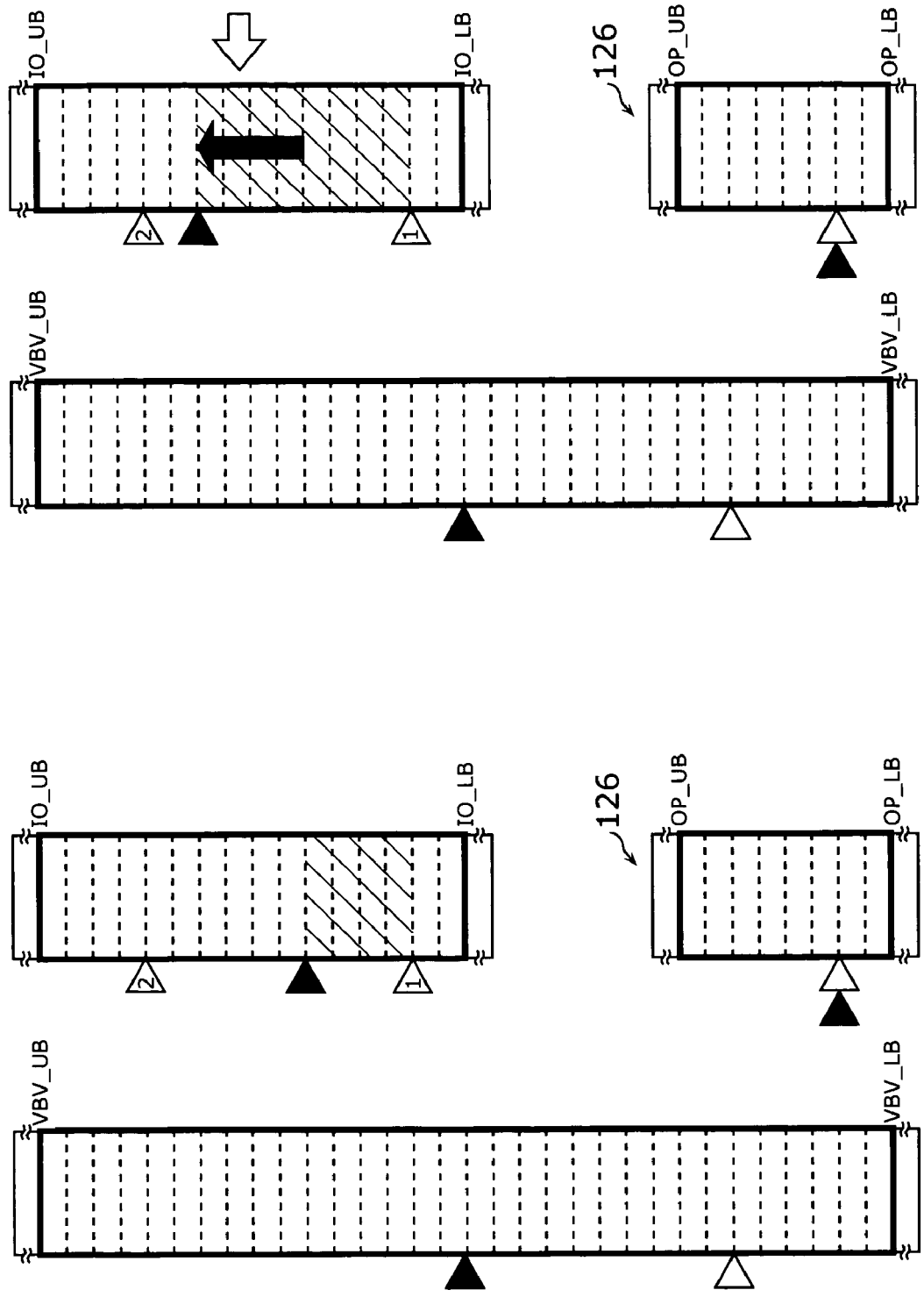

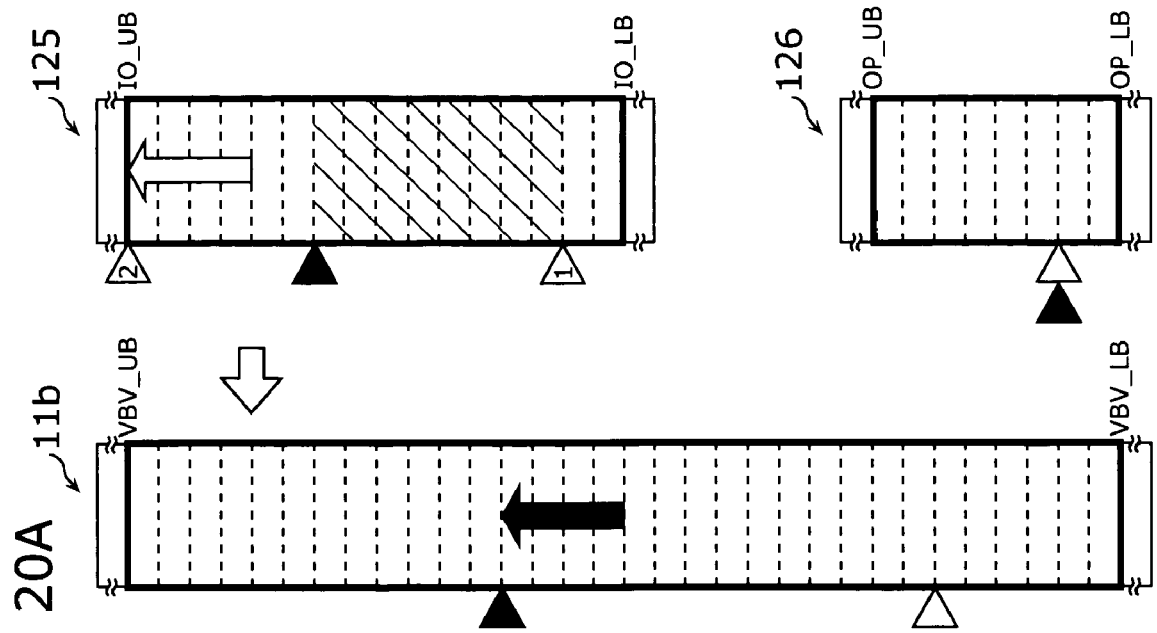

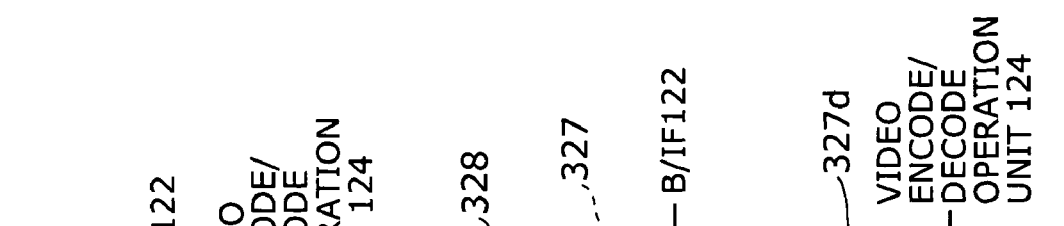
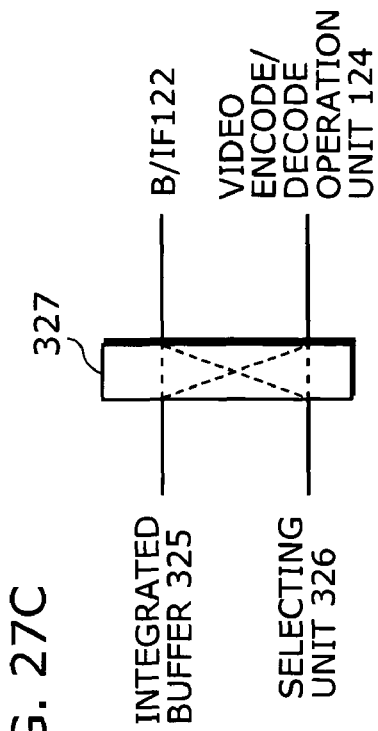
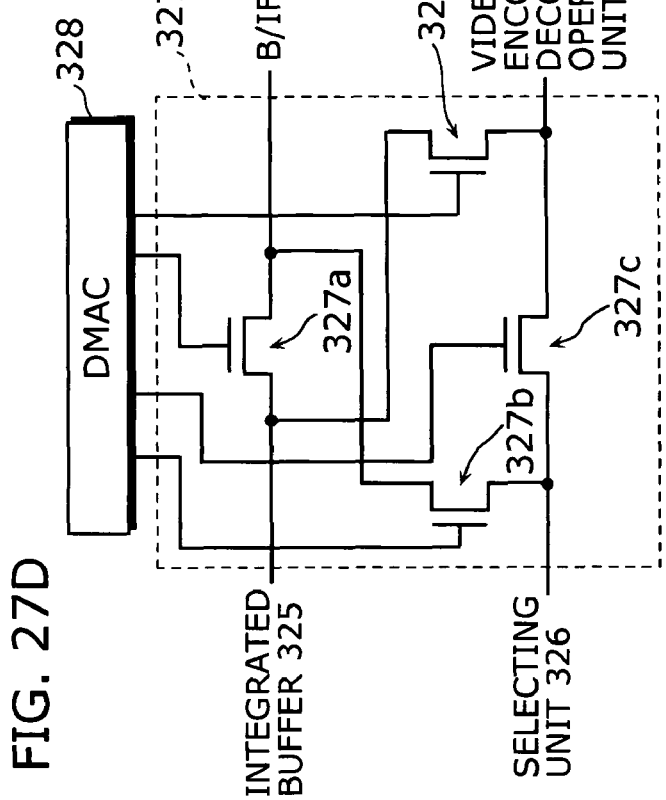
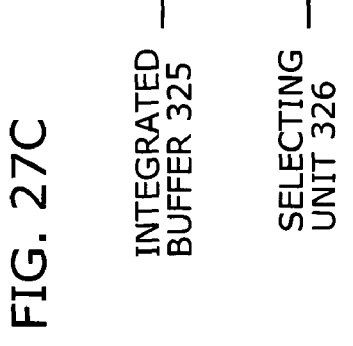
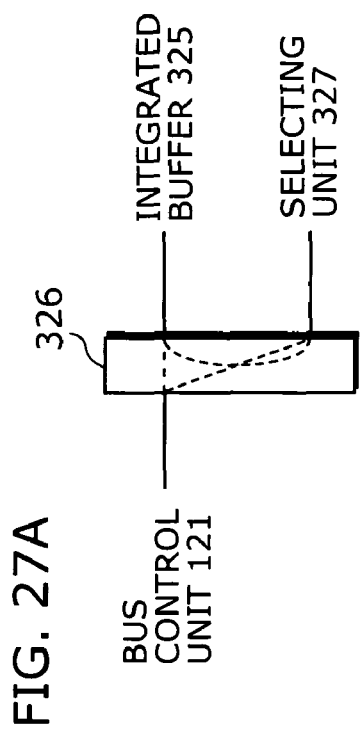
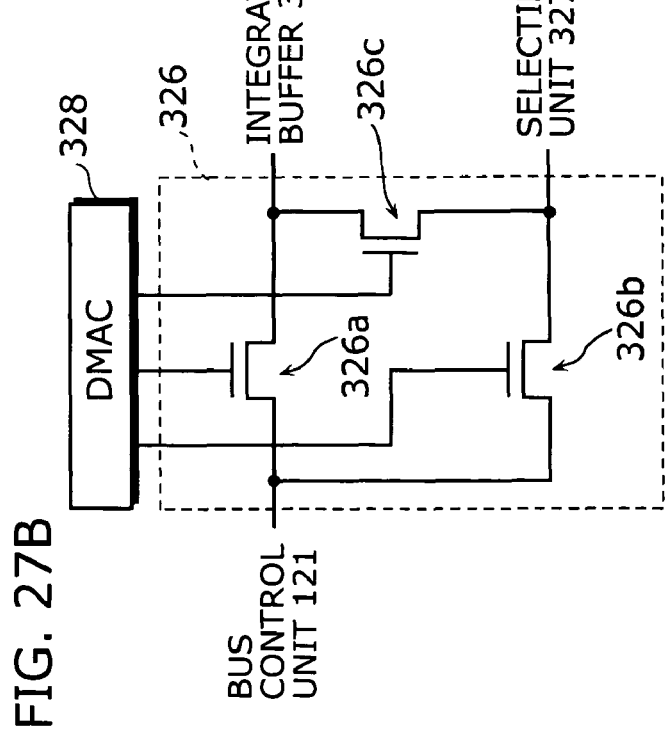

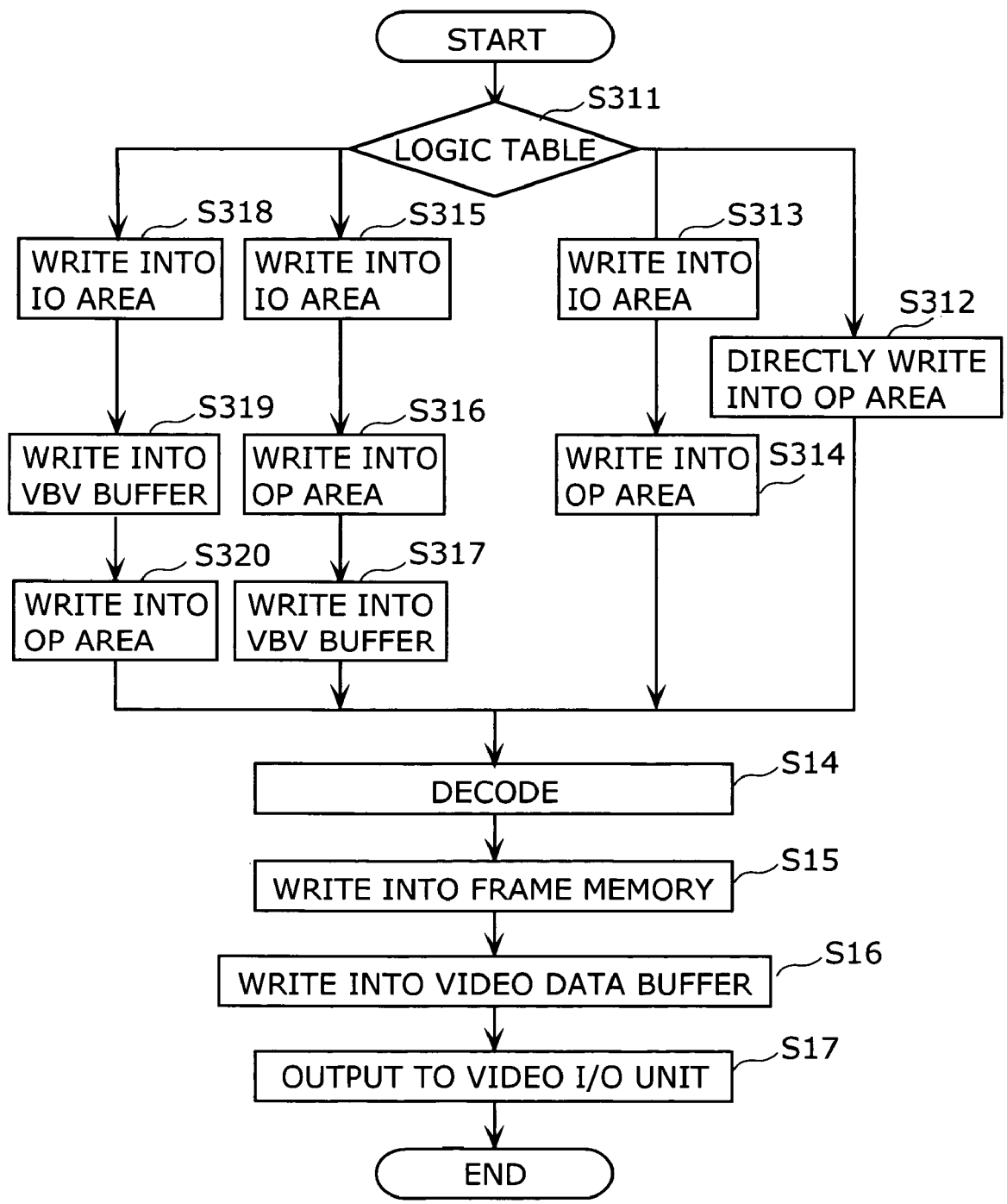

FIG. 32

| STATE | VBVB | OP AREA | IO AREA | TRANSFER PATH | POINTER(IO AREA) | POINTER(VBVB) | POINTER(OP AREA) |
|---|---|---|---|---|---|---|---|
| DA | NULL | !FULL | NULL | B/IF→OP AREA<br>OP AREA→OPERATION UNIT | —<br>— | —<br>— | OP_WP<br>OP_RP |
| DB | NULL | FULL | NULL | B/IF→IO AREA<br>OP AREA→OPERATION UNIT<br>IO AREA→OP AREA | IO_WP<br>—<br>IO_RP1,IO_RP2 | —<br>—<br>— | —<br>OP_RP<br>OP_WP |
| D1 | NULL | !FULL | !OW | B/IF→IO AREA<br>IO AREA→OP AREA<br>OP AREA→OPERATION UNIT | IO_WP<br>IO_RP1,IO_RP2<br>— | —<br>—<br>— | —<br>OP_WP<br>OP_RP |
| D2 | NULL | FULL | !OW | B/IF→IO AREA<br>IO AREA→VBVB<br>OP AREA→OPERATION UNIT<br>VBVB→OP AREA | IO_WP<br>IO_RP2<br>—<br>IO_RP1 | —<br>VBV_WP<br>—<br>VBV_RP | —<br>—<br>OP_RP<br>OP_WP |
| D3 | !NULL | FULL | !OW | B/IF→IO AREA<br>IO AREA→VBVB<br>OP AREA→OPERATION UNIT<br>VBVB→OP AREA | IO_WP<br>IO_RP2<br>—<br>IO_RP1 | —<br>VBV_WP<br>—<br>VBV_RP | —<br>—<br>OP_RP<br>OP_WP |
| D4 | !NULL | !FULL | !OW | B/IF→IO AREA<br>IO AREA→VBVB<br>IO AREA→OP AREA<br>OP AREA→OPERATION UNIT | IO_WP<br>IO_RP2<br>IO_RP1<br>— | —<br>VBV_WP<br>—<br>— | —<br>—<br>OP_WP<br>OP_RP |
| D5 | !NULL | FULL | OW | B/IF→IO AREA<br>IO AREA→VBVB<br>VBVB→OP AREA<br>OP AREA→OPERATION UNIT | IO_WP<br>IO_RP2<br>—<br>— | —<br>VBV_WP<br>VBV_RP<br>— | —<br>—<br>OP_WP<br>OP_RP |
| D6 | !NULL | !FULL | OW | B/IF→IO AREA<br>IO AREA→VBVB<br>VBVB→OP AREA<br>OP AREA→OPERATION UNIT | IO_WP<br>IO_RP2<br>IO_RP1<br>— | —<br>VBV_WP<br>VBV_RP<br>— | —<br>—<br>OP_WP<br>OP_RP |

| STATE | VBVB | IO AREA | OP AREA | TRANSFER PATH | POINTER(OP AREA) | POINTER(VBVB) | POINTER(IO AREA) |
|---|---|---|---|---|---|---|---|
| EA | NULL | !FULL | NULL | OPERATION UNIT→IO AREA | — | — | IO_WP |
|  |  |  |  | IO AREA→B/IF | — | — | IO_RP |
| EB | NULL | FULL | NULL | OPERATION UNIT→OP AREA | OP_WP | — | — |
|  |  |  |  | IO AREA→B/IF | — | — | IO_RP |
|  |  |  |  | OP AREA→IO AREA | OP_RP1,OP_RP2 | — | IO_WP |
| E1 | NULL | !FULL | !OW | OPERATION UNIT→OP AREA | OP_WP | — | — |
|  |  |  |  | OP AREA→IO AREA | OP_RP1,OP_RP2 | — | IO_WP |
|  |  |  |  | IO AREA→B/IF | — | — | IO_RP |
| E2 | NULL | FULL | !OW | OPERATION UNIT→OP AREA | OP_WP | — | — |
|  |  |  |  | OP AREA→VBVB | OP_RP2 | VBV_WP | — |
|  |  |  |  | IO AREA→B/IF | — | — | IO_RP |
|  |  |  |  | VBVB→IO AREA | OP_RP1 | VBV_RP | IO_WP |
| E3 | !NULL | FULL | !OW | OPERATION UNIT→OP AREA | OP_WP | — | — |
|  |  |  |  | OP AREA→VBVB | OP_RP2 | VBV_WP | — |
|  |  |  |  | IO AREA→B/IF | — | — | IO_RP |
|  |  |  |  | VBVB→IO AREA | OP_RP1 | VBV_RP | IO_WP |
| E4 | !NULL | !FULL | !OW | OPERATION UNIT→OP AREA | OP_WP | — | — |
|  |  |  |  | OP AREA→VBVB | OP_RP2 | VBV_WP | — |
|  |  |  |  | OP AREA→IO AREA | OP_RP1 | — | IO_WP |
|  |  |  |  | IO AREA→B/IF | — | — | IO_RP |
| E5 | !NULL | FULL | OW | OPERATION UNIT→OP AREA | OP_WP | — | — |
|  |  |  |  | OP AREA→VBVB | OP_RP2 | VBV_WP | — |
|  |  |  |  | IO AREA→B/IF | — | — | IO_RP |
|  |  |  |  | VBVB→IO AREA | OP_RP1 | VBV_RP | IO_WP |
| E6 | !NULL | !FULL | OW | OPERATION UNIT→OP AREA | OP_WP | — | — |
|  |  |  |  | OP AREA→VBVB | OP_RP2 | VBV_WP | — |
|  |  |  |  | VBVB→IO AREA | OP_RP1 | VBV_RP | IO_WP |
|  |  |  |  | IO AREA→B/IF | — | — | IO_RP |

351 352 353 354 355 356 357 358  
350

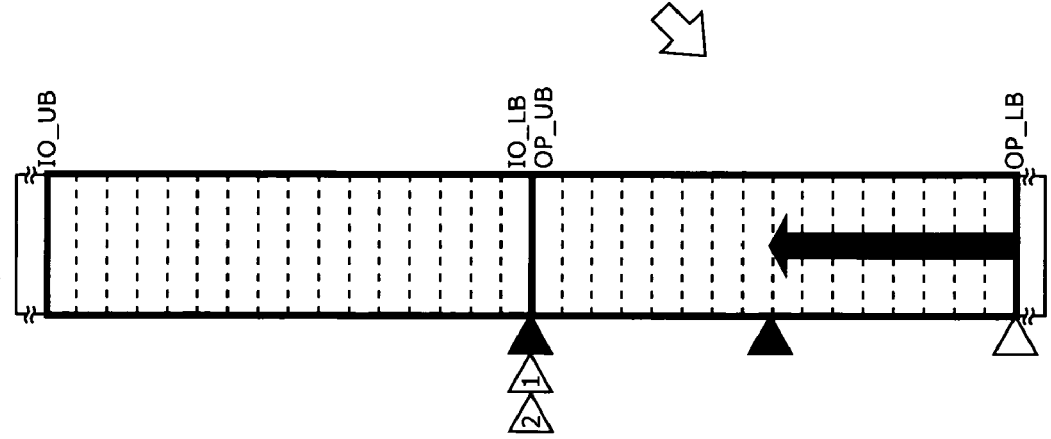
FIG. 36A
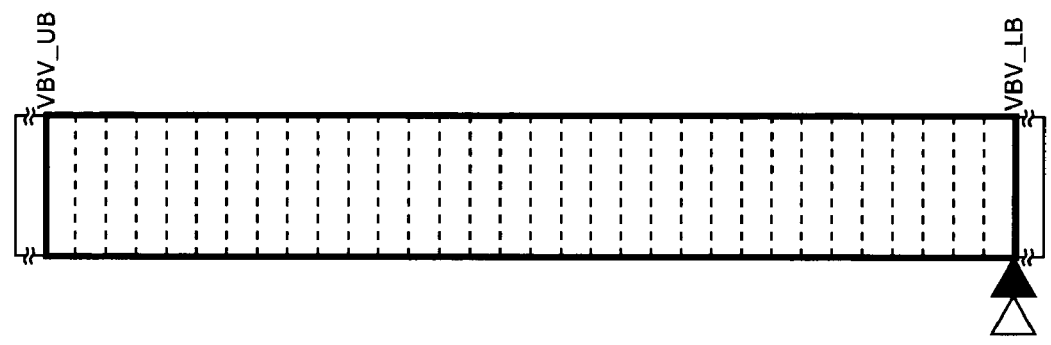
FIG. 36B
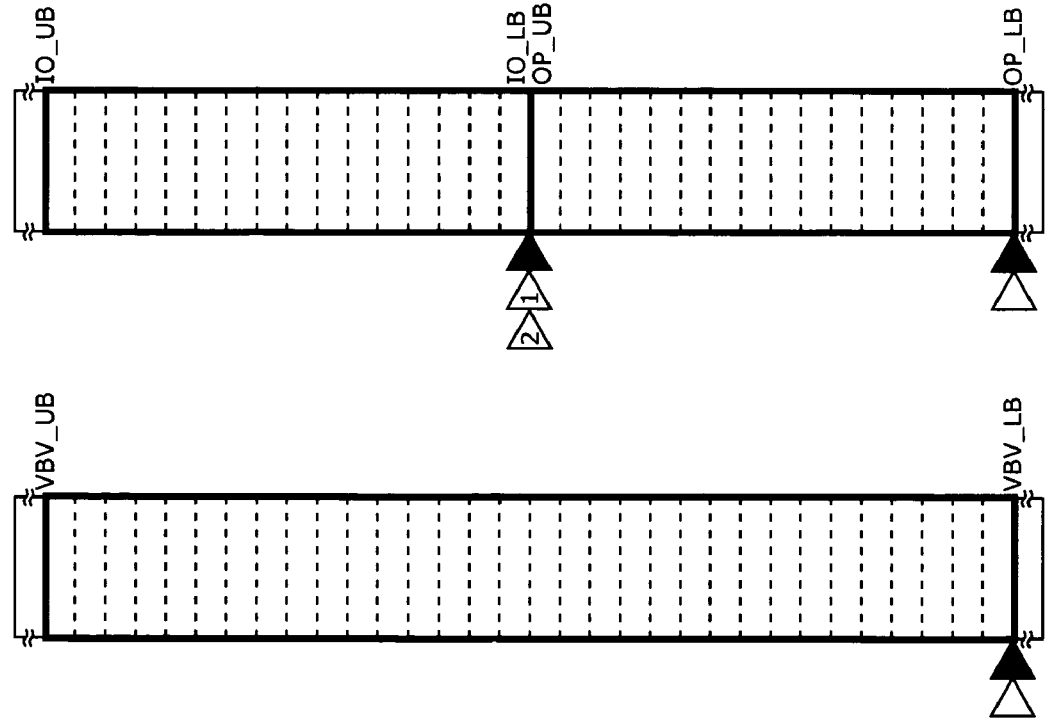

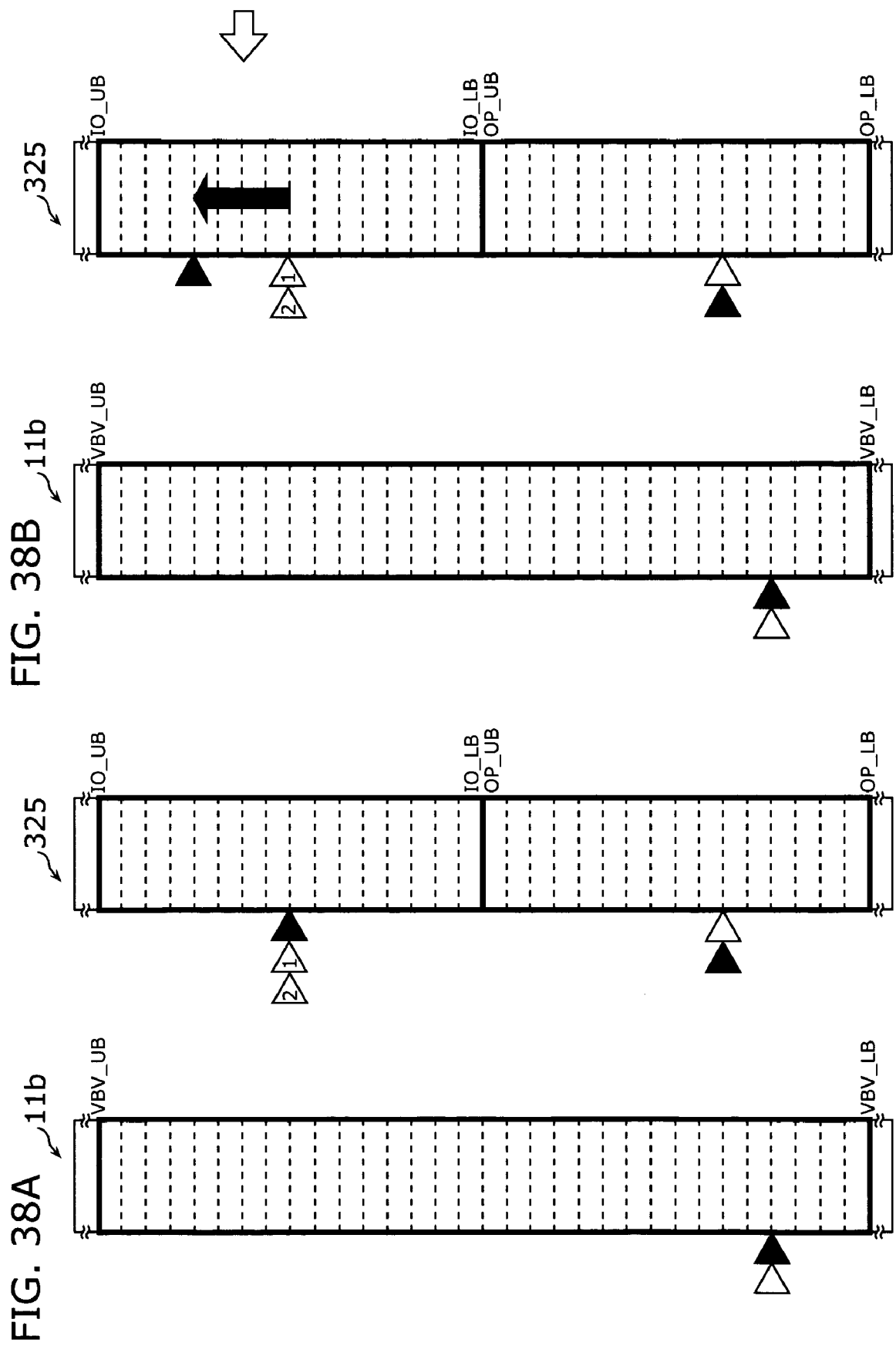

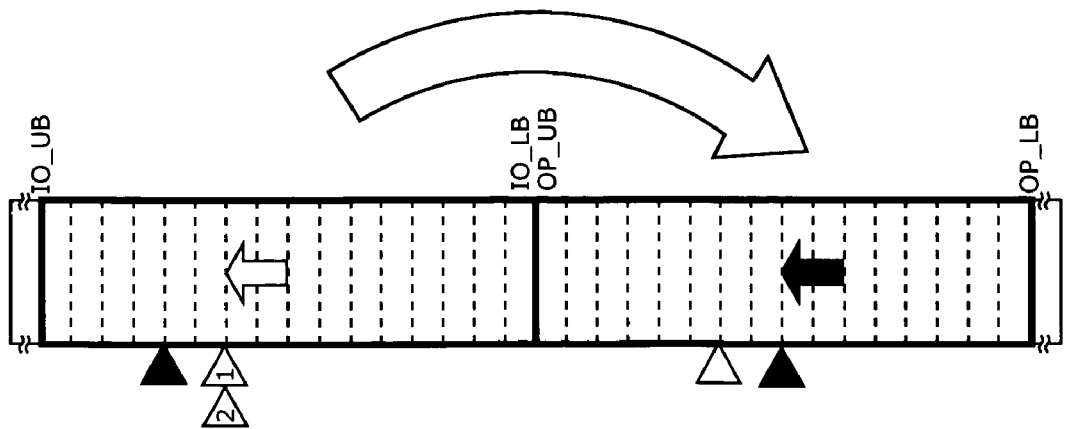
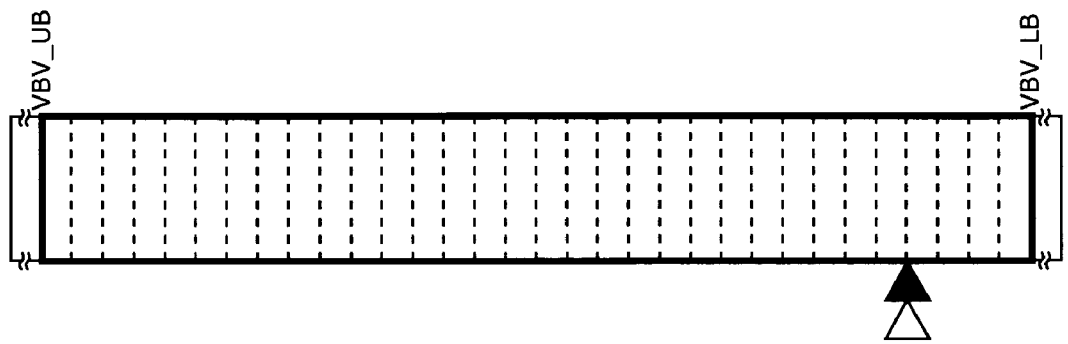
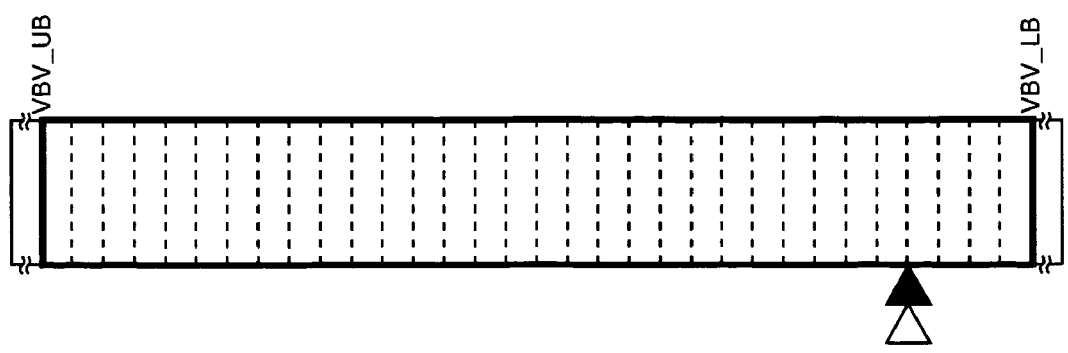

DATA CONVERTING APPARATUS AND METHOD

BACKGROUND OF THE INVENTION (1) Field of the Invention

The present invention relates to a video codec which performs a high-speed data transfer when decoding a bitstream or encoding a video signal according to the video encoding method such as the MPEG standard.

(2) Description of the Related Art

In recent years, digital video devices that employ the widely used international video encoding standards, such as MPEG (Moving Picture Experts Group), JPEG (Joint Photographic Experts Group), and H. 264, have been introduced commercially one after another. Such a digital video device includes a system LSI on which a video encode/decode processing circuit called a codec is integrated. The system LSI which integrates the video encode/decode processing circuit is provided with a CPU (Central Processing Unit), an SRAM (Static Random Access Memory), a DMAC (Direct Memory Access Controller), and a circuit dedicated to video processing (see a reference literature [Ref1] described below, for example).

[Ref1] "Database of Hyoujun Gijutsu Shu (Standard Technologies) (Layout of system LSI): LSI for picture processing/LSI for data encoding", [online], Japan Patent Office, searched on Aug. 4, 2004.

The following is an explanation about a video codec system having a system LSI that integrates a video encode/decode processing circuit.

FIG. 1 is a block diagram showing a conventional video codec system. As shown in this figure, a video codec system 10 is composed of a main memory 11, a video codec 12, an encoded-video recorder 13, and a video I/O unit 14.

The main memory 11 is connected to the video codec 12 via an external bus, and is used as a memory area for storing work data generated when the video codec 12 decodes a bitstream or encodes a video signal. Here, a "bitstream" refers to encoded data which is obtained by encoding a video signal.

The whole of the video codec 12 is integrated on the system LSI, and is connected to the main memory 11 via a DRAM bus, to the encoded-video recorder 13 via an interface, and to the video I/O unit 14 via another video I/O interface. After encoding a video signal inputted from the video I/O unit 14, the video codec 12 writes the encoded data into the encoded-video recorder 13. Also, to do it the other way around, the video codec 12 decodes the encoded data read from the encoded-video recorder 13 and outputs the decoded data to the video I/O unit 14.

The encoded-video recorder 13 is an external encoded-data recorder, such as an HDD (Hard Disk Drive), a DVD, or a flash memory card. The video I/O unit 14 is an external video I/O unit, such as a display or a video camera.

The main memory 11 includes a frame memory 11a, a VBV (Video Buffering Verifier) buffer 11b, and a work area 11c. The frame memory 11a is a storage area that stores a video signal of a few frames. The VBV buffer 11b is a storage area that stores the bitstream encoded by the video codec 12 and the bitstream read from the encoded-video recorder 13.

In the video codec system 10 having the construction as described so far, the video codec 12 expands work data in the main memory 11 when decoding a bitstream or encoding a video signal.

According to the above conventional technology, the CPU, the DMAC, and the other bus masters have to access the main memory 11. This causes conflicts among these devices competing for access to the main memory 11, thereby degrading the access performance. In a quest to improve the performance of the video codec system in its entirety, the bottleneck is the data transfer performed between the video codec and the main memory.

As a work area, a DRAM (Dynamic Random Access Memory) is normally used as a main memory for its larger storage per unit area as compared with an SRAM. Using the DRAM, however, refresh requirements, access conflicts, and page mishits may occur and, for this reason, the access time and the number of waits are variable. As a matter of course, the access time is longer and the access speed is slower in comparison with the case of the SRAM. If the SRAM is used instead of the DRAM in order to improve the access performance, there would be a problem that the cost of the whole video codec increases.

With this being the situation, the challenge is to realize a cost reduction on a system LSI, a reduction in power requirements, and a flexible processing method using software.

The present invention was conceived in view of the problem described above, and has an object of providing a video codec that, without an increase in cost, reduces the frequency of access to the main memory and raises system performance.

SUMMARY OF THE INVENTION

To achieve the stated object, a video codec of the present invention is composed of a converting unit operable to convert first type data into second type data; a storing unit operable to store the first type data transferred from an external apparatus; and a control unit operable to control a process of: determining, in accordance with free space of the storing unit, one of a first path going through a main memory and a second path bypassing the main memory as a transfer path; and having the first type data, which is stored in the storing unit, inputted into the converting unit via the determined transfer path.

With this structure, in accordance with free space of the internal storing unit, either the first path or the second path is determined as the transfer path. If the second path is determined as the transfer path, the data will bypass the main memory, meaning that the main memory does not have to be accessed. Thus, the frequency with which the main memory is accessed can be accordingly reduced.

Moreover, the storing unit may have: a first buffer into which the first type data transferred from the external apparatus is stored according to a first-in first-out method; and a second buffer into which the first type data to be inputted into the converting unit is stored according to the first-in first-out method, wherein the first buffer is managed using first, second, and third pointers, the first pointer being used for managing the first type data written into the first buffer, the second pointer being used for managing the first type data that is read from the first buffer and written into the second buffer, the third pointer being used for managing the first type data read from the first buffer, and the control unit may be operable to determine the transfer path in accordance with each free space of the first buffer and the second buffer.

With this structure, in accordance with free space of the first and second buffers, either the first path or the second path is determined as the transfer path. If the second path is determined as the transfer path, the data will bypass the main memory, meaning that the main memory does not have to be accessed. Thus, the frequency with which the main memory is accessed can be accordingly reduced.

Furthermore, when the first pointer has not yet passed the second pointer and the second buffer has free space, the control unit may be operable to determine the second path as the transfer path and to have the first type data, which is read from the first buffer, transferred to the second buffer, and when the first pointer has passed the second pointer or the second buffer has no free space, the control unit may be operable to: determine the first path as the transfer path; have the first type data, which is read from the first buffer, transferred to the main memory; and have the first type data, which is read from the main memory, stored into the second buffer.

With this structure, the data stored in the first buffer can be transferred to the second buffer without being overwritten, while the data consistency is maintained. Also, the data can be transferred from the first buffer to the second buffer without going through the main memory. Thus, the main memory does not have to be accessed, meaning that the frequency with which the main memory is accessed can be accordingly reduced. At the same time, this leads to a reduction in the traffic between the video codec and the main memory.

Also, after determining the second path as the transfer path and having the first type data, which is read from the first buffer, transferred to the second buffer, the control unit may be operable to: determine the first path as the transfer path; have the first type data, which is read from the first buffer, transferred to the main memory; and have the first type data, which is read from the second buffer, inputted into the converting unit.

With this structure, the data stored in the first buffer is transferred to the main memory with the data consistency being maintained. On account of this, free space of the first buffer can be increased.

Moreover, the control unit may be operable to: predict whether the second buffer will have free space by monitoring a data transfer performed between the second buffer and the converting unit; determine the first path as the transfer path when judging, based on the prediction, that the second buffer will have no free space; and determine the second path as the transfer path when judging, based on the prediction, that the second buffer will have the free space.

With this structure, by detecting a data transfer from the buffer, a prediction that the buffer will have free space can be made. Based on the prediction, another data transfer can be started. This can increase the effective data transfer speed, as compared with a case where the data transfer is started after waiting for the buffer to have free space.

Furthermore, the storing unit may be a buffer that is logically divided into: a first area into which the first type data transferred from the external apparatus is stored according to a first-in first-out method; and a second area into which the first type data to be inputted into the converting unit is stored according to the first-in first-out method, wherein the first area is a buffer area that is managed using first, second, and third pointers, the first pointer being used for managing the first type data written into the first area, the second pointer being used for managing the first type data that is read from the first area and written into the second area, the third pointer being used for managing the first type data read from the first area, and the control unit may be operable to determine the transfer path in accordance with each free space of the first area and the second area.

With this structure, in accordance with free space of the first and second areas, either the first path or the second path is determined as the transfer path. If the second path is determined as the transfer path, the data will bypass the main memory, meaning that the main memory does not have to be accessed. Thus, the frequency with which the main memory is accessed can be accordingly reduced.

Also, the video codec may be further composed of: a first interface which is connected to the external apparatus and operable to perform a data transfer with the external apparatus; a second interface which is connected to the main memory and operable to perform a data transfer with the main memory; a first selecting unit which has four ports and is operable to switch respective connection states of the four ports in accordance with control of the control unit; and a second selecting unit which has three ports and is operable to switch respective connection states of the three ports in accordance with control of the control unit, wherein the first selecting unit may be connected to the first interface, the converting unit, the storing unit, and the second selecting unit respectively via the four ports, the second selecting unit may be connected to the second interface, the storing unit, and the first selecting unit respectively via the three ports, and the control unit may be operable to determine one of the first path and the second path as the transfer path by controlling the first selecting unit and the second selecting unit.

With this structure, a buffer physically formed as one is logically divided into two areas, and data can bypass the main memory and be directly transferred from one area to the other. Thus, the main memory does not have to be accessed, meaning that the frequency with which the main memory is accessed can be accordingly reduced. At the same time, this leads to a reduction in the traffic between the video codec and the main memory.

It should be noted that the present invention is realized not only as a video codec, but also as a method of controlling a video codec (the method will be referred to as the video encode/decode control method hereafter). Moreover, the present invention may be realized as: an LSI which includes functions provided by the video codec (the functions will be referred to as the video encode/decode function hereafter); an IP core that forms the video encode/decode function in a programmable logic device such as FPGA (Field Programmable Gate Array) or a CPLD (Complex Programmable Logic Device) (this core will be referred to as the video encode/decode core hereafter); and a recording medium which records the video encode/decode core.

According to the video codec of the present invention, the data stored in the storing unit is controlled to be transferred to the main memory connected to the video codec or to bypass the main memory in accordance with the free space of the storing unit. With this, the main memory does not have to be accessed, meaning that the frequency with which the main memory is accessed can be reduced. At the same time, this leads to a reduction in the traffic between the video codec and the main memory.

Moreover, by detecting a data transfer from the buffer, a prediction that the buffer will have free space can be made. Based on the prediction, another data transfer can be started. This can increase the effective data transfer speed, as compared with a case where the data transfer is started after waiting for the buffer to have free space.

Accordingly, the present invention can improve the performance of a system LSI and simultaneously can realize low power consumption without an increase in the cost of the system LSI.

As further information about technical background to this application, the disclosure of Japanese Patent Application No. 2004-328257 filed on Nov. 11, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 4 is a flowchart showing a decoding operation performed by a video codec of the first embodiment.

FIG. 5 shows a logic table related to the state transition in a case where the video codec of the first embodiment performs the decoding operation.

FIG. 6 is a flowchart showing an encoding operation performed by the video codec of the first embodiment.

FIG. 7 shows a logic table related to the state transition in a case where the video codec of the first embodiment performs the encoding operation.

FIG. 9 is a first rough schema showing address transitions of an IO buffer, an OP buffer, and a VBV buffer in a state D1.

FIG. 10 is a second rough schema showing address transitions of the IO buffer, the OP buffer, and the VBV buffer in the state D1.

FIG. 12 is a second rough schema showing address transitions of the IO buffer, the OP buffer, and the VBV buffer in the state D2.

FIG. 15 is a second rough schema showing address transitions of the IO buffer, the OP buffer, and the VBV buffer in the state D3.

FIG. 17 is a first rough schema showing address transitions of the IO buffer, the OP buffer, and the VBV buffer in a state D4.

FIG. 19 is a first rough schema showing address transitions of the IO buffer, the OP buffer, and the VBV buffer in a state D5.

FIG. 20 is a second rough schema showing address transitions of the IO buffer, the OP buffer, and the VBV buffer in the state D5.

FIG. 27A is a diagram showing an internal connection of a selecting unit which is connected to a bus control unit.

FIG. 27B shows an example of a hardware construction of the selecting unit.

FIG. 27C is a diagram showing an internal connection of a selecting unit which is connected to a B/IF and a video encode/decode operation unit.

FIG. 27D shows an example of a hardware construction of the selecting unit.

FIG. 31 is a flowchart showing the decoding operation performed by a video codec of a third embodiment.

FIG. 32 shows a logic table related to the state transition in a case where the video codec of the third embodiment performs the decoding operation.

FIG. 34 shows a logic table related to the state transition in a case where the video codec of the third embodiment performs the encoding operation.

FIG. 36 is a first rough schema showing address transitions of the integrated buffer and the VBV buffer in a state DA.

FIG. 38 is a first rough schema showing address transitions of the integrated buffer and the VBV buffer in a state DB.

FIG. 39 is a second rough schema showing address transitions of the integrated buffer and the VBV buffer in the state DB.

DETAILED DESCRIPTION OF THE INVENTION

First Embodiment

The following is a description of a first embodiment of the present invention, with reference to the drawings. It should be noted here that components which have already been explained in the Description of the Related Art will be given the same numerals in the present embodiment and explanation about them will be omitted.

A video codec of the first embodiment of the present invention has two buffers which temporarily hold a bitstream. An I/O port of one buffer is directly connected to an I/O port of the other. In accordance with free space of these two buffers, the bitstream bypasses the main memory and is transferred from one buffer directly to the other. On the basis of this premise, a video codec system of the first embodiment of the present invention is explained.

Figure 1:
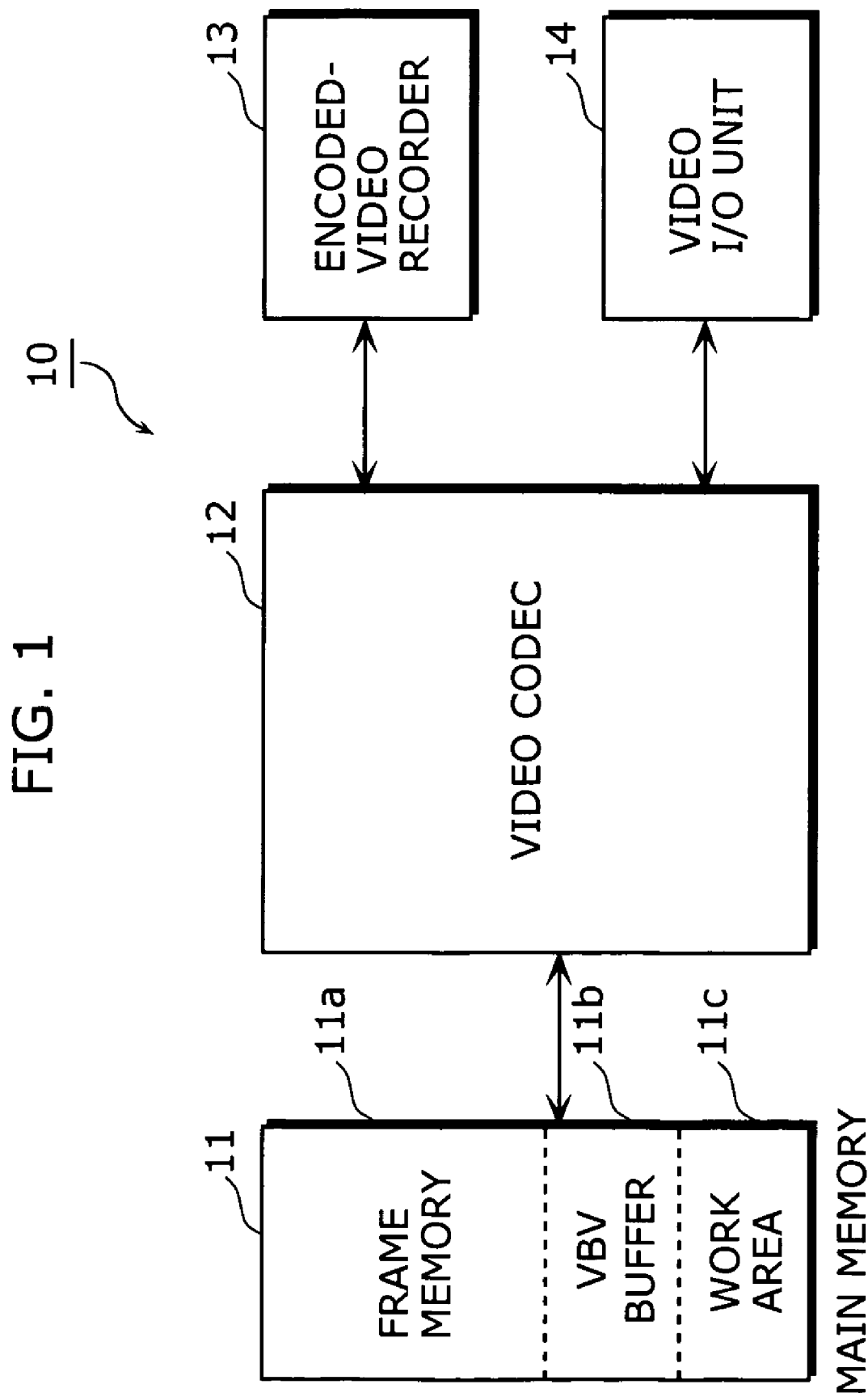
FIG. 1 is a block diagram showing a conventional video codec system.
Figure 2:
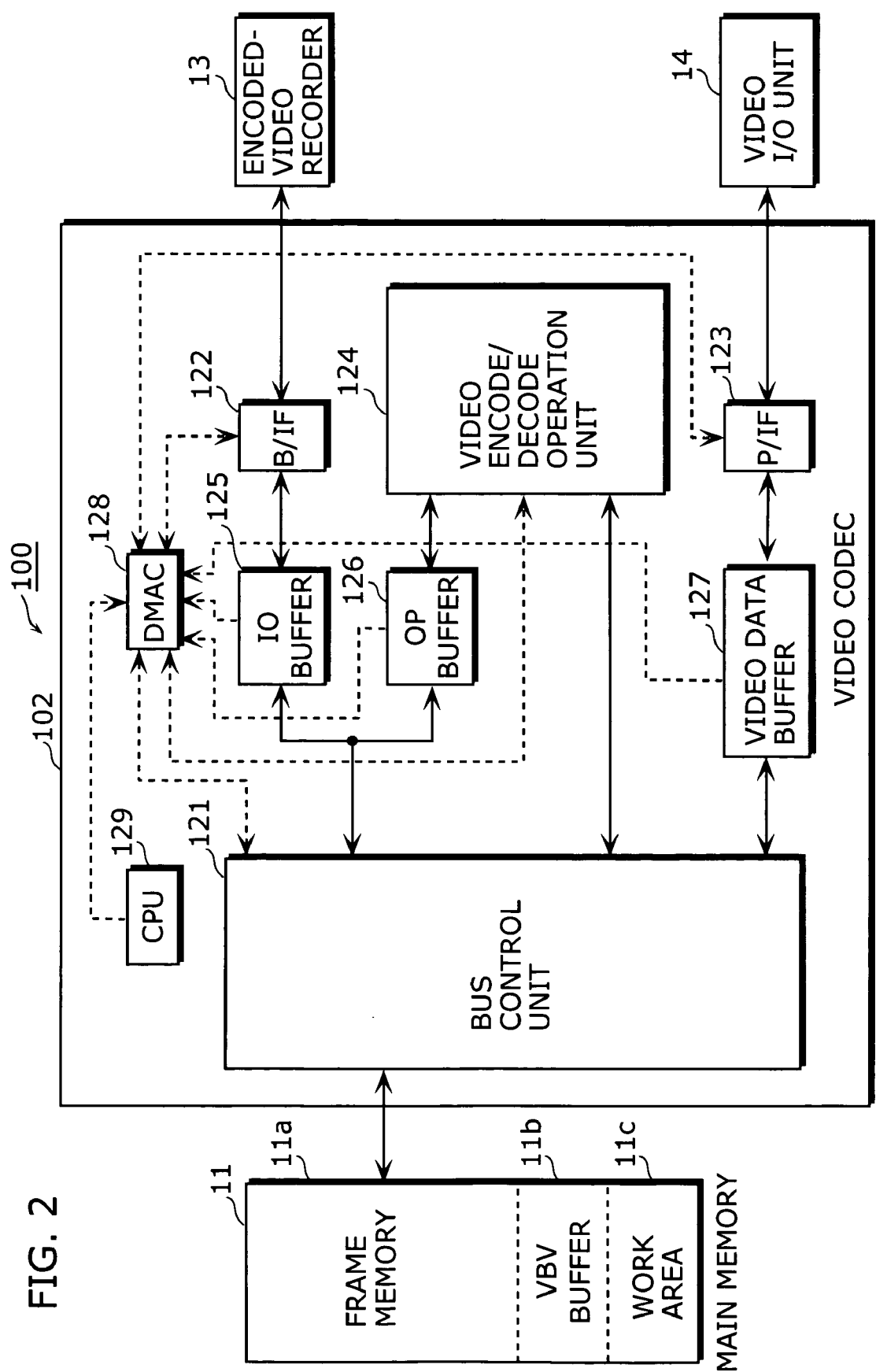
FIG. 2 is a block diagram showing the construction of a video codec system of a first embodiment.

FIG. 2 is a block diagram showing the construction of a video codec system 100 of the first embodiment of the present invention. As shown in this figure, the video codec system 100 is different from the stated video codec system 10 in that the system 100 has a video codec 102 in place of the video codec 12.

The video codec 102 is composed of a bus control unit 121, a B/IF 122, a P/IF 123, a video encode/decode operation unit 124, an IO buffer 125, an OP buffer 126, a video data buffer 127, a DMAC 128, and a CPU 129.

The bus control unit 121 controls internal and external buses as well as controlling data transfers performed across the buses. For example, the bus control unit 121 arbitrates between the buses on the basis of the priority and controls access to the main memory 11.

The B/IF 122 is an interface which exchanges a bitstream with the encoded-video recorder 13. This interface may be a USB (Universal Serial Bus), an IEEE 1394 (Institute of Electrical and Electronic Engineers 1394), or an ATAPI (AT Attachment Packet Interface), for example. The P/IF 123 is an interface which exchanges a video signal with the video I/O unit 14.

The video encode/decode operation unit 124 generates a video signal by decoding a bitstream read from the encoded-video recorder 13, according to the video encoding method. Moreover, the video encode/decode operation unit 124 generates a bitstream by encoding a video signal inputted from the video I/O unit 14.

The IO buffer 125 temporarily holds the bitstream exchanged between the main memory 11 and the encoded-video recorder 13. The OP buffer 126 temporarily holds the bitstream exchanged between the main memory 11 and the video encode/decode operation unit 124.

The video data buffer 127 has two I/O ports and serves as a storage area which stores data according to the first-in first-out method. The video data buffer 127 temporarily holds the video signal exchanged between the video I/O unit 14 and the main memory 11.

The DMAC 128 controls data transfers performed according to the DMA (Direct Memory Access) method, under the control of the CPU 129. In accordance with the free space of the IO buffer 125, the OP buffer 126, and the video data buffer 127, the DMAC 128 controls the bus control unit 121, the B/IF 122, the P/IF 123, and the video encode/decode operation unit 124 so as to control the data transfers performed among the main memory 11, the encoded-video recorder 13, and the video I/O unit 14.

The CPU 129, which is controlled by firmware programs, controls the entire video codec 102. To be more specific, the CPU 129 may be an MCU (Micro Controller Unit) or an embedded microcomputer. Via a DRAM control circuit provided for the bus control unit 121, the CPU 129 can directly access the main memory 11 to which an address area is allocated as an external memory.

Note that although the firmware programs are not illustrated, they are supplied mainly from an instruction ROM, a flash memory, etc.

The video codec 102 is managed by two control units, which are the CPU 129 and the DMAC 128.

Here, additional information regarding the IO buffer 125 and the OP buffer 126 is described.

Each of the IO buffer 125 and the OP buffer 126 has two I/O ports. One of the I/O ports of the IO buffer 125 is directly connected to one of the I/O ports of the OP buffer 126. Here, both of these two ports connecting the IO buffer 125 and the OP buffer 126 are further connected to the bus control unit 121 as shown in FIG. 2. Data which is to be read out or written is managed using I/O_UB, I/O_LB, I/O_RP1, I/O_RP2, and I/O_WP.

Here, I/O_UB and I/O_LB are respectively the most and least significant addresses of the storage area formed as the IO buffer 125 in the video codec 102. I/O_RP1 is a readout pointer which points to a start address to read out data, from the IO buffer 125, that has not been transferred to the OP buffer 126. I/O_RP2 is a readout pointer which points to a start address to read out data, from the IO buffer 125, that has not been transferred to the VBV buffer 11b. I/O_WP is a write pointer which points to a start address to write data into the IO buffer 125.

As described above in the case of the IO buffer 125, one I/O port of the OP buffer 126 is directly connected to one I/O port of the IO buffer 125. Both of these two ports connecting the IO buffer 125 and the OP buffer 126 are further connected to the bus control unit 121 as shown in FIG. 2. Data which is to be read out or written is managed using OP_UB, OP_LB, OP_RP1, OP_RP2, and OP_WP.

Here, OP_UB and OP_LB are respectively the most significant and least significant addresses of the storage area formed as the OP buffer 126 in the video codec 102. OP_RP1 is a readout pointer which points to a start address to read out data, from the OP buffer 126, that has not been transferred to the IO buffer 125. OP_RP2 is a readout pointer which points to a start address to read out data, from the OP buffer 126, that has not been transferred to the VBV buffer 11b. OP_WP is a write pointer which points to a start address to write data into the OP buffer 126.

The data transfers can be performed among the three of the IO buffer 125, the OP buffer 126, and the main memory 11 that requires the bus control unit 121 to communicate with the other two. Note that, however, out of these three-way data transfers, data transfers can be simultaneously carried out only in two ways. Based on this precondition, the main memory 11, the IO buffer 125, and the OP buffer 126 are controlled by the DMAC 128.

Although not illustrated, the IO buffer 125 has a register to hold IO_UB, IO_LB, IO_RP1, IO_RP2, and IO_WP. The OP buffer 126 also has a register to hold OP_UB, OP_LB, IO_RP1, OP_RP2, and OP_WP.

It should be noted that when decoding is performed, to write over, from the lower address, a part remaining not-written-over out of the bitstream stored in the IO buffer 125, that is, to write over a part from IO_RP1 to IO_RP2, is referred to as "to overwrite" hereafter. Also note that the part remaining without being overwritten is referred to as the "remaining area" hereafter.

Similarly, it should be noted that when encoding is performed, to write over, from the lower address, a part remaining not-written-over out of the bitstream stored in the OP buffer 126, that is, to write over a part from OP_RP1 to OP_RP2, is referred to as "to overwrite" hereafter. Also, the part remaining without being overwritten is referred to as the "remaining area" hereafter.

The following is additional information regarding the VBV buffer 11b.

The VBV buffer 11b is a storage area allocated to the main memory 11. The VBV buffer 11b has addresses VBV_LB through VBV_UB-1, and its size is represented by the number of words obtained by reducing the size of VBV_LB from the size of VBV_UB. This storage area is formed as a ring buffer.

The bus control unit 121 manages the data to be read out or written using VBV_UB, VBV_LB, VBV_RP, and VBV_WP. Here, VBV_UB and VBV_LB are respectively the most and least significant addresses of the storage area allocated as the VBV buffer 11b in the main memory 11. VBV_RP is a read-out pointer which points to a start address for the bus control unit 121 to read out data from the VBV buffer 11b. VBV_WP is a write pointer which points to a start address for the bus control unit 121 to write data into the VBV buffer 11b.

When reading the data from the VBV buffer 11b, the bus control unit 121 adds addresses corresponding to the size of the read data and advances VBV_RP. When writing the data into the VBV buffer 11b, the bus control unit 121 adds addresses corresponding to the size of the written data and advances VBV_WP.

Although not illustrated, the bus control unit 121 has a register to hold VBV_UB, VBV_LB, VBV_RP, and VBV_WP.

Figure 3:
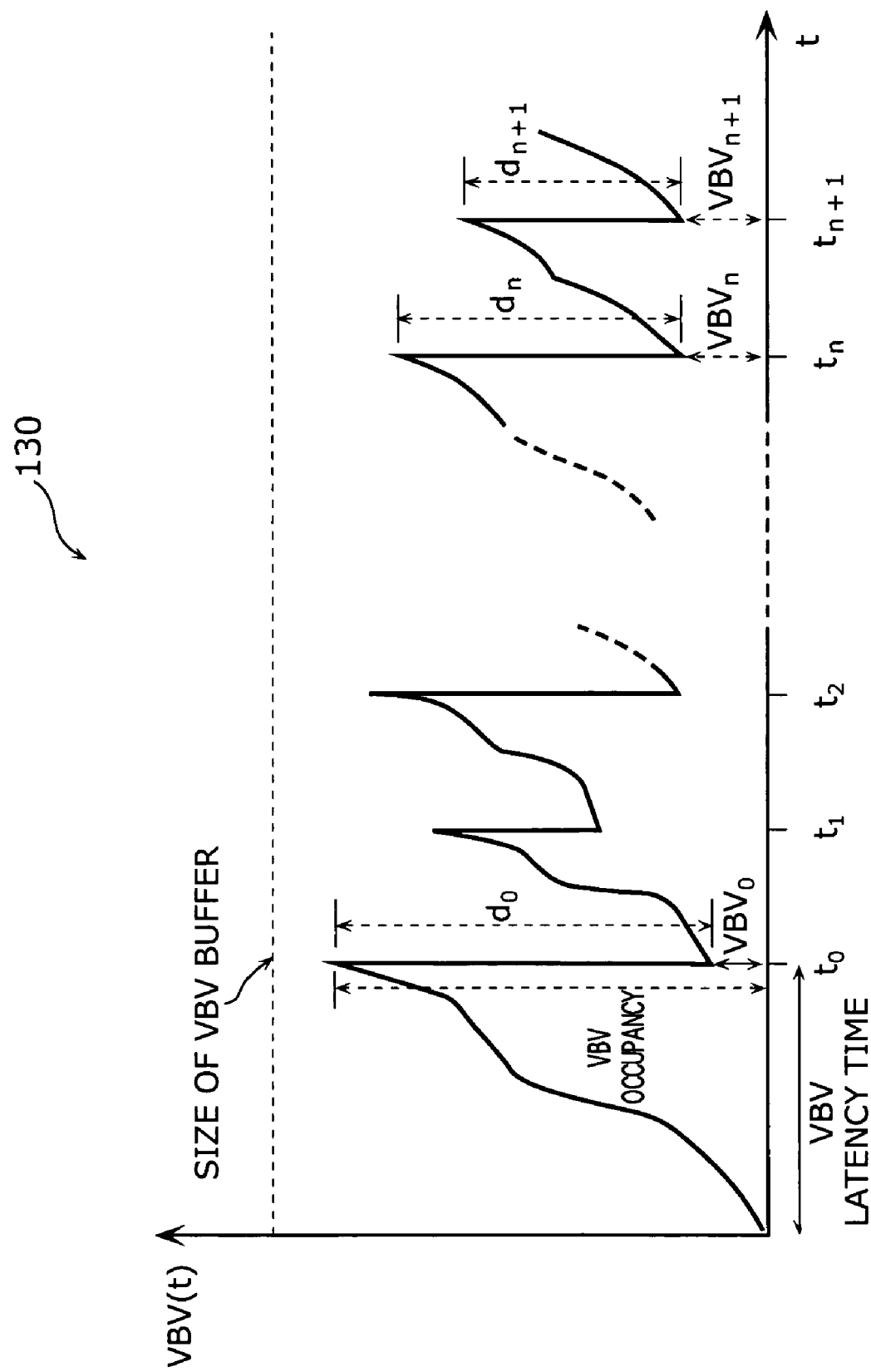
FIG. 3 shows a rough schema showing variations in the hold state of the VBV, as an example.

FIG. 3 shows a rough schema showing variations in the hold state of the VBV buffer 11b, as an example. As shown by a graph 130 in this figure, the VBV buffer 11b is designed according to specifications so as not to cause overflow or underflow. On account of this, it is usually impossible that the VBV buffer 11b becomes null except for its initial state or that the VBV buffer 11b becomes full. Here, the "null" state refers to a state where the allocated storage area is empty, and the "full" state refers to a state where the allocated storage area is filled.

It should be noted here that when VBV_RP is reset due to initialization or overflow, it is set to VBV_LB. Also note that when VBV_WP is reset due to initialization or overflow, it is set to VBV_LB. For example, after the write processing is performed on the VBV_buffer 11b and VBV_WP passes VBV_UB, VBV_WP will wrap around and be set to VBV_LB. In this case, the hierarchical relation between VBV_WP and VBV_RP is reversed.

The following is an explanation about an operation performed by the video codec 102 constructed as described so far. The explanation is mainly given as to the following cases (a) and (b).

(a) The video encode/decode operation unit 124 decodes the bitstream read from the encoded-video recorder 13 via the B/IF 122, then outputs the video signal obtained through the decoding to the video I/O unit 14 via the P/IF 123. Hereafter, this process flow will be referred to simply as the "decoding operation".

(b) The video encode/decode operation unit 124 encodes the video signal inputted from the video I/O unit 14 via the P/IF 123 into the bitstream, then writes the bitstream obtained through the encoding into the encoded-video recorder 13 via the B/IF 122. Hereafter, this process flow will be referred to simply as the "encoding operation".

FIG. 4 is a flowchart showing the decoding operation performed by the video codec 102 of the first embodiment.

As shown in this flowchart, the DMAC 128 controls the B/IF 122 to write the bitstream read from the encoded-video recorder 13 into the IO buffer 125 (step S11). Then, the DMAC 128 executes one of the following (a) to (c) in accordance with a logic table 140 (see FIG. 5) (step S111).

(a) The DMAC 128 controls the bus control unit 121 to write the bitstream read from the IO buffer 125 into the VBV buffer 11b (step S12). Moreover, the DMAC 128 controls the bus control unit 121 to write the bitstream read from the VBV buffer 11b into the OP buffer 126 (step S13).

(b) The DMAC 128 directly writes the bitstream read from the IO buffer 125 into the OP buffer 126 (step S112).

(c) The DMAC 128 directly writes the bitstream read from the IO buffer 125 into the OP buffer 126 (step S113). Moreover, the DMAC 128 controls the bus control unit 121 to write the bitstream read from the IO buffer 125 into the VBV buffer 11b (step S114).

After one of the above (a) to (c) is executed, the DMAC 128 performs the following steps of: decoding the bitstream read from the OP buffer 126 into the video signal using the video encode/decode operation unit 124 (step S14); controlling the bus control unit 121 to write the video signal decoded from the bitstream by the video encode/decode operation unit 124 into the frame memory 11a (step S15); controlling the bus control unit 121 to write the video signal read from the frame memory 11a into the video data buffer 127 (step S16); and controlling the P/IF 123 to output the video signal read from the video data buffer 127 to the video I/O unit 14 (step S17).

FIG. 5 shows the logic table 140 related to the state transition in a case where the video codec 102 of the first embodiment performs the decoding operation. The logic table 140 shows a state in a column 141, a hold state of the VBV buffer 11b in a column 142, a hold state of the OP buffer 126 in a column 143, a hold state of the IO buffer 125 in a column 144, a transfer path from the B/IF 122 to the video encode/decode operation unit 124 in a column 145, transition of the pointers of the IO buffer 125 in a column 146, transition of the pointers of the VBV buffer 11b in a column 147, and transition of the pointers of the OP buffer 126 in a column 148.

In this table, "VBVB" indicates the VBV buffer 11b, "OPB" indicates the OP buffer 126, and "IOB" indicates the IO buffer 125. Moreover, "NULL" indicates the buffer in question is null while "!NULL" indicates it is not null. "FULL" indicates the buffer in question is full while "!FULL" indicates it is not full. "OW" indicates the buffer in question has been overwritten while "!OW" indicates it has not been overwritten.

FIG. 6 is a flowchart showing the encoding operation performed by the video codec 102 of the first embodiment. As shown in this flowchart, the DMAC 128 executes the following steps of: controlling the P/IF 123 to write the video signal inputted from the video I/O unit 14 into the video data buffer 127 (step S21); controlling the bus control unit 121 to write the video signal read from the video data buffer 127 into the frame memory 11a (step S22); controlling the bus control unit 121 to encode the video signal read from the frame memory 11a into the bitstream using the video encode/decode operation unit 124 (step S23); and writing the bitstream encoded from the video signal by the video encode/decode operation unit 124 into the OP buffer 126 (step S24). Then, the DMAC 128 executes one of the following (a) to (c) in accordance with a logic table 150 (see FIG. 7) (step S121).

(a) The DMAC 128 controls the bus control unit 121 to write the bitstream read from the OP buffer 126 into the VBV buffer 11b (step S125). Moreover, the DMAC 128 controls the bus control unit 121 to write the bitstream read from the VBV buffer 11b into the IO buffer 125 (step S26).

(b) The DMAC 128 directly writes the bitstream read from the OP buffer 126 into the IO buffer 125 (step S122).

(c) The DMAC 128 directly writes the bitstream read from the OP buffer 126 into the IO buffer 125 (step S123). Moreover, the DMAC 128 controls the bus control unit 121 to write the bitstream read from the OP buffer 126 into the VBV buffer 11b (step S124).

After one of the above (a) to (c) is executed, the DMAC 128 controls the B/IF 122 to write the bitstream read from the IO buffer 125 into the encoded-video recorder 13 (step S27).

FIG. 7 shows the logic table 150 related to the state transition in a case where the video codec 102 of the first embodiment performs the encoding operation. The logic table 150 shows a state in a column 151, a hold state of the VBV buffer 11b in a column 152, a hold state of the IO buffer 125 in a column 153, a hold state of the OP buffer 126 in a column 154, a transfer path from the video encode/decode operation unit 124 to the B/IF 122 in a column 155, transition of the pointers of the OP buffer 126 in a column 156, transition of the pointers of the VBV buffer 11b in a column 157, and transition of the pointers of the IO buffer 125 in a column 158.

The following describes an example of an operation performed by the video codec 102 of the first embodiment. As can be understood by comparison between the logic tables 140 and 150, the transfer path taken in the encoding operation is the reverse of the transfer path taken in the decoding operation. For the sake of simplicity, an explanation is given only as to the case of the decoding operation, and the case of the encoding operation is omitted.

Figure 8:
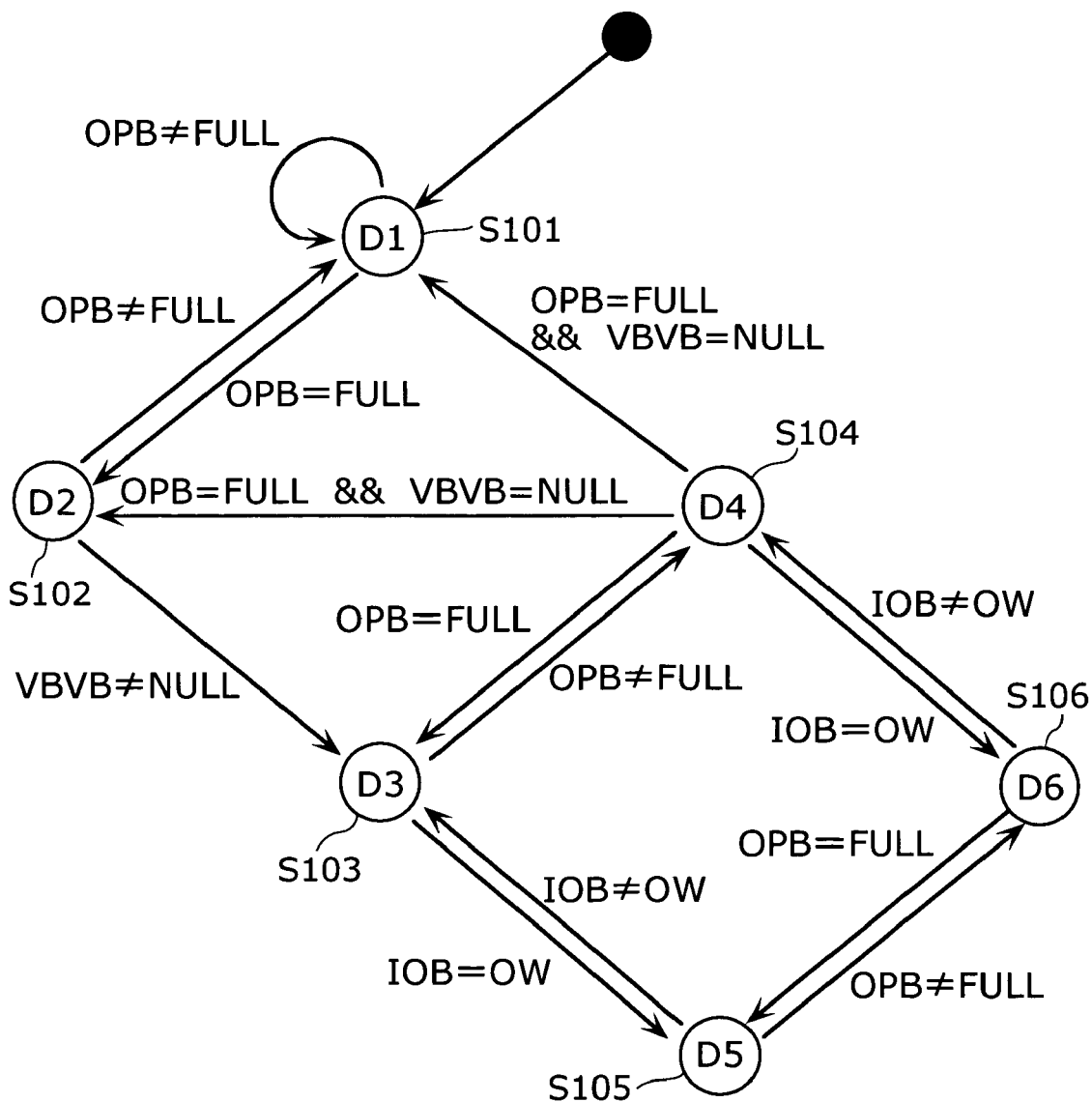
FIG. 8 is a state machine diagram showing the state transition in a case where the video codec of the first embodiment performs the decoding operation.

FIG. 8 is a state machine diagram showing the state transition in a case where the video codec 102 of the first embodiment performs the decoding operation.

First, a transition takes place from an initial state to a state D1, as shown in FIG. 8. In the state D1, if the OP buffer 126 is not full, i.e., OPB≠FULL, the state goes to the same state, the state D1. On the other hand, if the OP buffer 126 is full, i.e., OPB=FULL, the state goes to a state D2.

In the state D2, if the VBV buffer 11b is not null, i.e., VBVB≠NULL, the state goes to a state D3. If the OP buffer 126 is not full, i.e., OPB≠FULL, the state goes to the state D1.

In the state D3, if the OP buffer 126 is not full, i.e., OPB≠FULL, the state goes to a state D4. If the IO buffer 125 has been overwritten, i.e., IOB=OW, the state goes to a state D5.

In the state D4, if the IO buffer 125 has been overwritten, i.e., IOB=OW, the state goes to a state D6. If the OP buffer 126 is full, i.e., OPB=FULL, the state goes to the state D3. If the OP buffer 126 is not full and the VBV buffer 1b is null, i.e., (OPB≠FULL && VBVB=NULL, the state goes to the state D1.

In the state D5, if the OP buffer 126 is not full, i.e., OPB≠FULL, the state goes to the state D6. If the IO buffer 125 has been overwritten, i.e., IOB=OW, the state goes to the state D3.

In the state D6, if the OP buffer 126 is full, i.e., OPB=FULL, the state goes to the state D5. If the IO buffer 125 has not been overwritten, i.e., IOB≠OW, the state goes to the state D4.

FIGS. 9 to 24 are rough schemas showing address transitions of the IO buffer 125, the OP buffer 126, and the VBV buffer 11b in the states D1 to D6.

Note that rectangular boxes drawn in a thick line represent the buffers 125, 126, and 11b in these figures. Also note in these figures that black triangles drawn outside the buffers indicate the write pointers, which are VBV_WP, IO_WP, and OP_WP, and that white triangles indicate the readout pointers, which are VBV_RP, IO_RP, and OP_RP.

As to the IO buffer 125 shown in these figures, each white triangle with a numeric character "1" inside indicates a first readout pointer, which is IO_RP1, and each white triangle with a numeric character "2" inside indicates a second readout pointer, which is IO_RP2. A black arrow indicates that the data has been written while a white arrow indicates that the data has been read out.

Note that if a black triangle is drawn on the left of a white triangle, this indicates that the pointer represented by the black triangle is going to pass the pointer represented by the white triangle. A part which has been overwritten as a result of this passing is drawn in sloped lines.

As shown in FIGS. 9 and 10, the IO buffer 125 and the OP buffer 126 are not full and the VBV buffer 11b is null (see FIG. 9A) in the state D1 (see FIGS. 5 and 8). Thus, the DMAC 128 controls the B/IF 122 to write the bitstream read from the encoded-video recorder 13 into the IO buffer 125. Following this, the IO buffer 125 advances IO_WP by the size of the written bitstream (see FIG. 9B).

Moreover, the DMAC 128 writes the bitstream read from the IO buffer 125 into the OP buffer 126. Following this, the IO buffer 125 advances IO_RP1 and IO_RP2 by the size of the read bitstream and the OP buffer 126 advances OP_WP by the size of the written bitstream (see FIG. 10A).

The DMAC 128 then controls the video encode/decode operation unit 124 to read the bitstream from the OP buffer 126. Following this, the OP buffer 126 advances OP_RP by the size of the read bitstream (see FIG. 10B).

Figures 11A, 11B:
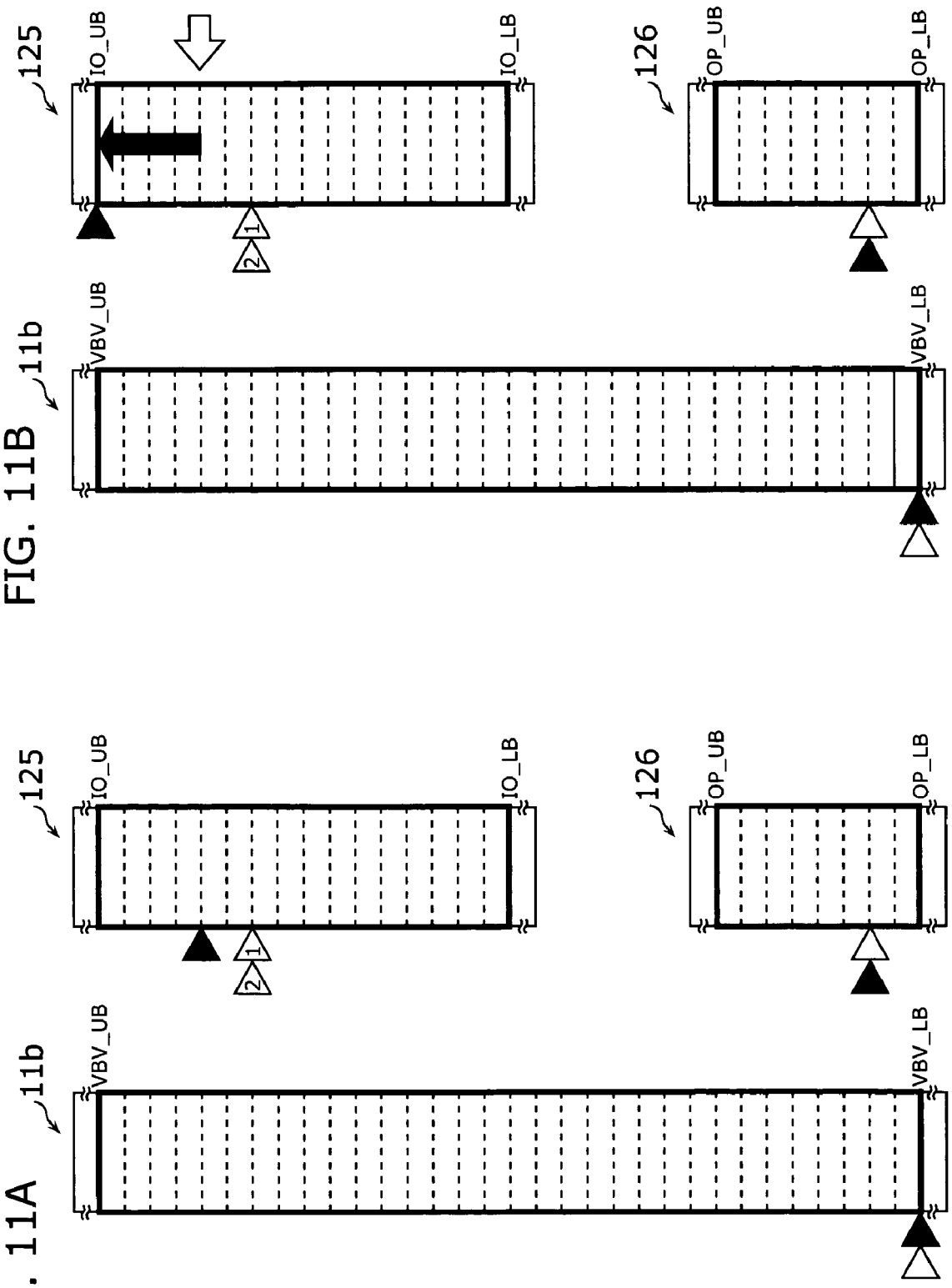
FIG. 11 is a first rough schema showing address transitions of the IO buffer, the OP buffer, and the VBV buffer in a state D2.
Figure 13:
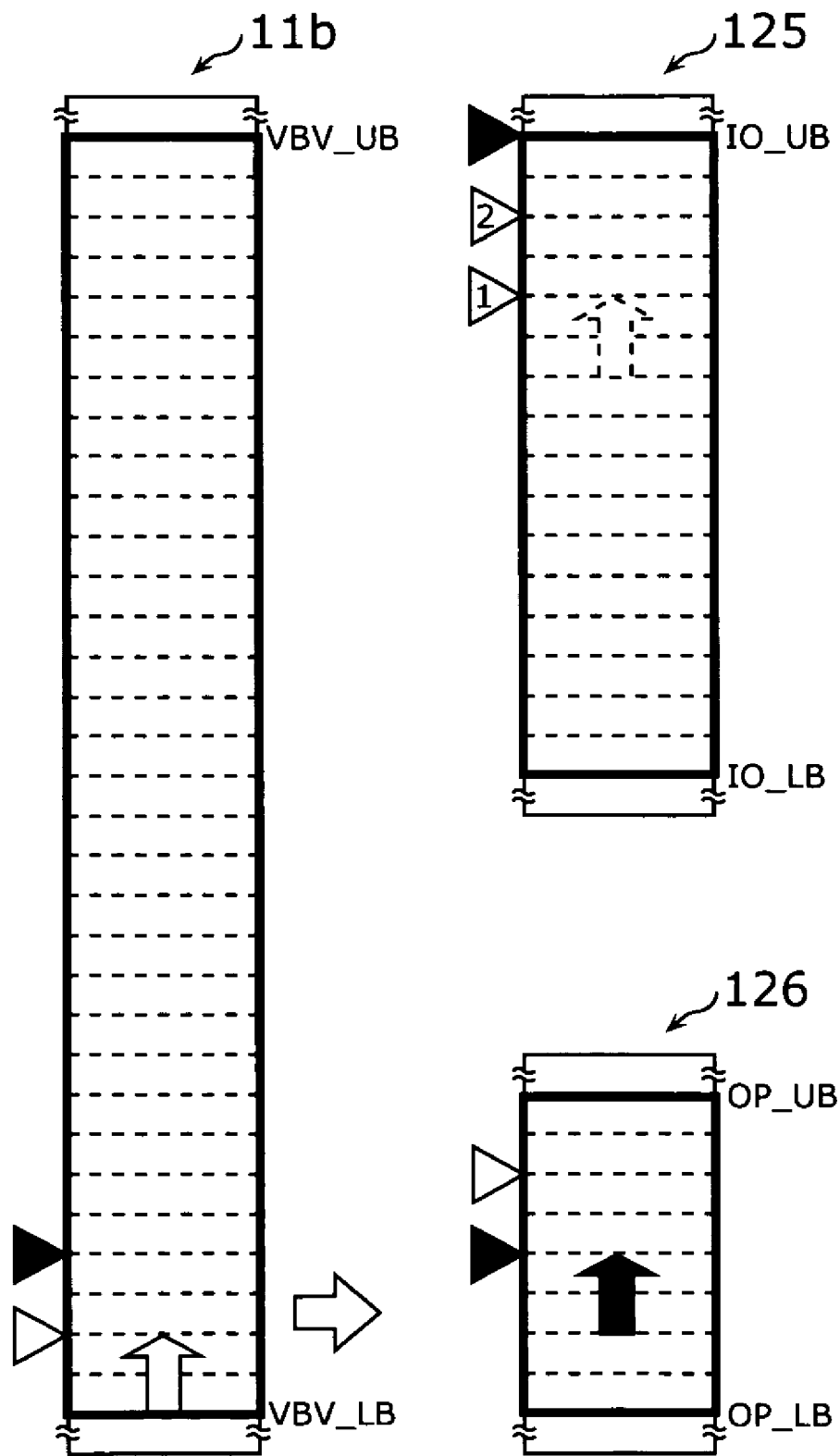
FIG. 13 is a third rough schema showing address transitions of the IO buffer, the OP buffer, and the VBV buffer in the state D2.

As shown in FIGS. 11 to 13, the IO buffer 125 is not full, but the OP buffer 126 is full, and the VBV buffer 11b is null (see FIG. 11A) in the state D2 (see FIGS. 5 and 8). Thus, the DMAC 128 controls the B/IF 122 to write the bitstream read from the encoded-video recorder 13 into the IO buffer 125. Following this, the IO buffer 125 advances IO_WP by the size of the written bitstream (see FIG. 11B).

Moreover, the DMAC 128 controls the bus control unit 121 to write the bitstream read from the IO buffer 125 into the VBV buffer 11b. Following this, the IO buffer 125 advances IO_RP2 by the size of the written bitstream and the bus control unit 121 advances VBV_WP by the size of the written bitstream (see FIG. 12A).

The DMAC 128 then controls the video encode/decode operation unit 124 to read the bitstream from the OP buffer 126. Following this, the OP buffer 126 advances OP_RP by the size of the read bitstream (see FIG. 12B).

Furthermore, the DMAC 128 controls the bus control unit 121 to write the bitstream read from the VBV buffer 11b into the OP buffer 126. Following this, the bus control unit 121 advances VBV_RP by the size of the read bitstream and the OP buffer 126 advances OP_WP by the size of the written bitstream (see FIG. 13). Here, the IO buffer 125 also advances IO_RP1 by the size of the bitstream written into the OP buffer 126. To be more specific, the bitstream written into the OP buffer 126, that is, the part indicated by the black arrow in the OP buffer 126 corresponds to the part indicated by the white arrow in a dashed line in the IO buffer 125.

Figures 14A, 14B:
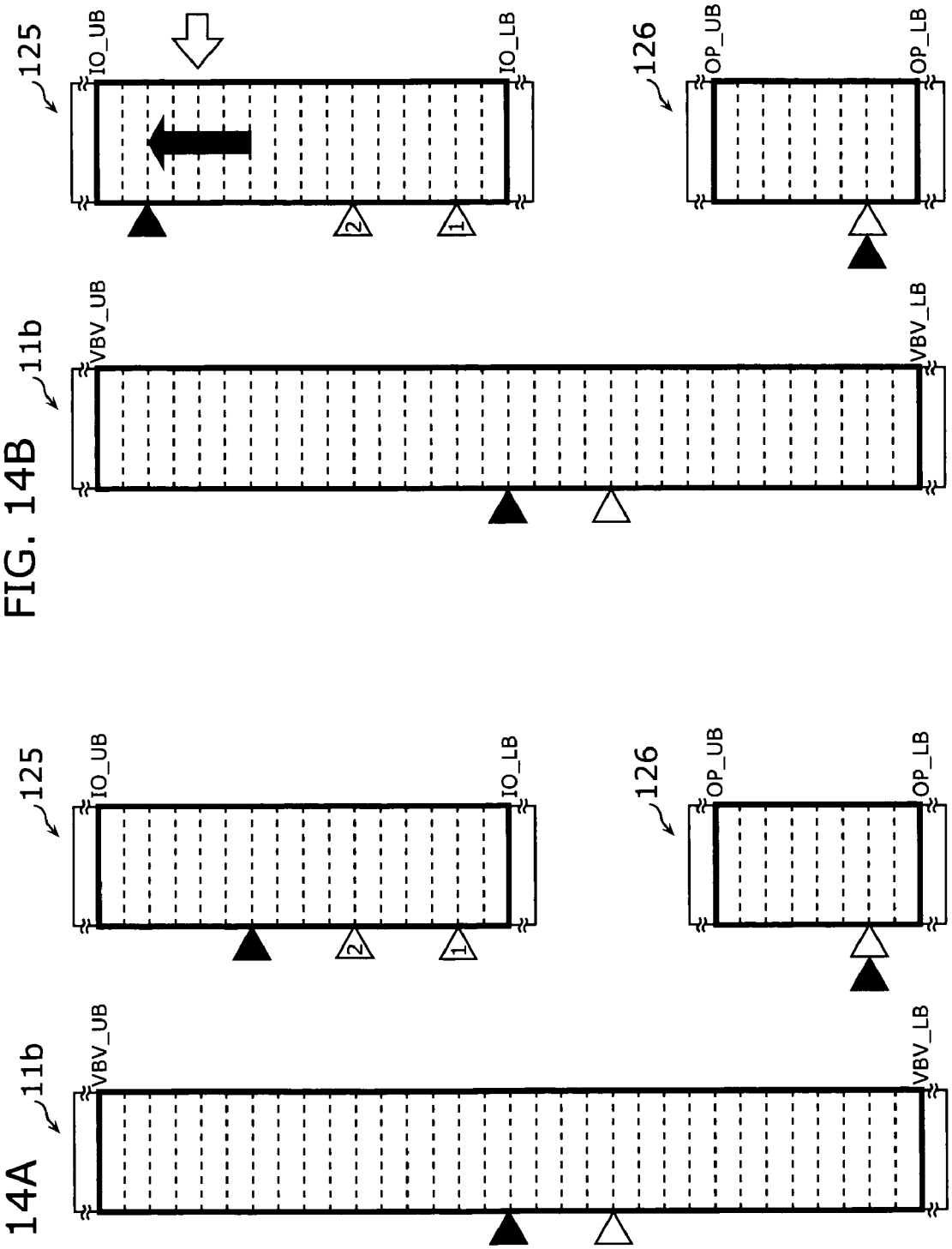
FIG. 14 is a first rough schema showing address transitions of the IO buffer, the OP buffer, and the VBV buffer in a state D3.
Figure 16:
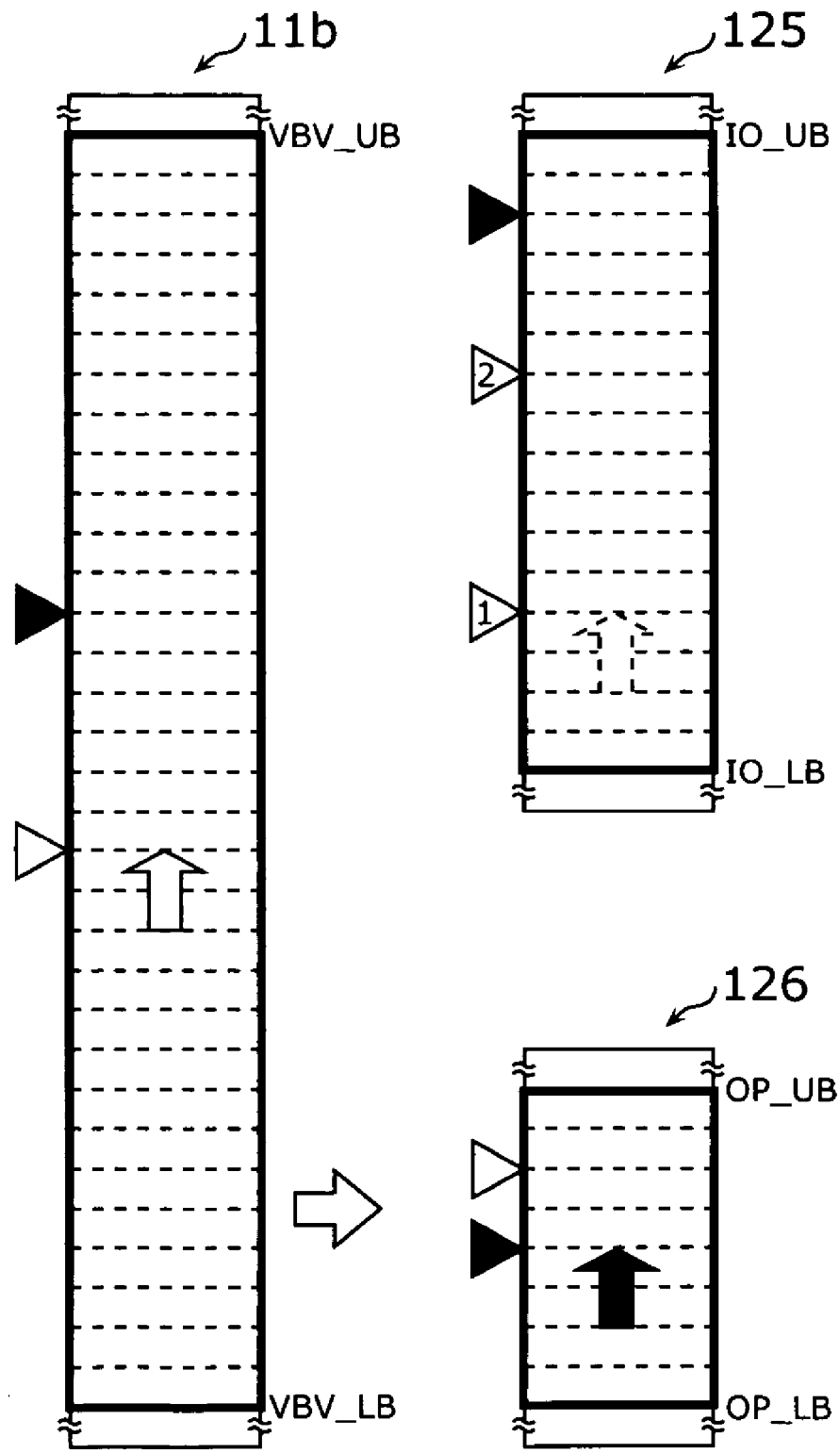
FIG. 16 is a third rough schema showing address transitions of the IO buffer, the OP buffer, and the VBV buffer in the state D3.
Figure 18B:
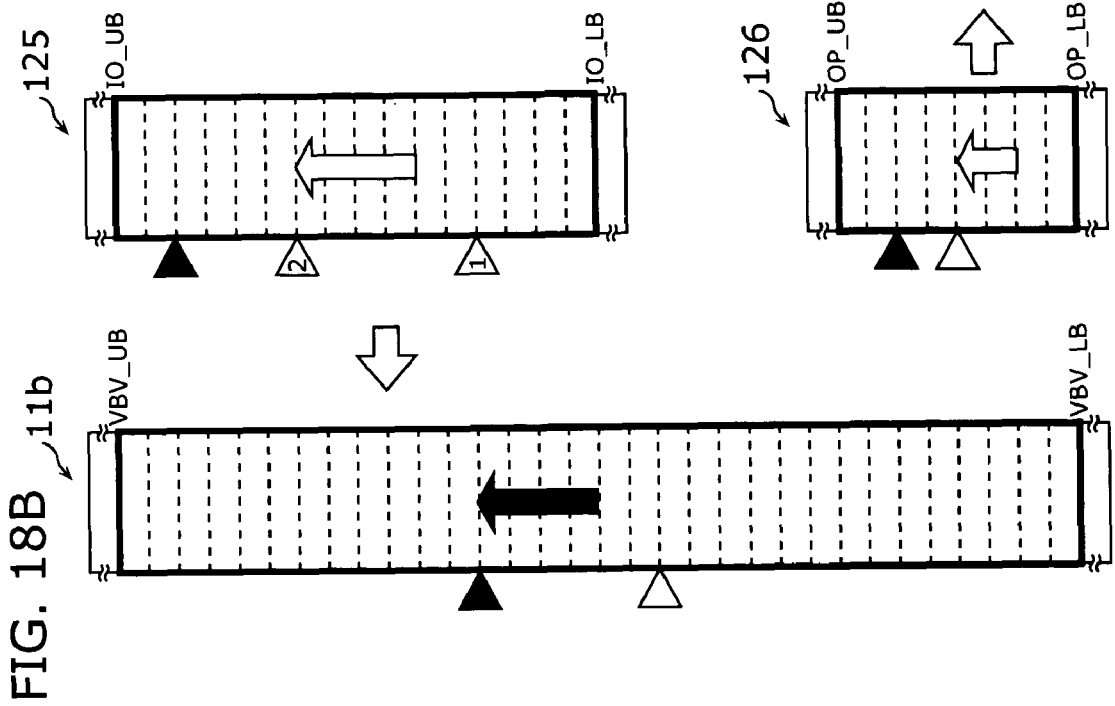
FIG. 18 is a second rough schema showing address transitions of the IO buffer, the OP buffer, and the VBV buffer in the state D4.
Figure 18A:
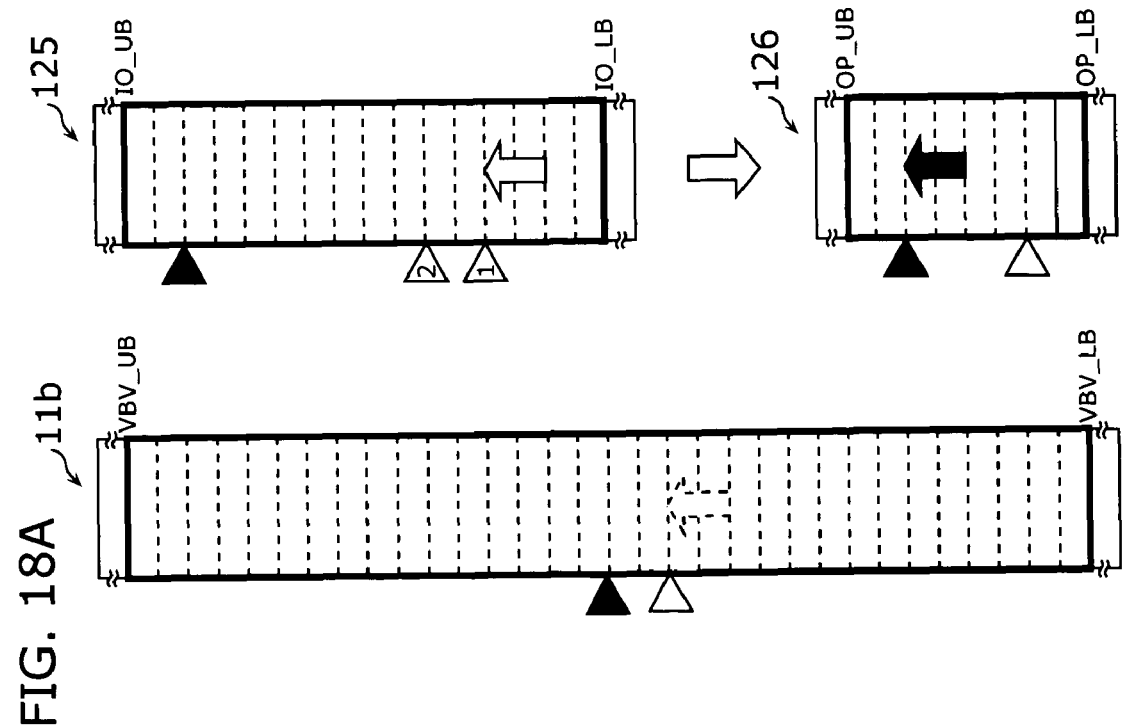

As shown in FIGS. 14 to 16, the IO buffer 125 is not full, but the OP buffer 126 is full, and the VBV buffer 11b is not null (see FIG. 14A) in the state D3 (see FIGS. 5 and 8). Thus, the DMAC 128 controls the B/IF 122 to write the bitstream read from the encoded-video recorder 13 into the IO buffer 125. Following this, the IO buffer 125 advances IO_WP by the size of the written bitstream (see FIG. 14B).

Moreover, the DMAC 128 controls the bus control unit 121 to write the bitstream read from the IO buffer 125 into the VBV buffer 11b. Following this, the IO buffer 125 advances IO_RP2 by the size of the read bitstream and the bus control unit 121 advances VBV_WP by the size of the written bitstream (see FIG. 15A).

The DMAC 128 then controls the video encode/decode operation unit 124 to read the bitstream from the OP buffer 126. Following this, the OP buffer 126 advances OP_RP by the size of the read bitstream (see FIG. 15B).

Furthermore, the DMAC 128 controls the bus control unit 121 to write the bitstream read from the VBV buffer 11b into the OP buffer 126. Then, the bus control unit 121 advances VBV_RP by the size of the read bitstream and the OP buffer 126 advances OP_WP by the size of the written bitstream (see FIG. 16). Here, the IO buffer 125 also advances IO_RP1 by the size of the bitstream written into the OP buffer 126. To be more specific, the bitstream written into the OP buffer 126, that is, the part indicated by the black arrow in the OP buffer 126 corresponds to the part indicated by the white arrow in a dashed line in the IO buffer 125.

As shown in FIGS. 17 and 18, the IO buffer 125 and the OP buffer 126 are not full and the VBV buffer 11b is not null (see FIG. 17A) in the state D4 (see FIGS. 5 and 8). Thus, the DMAC 128 controls the B/IF 122 to write the bitstream read from the encoded-video recorder 13 into the IO buffer 125. Following this, the IO buffer 125 advances IO_WP by the size of the written bitstream (see FIG. 17B).

Moreover, the DMAC 128 directly writes the bitstream read from the remaining area instead of the VBV buffer 11b into the OP buffer 126. Following this, the IO buffer 125 advances IO_RP1 by the size of the read bitstream and the OP buffer 126 advances OP_WP by the size of the written bitstream (see FIG. 18A). Here, the bus control unit 121 also advances VBV_RP by the size of the bitstream written into the OP buffer 126. The bitstream written into the OP buffer 126, that is, the part indicated by the black arrow in the OP buffer 126 corresponds to the part indicated by the white arrow in a dashed line in the VBV buffer 11b.

Furthermore, the DMAC 128 controls the bus control unit 121 to write the bitstream read from the IO buffer 125 into the VBV buffer 11b. Following this, the IO buffer 125 advances IO_RP2 by the size of the read bitstream, and the bus control unit 121 advances VBV_WP by the size of the written bitstream. The DMAC 128 then controls the video encode/decode operation unit 124 to read the bitstream from the OP buffer 126. Following this, the OP buffer 126 advances OP_RP by the size of the read bitstream (see FIG. 18B).

Figure 21:
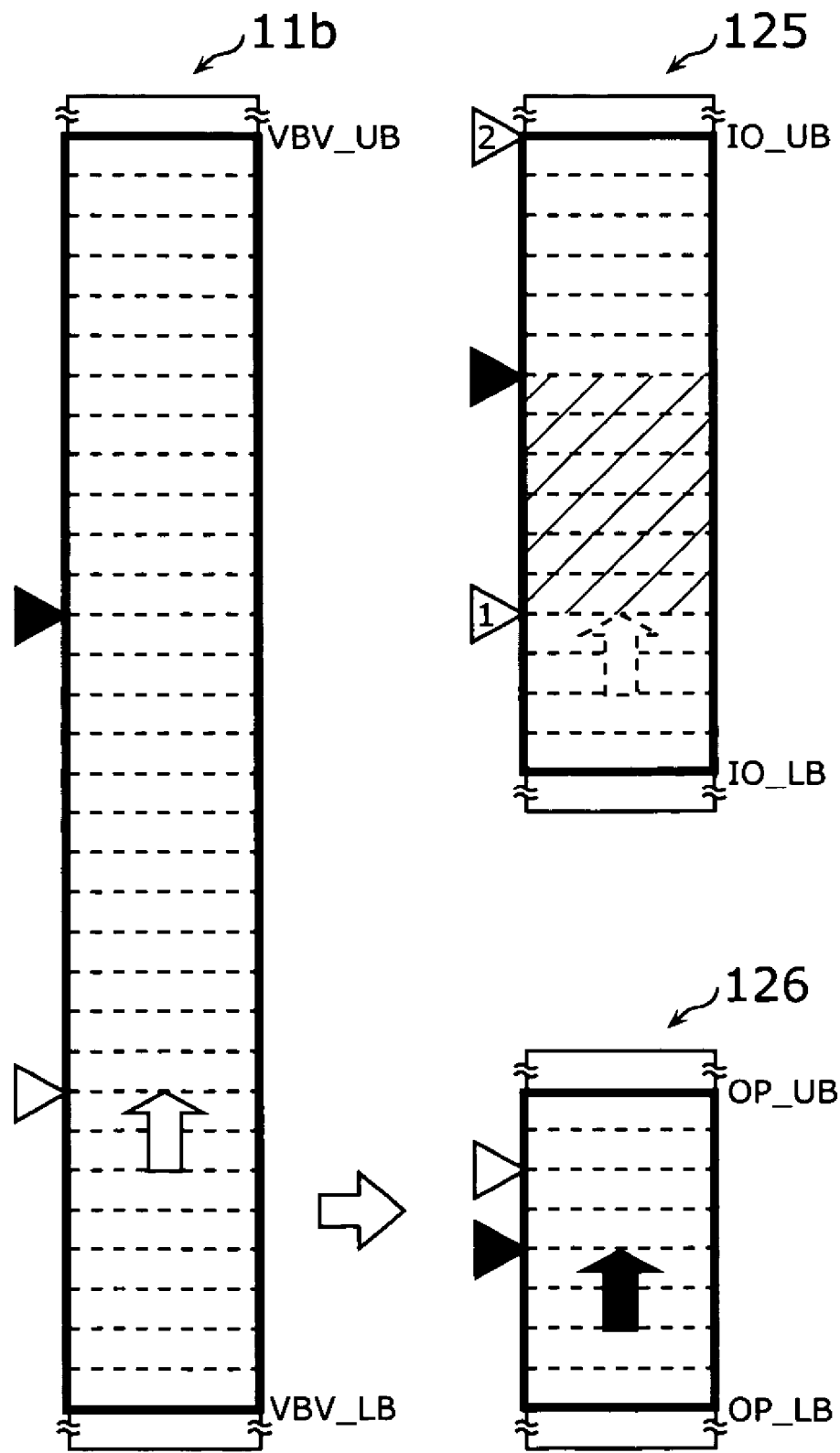
FIG. 21 is a third rough schema showing address transitions of the IO buffer, the OP buffer, and the VBV buffer in the state D5.

As shown in FIGS. 19 to 21: the IO buffer 125 has an area which has been overwritten; the OP buffer 126 is full; and the VBV buffer 11b is not null (see FIG. 19A), in the state D5 (see FIGS. 5 and 8). Thus, the DMAC 128 controls the B/IF 122 to write the bitstream read from the encoded-video recorder 13 into the IO buffer 125. Following this, the IO buffer 125 advances IO_WP by the size of the written bitstream (see FIG. 19B)

Moreover, the DMAC 128 controls the bus control unit 121 to write the bitstream read from the IO buffer 125 into the VBV buffer 1b. Following this, the IO buffer 125 advances IO_RP2 by the size of the read bitstream and the bus control unit 121 advances VBV_WP by the size of the written bitstream (see FIG. 20A).

The DMAC 128 then controls the video encode/decode operation unit 124 to read the bitstream from the OP buffer 126. Following this, the OP buffer 126 advances OP_RP by the size of the read bitstream (see FIG. 20B).

Furthermore, the DMAC 128 controls the bus control unit 121 to write the bitstream read from the VBV buffer 11b into the OP buffer 126. Following this, the bus control unit 121 advances VBV_RP by the size of the read bitstream and the OP buffer 126 advances OP_WP by the size of the written bitstream (see FIG. 21). Here, the IO buffer 125 also advances IO_RP1 by the size of the bitstream written into the OP buffer 126. To be more specific, the bitstream written into the OP buffer 126, that is, the part indicated by the black arrow in the OP buffer 126 corresponds to the part indicated by the white arrow in a dashed line in the IO buffer 125.

Figure 22B:
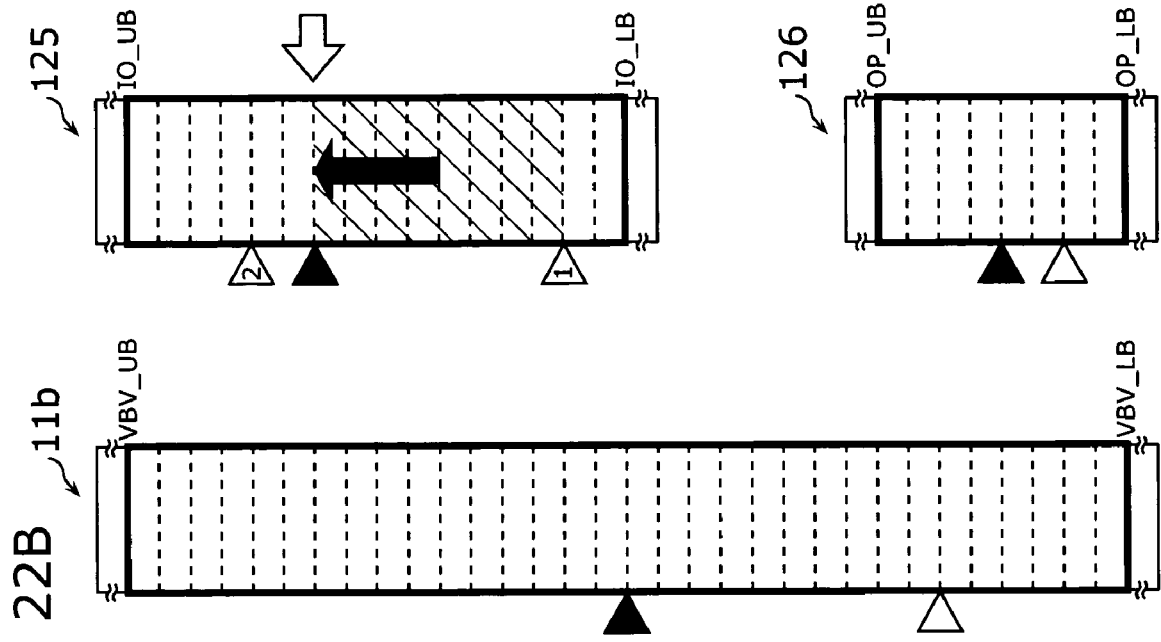
FIG. 22 is a first rough schema showing address transitions of the IO buffer, the OP buffer, and the VBV buffer in a state D6.
Figure 22A:
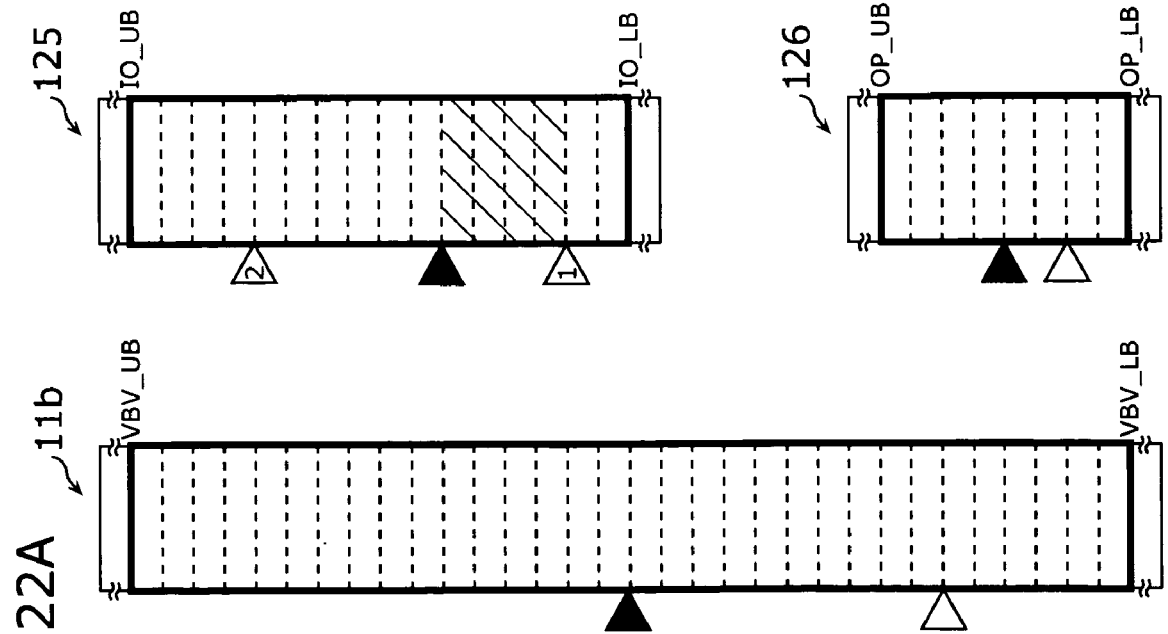
Figures 23A, 23B:
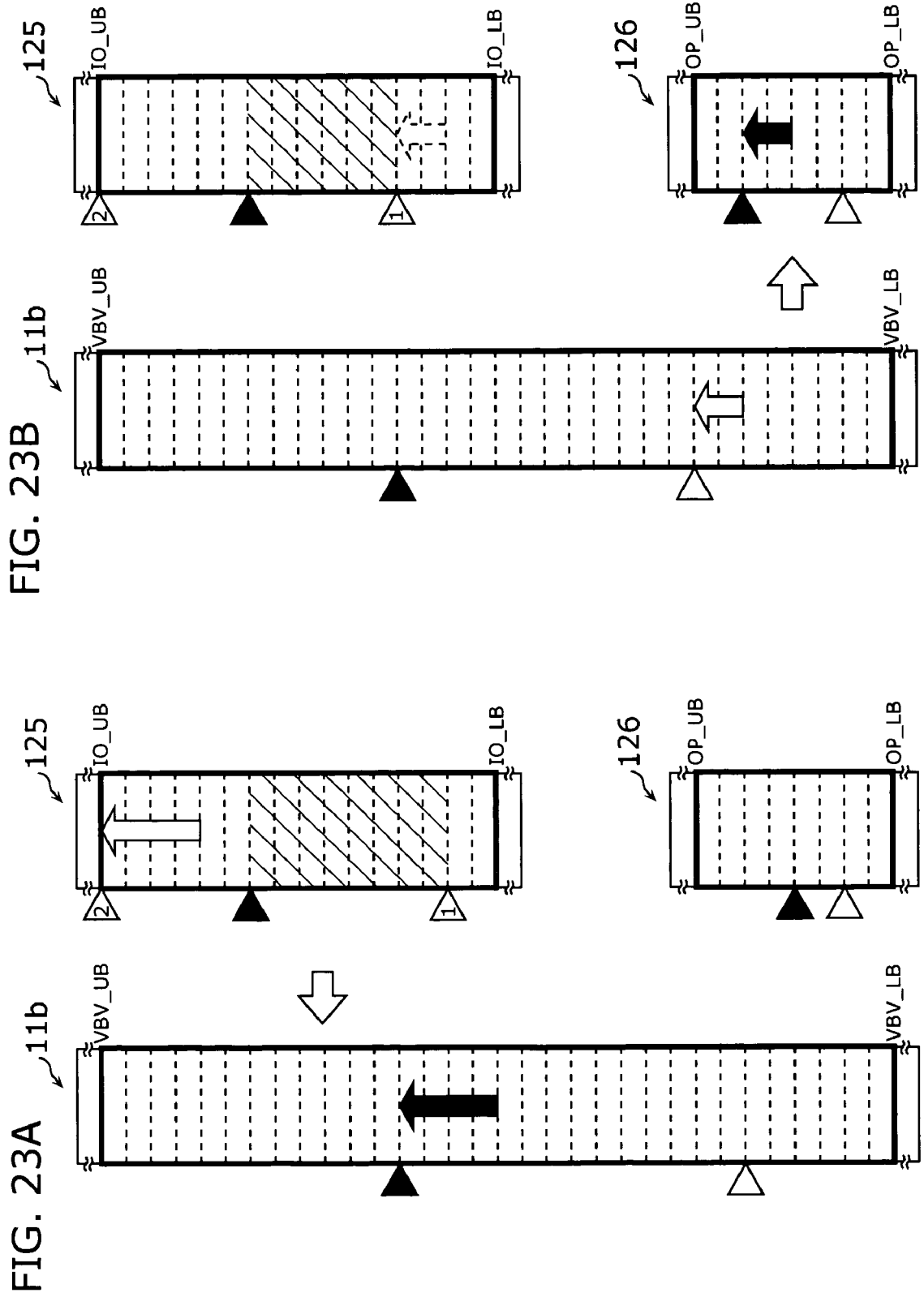
FIG. 23 is a second rough schema showing address transitions of the IO buffer, the OP buffer, and the VBV buffer in the state D6.
Figure 24:
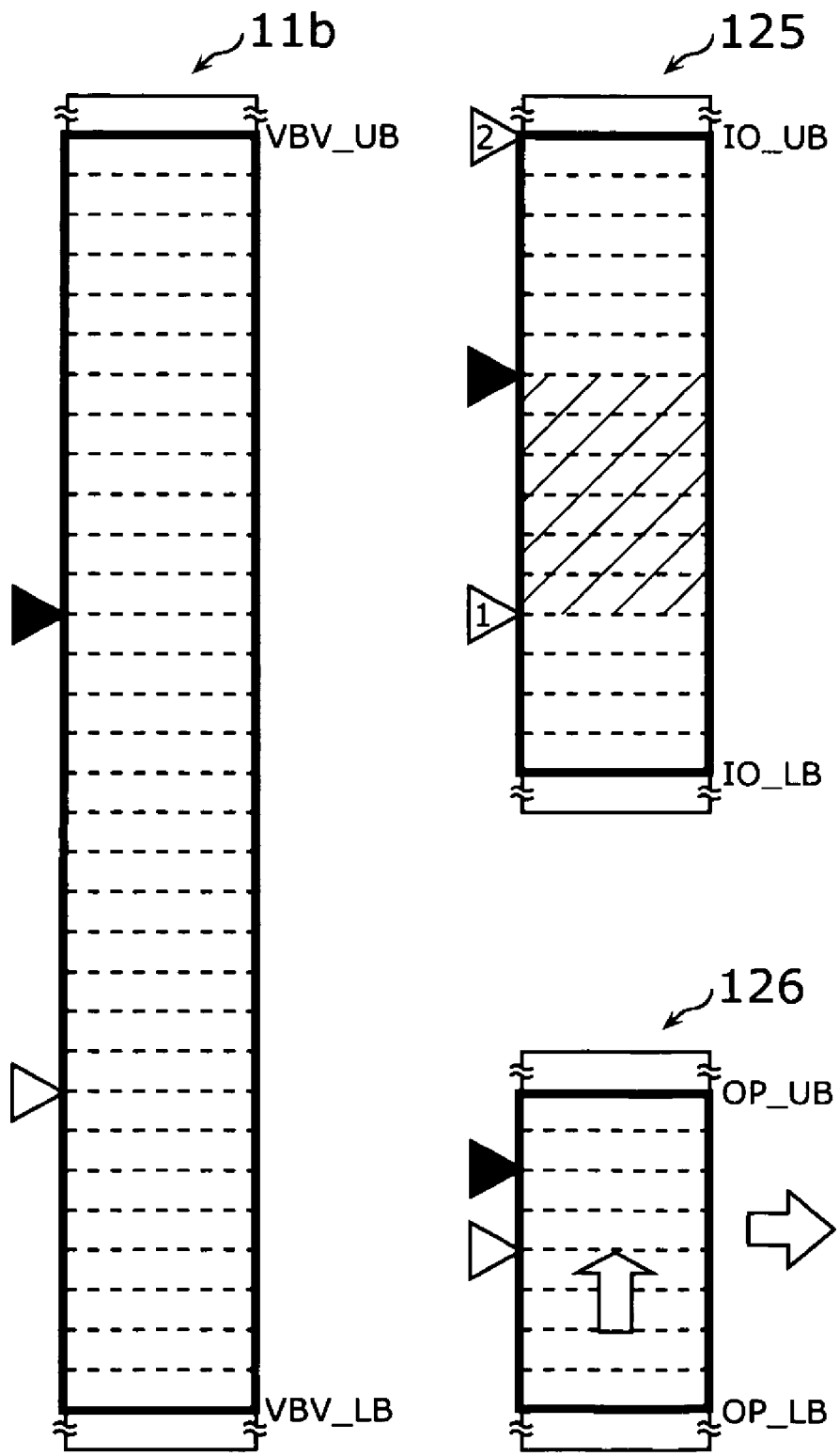
FIG. 24 is a third rough schema showing address transitions of the IO buffer, the OP buffer, and the VBV buffer in the state D6.

As shown in FIGS. 22 to 24: the IO buffer 125 has an area which has been overwritten; the OP buffer 126 is not full; and the VBV buffer 11b is not null (see FIG. 22A), in the state D6 (see FIGS. 5 and 8). Thus, the DMAC 128 controls the B/IF 122 to write the bitstream read from the encoded-video recorder 13 into the IO buffer 125. Following this, the IO buffer 125 advances IO_WP by the size of the written bitstream (see FIG. 22B).

Moreover, the DMAC 128 controls the bus control unit 121 to write the bitstream read from the IO buffer 125 into the VBV buffer 11b. Following this, the IO buffer 125 advances IO_RP2 by the size of the read bitstream and the bus control unit 121 advances VBV_WP by the size of the written bitstream (see FIG. 23A).

Furthermore, the DMAC 128 controls the bus control unit 121 to write the bitstream read from the VBV buffer 11b into the OP buffer 126. Following this, the bus control unit 121 advances VBV_RP by the size of the read bitstream, and the OP buffer 126 advances OP_WP by the size of the written bitstream (see FIG. 23B). Here, the IO buffer 125 also advances IO_RP1 by the size of the bitstream written into the OP buffer 126. To be more specific, the bitstream written into the OP buffer 126, that is, the part indicated by the black arrow in the OP buffer 126 corresponds to the part indicated by the white arrow in a dashed line in the IO buffer 125.

The DMAC 128 then controls the video encode/decode operation unit 124 to read the bitstream from the OP buffer 126. Following this, the OP buffer 126 advances OP_RP by the size of the read bitstream (see FIG. 24).

Note that, in the state D6, the bitstream read from the encoded-video recorder 13 may be written into the IO buffer 125, and the bitstream read from the IO buffer 125 may be written into the VBV buffer 11b. Also note that the bitstream read from the VBV buffer 11b may be written into the OP buffer 126, and the bitstream may be outputted from the OP buffer 126 to the video encode/decode operation unit 124.

As shown in FIGS. 21 and 23B, if the amount of bitstream read from the IO buffer 125 exceeds the amount of bitstream written into the IO buffer 125, the remaining area is overwritten.

As described so far, according to the video codec 102 of the first embodiment, the bitstream read from the IO buffer 125 bypasses the VBV buffer 11b and is directly written into the OP buffer 126 in the states D1 and D4. Consequently, the data transfer between the main memory 11 and the video codec 102, which is considered to be the bottleneck in performance gain of the video codec system, can be reduced.

Second Embodiment

Next, a second embodiment of the present invention is described, with reference to the drawings. It should be noted here that the same components as in the first embodiment will be given the same numerals and will not be explained in the present embodiment.

A video codec of the second embodiment of the present invention detects a transfer request signal using its DMAC. Here, the "transfer request signal" refers to a signal which requests a buffer temporarily storing a bitstream to transfer the bitstream.

Figure 25:
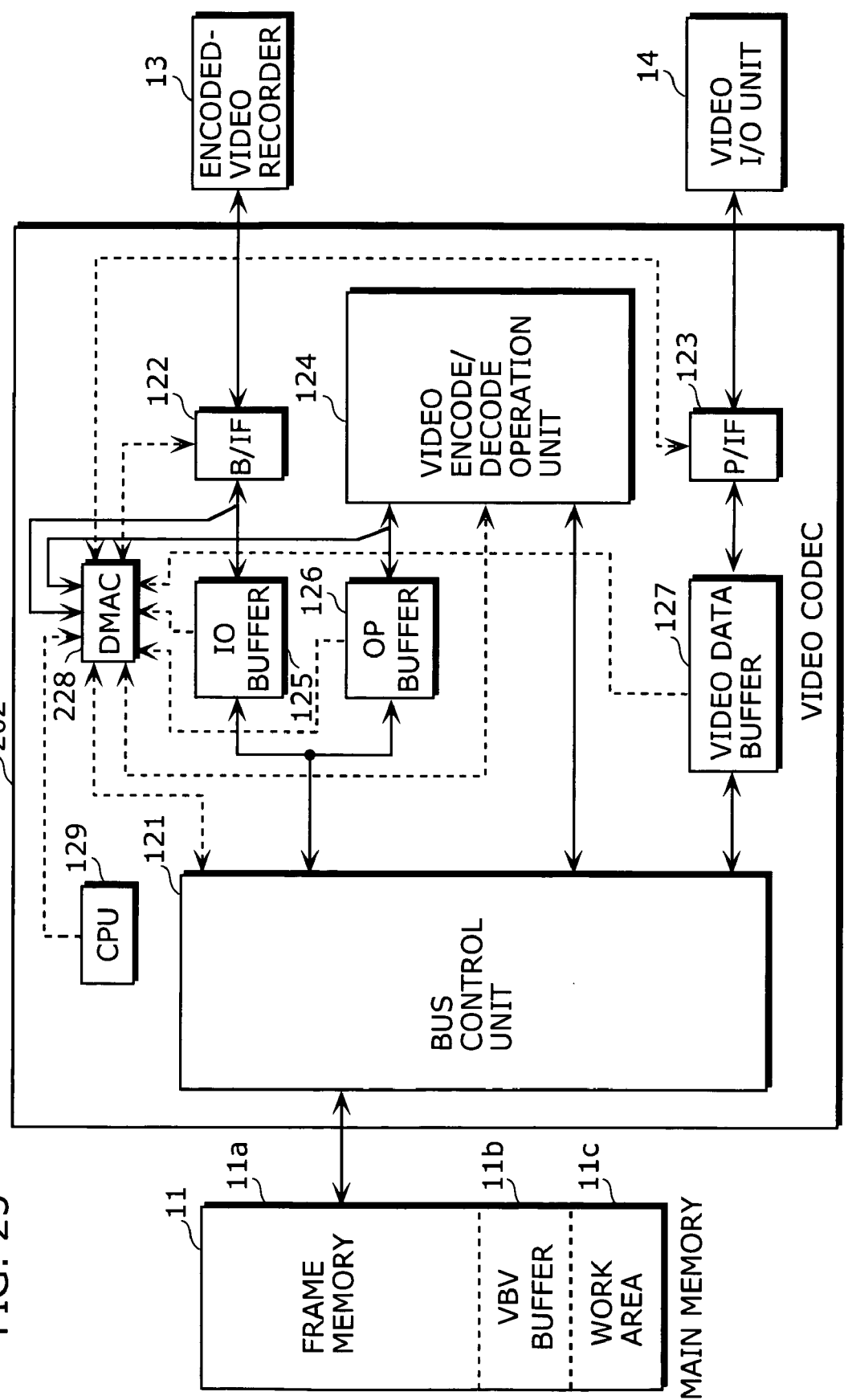
FIG. 25 is a block diagram showing a construction of a video codec system of a second embodiment.

FIG. 25 is a block diagram showing a construction of a video codec system 200 of a second embodiment. As shown in FIG. 25, the video codec system 200 is different from the video codec system 100 of the first embodiment in that the system 200 has a video codec 202 in place of the video codec 102.

The video codec 202 of the present embodiment is different from the video codec 102 (see FIG. 2) in that it is provided with a DMAC 228 in place of the DMAC 128. On comparison, the DMAC 228 is different from the DMAC 128 as described in the following (a) and (b).

(a) When the decoding operation is performed, the DMAC 228 considers that the OP buffer 126 is full. Then, when detecting the transfer request signal asserted from the video encode/decode operation unit 124 to the OP buffer 126, the DMAC 228 predicts that the OP buffer 126 will have free space in a next cycle.

(b) When the encoding operation is performed, the DMAC 228 considers that the IO buffer 125 is full. Then, when detecting the transfer request signal asserted from the B/IF 122 to the IO buffer 125, the DMAC 228 predicts that the IO buffer 125 will have free space in a next cycle.

According to the video codec 202 of the second embodiment as described so far, when the decoding operation is performed, the transfer will still be continued, without a free cycle, the moment at which the OP buffer 126 becomes not-full. Moreover, when the encoding operation is performed, the transfer will still be continued, without a free cycle, the moment at which the IO buffer 125 becomes not-full. Consequently, the substantial transfer rate can be increased.

It should be noted that in reality a time interval taken from assertion of the transfer request signal to the actual transfer may vary from one system to another. Accordingly, the control setting of the DMAC 228 will have to depend on this time interval.

Third Embodiment

Next, a third embodiment of the present invention is described, with reference to the drawings. It should be noted here that the same components as in the first embodiment will be given the same numerals and will not be explained in the present embodiment.

A video codec of the third embodiment of the present invention is provided with a buffer which is logically divided into two areas. The video codec is further provided with two selectors, and the buffer is placed between these two selectors.

Each of these selectors is connected to the buffer and the selectors are also connected to each other. Moreover, the selectors are controlled so as to choose either: a path going through the buffer; or a path bypassing the buffer.

Figure 26:
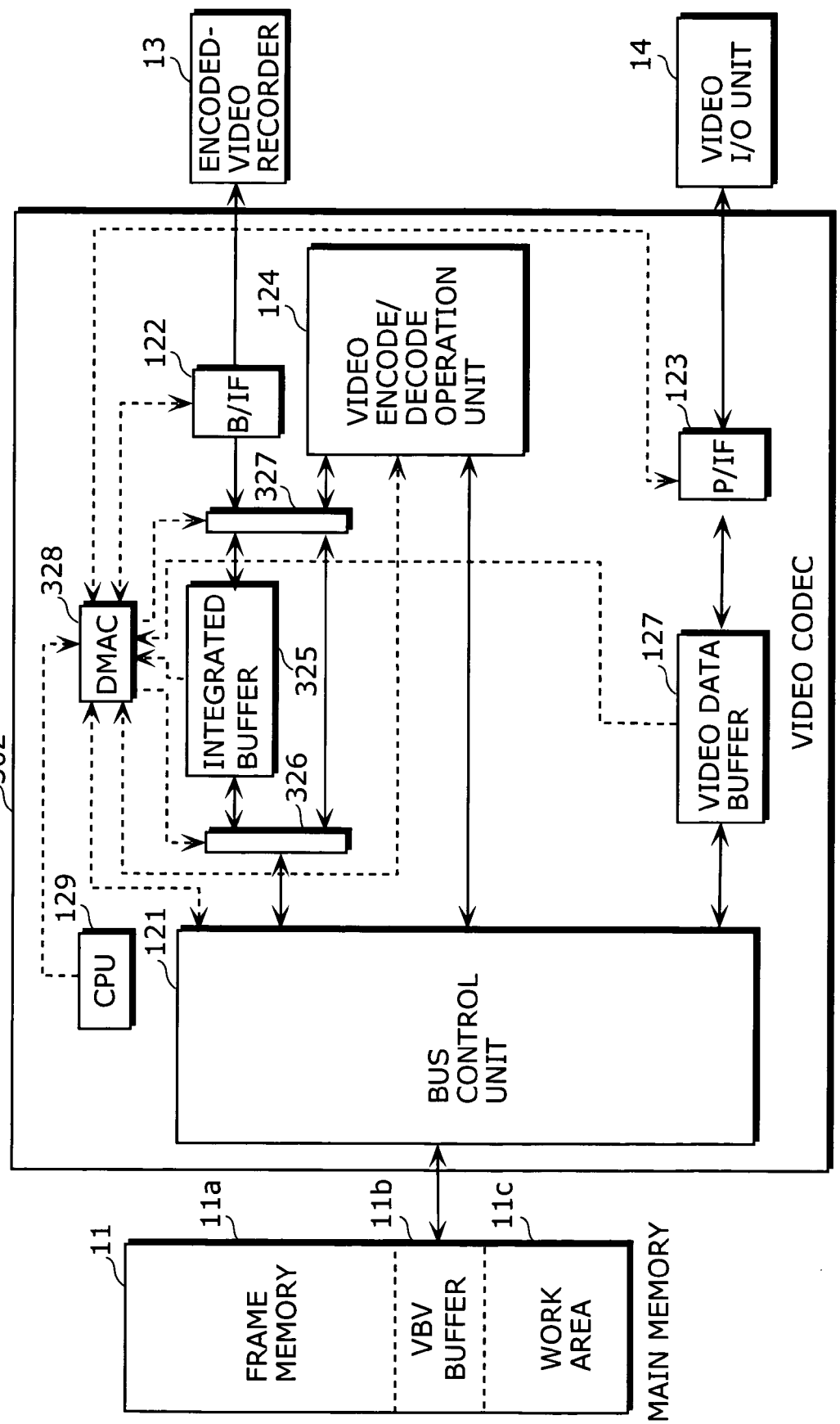
FIG. 26 is a block diagram showing a construction of a video codec system of a third embodiment.

FIG. 26 is a block diagram showing a construction of a video codec system 300 of the third embodiment. As shown in this diagram, the video codec system 300 is different from the video codec system 100 of the first embodiment in that the system 300 has a video codec 302 in place of the video codec 102.

On comparison, the video codec 302 is different from the video codec 102 (see FIG. 2) as described in the following (a) to (c).

(a) The video codec 302 is provided with an integrated buffer 325 in place of IO buffer 125 and the OP buffer 126. The integrated buffer 325 is physically formed as one buffer having two I/O ports, and is logically divided into an IO area and an OP area. The IO area is a buffer area which stores the bitstream transferred between the encoded-video recorder 13 and the main memory 11 according to the first-in first-out method. Meanwhile, the OP area is a buffer area which stores the bitstream transferred between the video encode/decode operation unit 124 and the main memory 11 according to the first-in first-out method.

(b) The video codec 302 is newly provided with selecting units 326 and 327. Under the control of a DMAC 328, the selecting units 326 and 327 select from among transfer paths led to the bus control unit 121, the B/IF 122, and the video encode/decode operation unit 124.

(c) The video codec 302 is provided with the DMAC 328 in place of the DMAC 128. The DMAC 328 controls the selecting units 326 and 327 in accordance with free space of the integrated buffer 325.

FIG. 27A is a diagram showing the internal connection of the selecting unit 326 which is connected to the bus control unit 121. FIG. 27B shows an example of a hardware construction of the selecting unit 326. FIG. 27C is a diagram showing the internal connection of the selecting unit 327 which is connected to the B/IF 122 and the video encode/decode operation unit 124. FIG. 27D shows an example of a hardware construction of the selecting unit 327.

For establishing connection, the selecting unit 326 selects two out of the bus control unit 121, the integrated buffer 325, and the selecting unit 327. As shown in FIG. 27A, the selecting unit 326 has a full mesh connection as the internal connection so as to be connected to the selected two.

The example in FIG. 27B shows that the selecting unit 326 is composed of transfer gates 326a, 326b, and 326c. Using the three transfer gates, the transfer paths are accordingly selected.

Regarding the transfer gate 326a, one end is connected to the bus control unit 121 and the other is connected to the integrated buffer 325. Moreover, a gate terminal of the transfer gate 326a is connected to the DMAC 328. Under the control of the DMAC 328, the transfer gate 326a brings a conduction state between the bus control unit 121 and the integrated buffer 325 either into conduction or out of conduction.

Regarding the transfer gate 326b, one end is connected to the bus control unit 121 and the other is connected to the selecting unit 327. Moreover, a gate terminal of the transfer gate 326b is connected to the DMAC 328. Under the control of the DMAC 328, the transfer gate 326b brings a conduction state between the bus control unit 121 and the selecting unit 327 either into conduction or out of conduction.

Regarding the transfer gate 326c, one end is connected to the integrated buffer 325 and the other is connected to the selecting unit 327. Moreover, a gate terminal of the transfer gate 326c is connected to the DMAC 328. Under the control of the DMAC 328, the transfer gate 326c brings a conduction state between the integrated buffer 325 and the selecting unit 327 either into conduction or out of conduction.

For establishing connection, the selecting unit 327 selects two out of the B/IF 122, the video encode/decode operation unit 124, the integrated buffer 325, and the selecting unit 326. As shown in FIG. 27C, the selecting unit 327 has a full mesh connection as the internal connection so as to be connected to the selected two.

The example in FIG. 27D shows that the selecting unit 327 is composed of transfer gates 327a, 327b, 327c, and 327d. Using the four transfer gates, the transfer paths are accordingly selected.

Regarding the transfer gate 327a, one end is connected to the B/IF 122 and the other is connected to the integrated buffer 325. Moreover, a gate terminal of the transfer gate 327a is connected to the DMAC 328. Under the control of the DMAC 328, the transfer gate 326a brings a conduction state between the B/IF 122 and the integrated buffer 325 either into conduction or out of conduction.

Regarding the transfer gate 327b, one end is connected to the B/IF 122 and the other is connected to the selecting unit 326. Moreover, a gate terminal of the transfer gate 327b is connected to the DMAC 328. Under the control of the DMAC 328, the transfer gate 327b brings a conduction state between the B/IF 122 and the selecting unit 326 either into conduction or out of conduction.

Regarding the transfer gate 327c, one end is connected to the video encode/decode operation unit 124 and the other is connected to the selecting unit 326. Moreover, a gate terminal of the transfer gate 327c is connected to the DMAC 328. Under the control of the DMAC 328, the transfer gate 327c brings a conduction state between the video encode/decode operation unit 124 and the selecting unit 326 into conduction or out of conduction.

Regarding the transfer gate 327*d*, one end is connected to the video encode/decode operation unit 124 and the other is connected to the integrated buffer 325. Moreover, a gate terminal of the transfer gate 327*d* is connected to the DMAC 328. Under the control of the DMAC 328, the transfer gate 327*d* brings a conduction state between the video encode/decode operation unit 124 and the integrated buffer 325 into conduction or out of conduction.

Next, an explanation is given as to connection modes determined by the selecting units 326 and 327. FIGS. 28 to 30 are rough schemas showing connection modes among the bus control unit 121, the B/IF 122, the video encode/decode operation unit 124, and the integrated buffer 325.

Figure 28A:
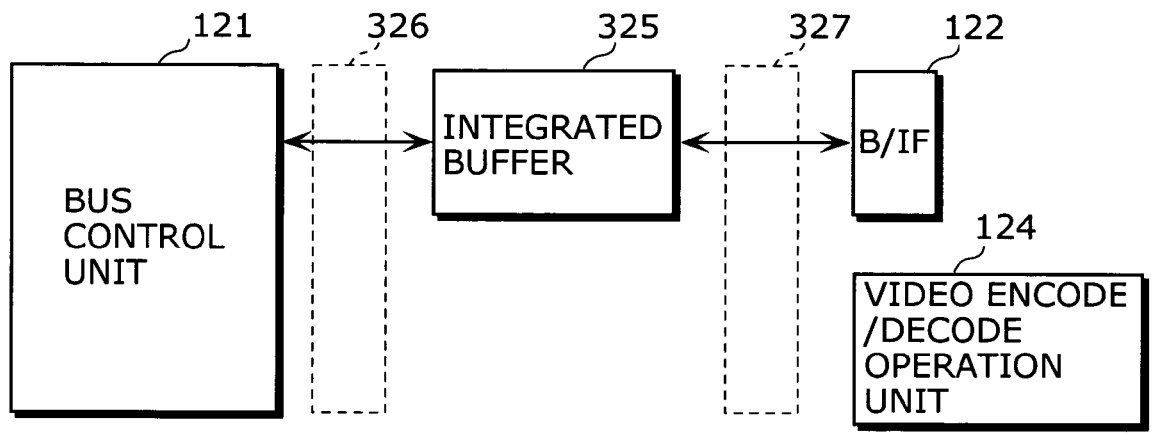
FIG. 28 is a first rough schema showing a connection state among the bus control unit, the B/IF, the video encode/decode operation unit, and an integrated buffer.

In a case where the bitstream is transferred between the main memory 11 and the encoded-video recorder 13, the DMAC 328 controls the selecting units 326 and 327 so as to connect the bus control unit 121 to the integrated buffer 325, and connect the B/IF 122 to the integrated buffer 325, as shown in FIG. 28A. This mode is referred to as the connection mode 1.

Figure 28B:
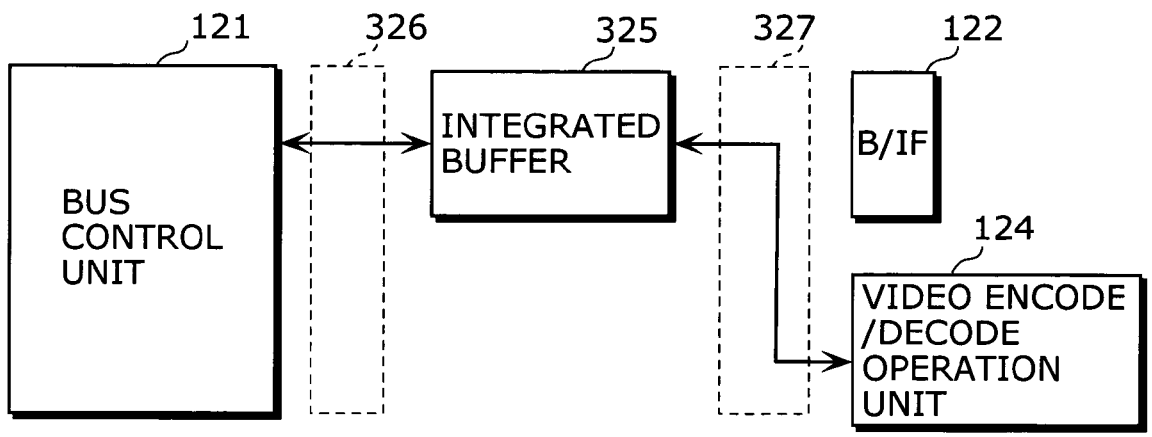

In a case where the bitstream is transferred between the main memory 11 and the video encode/decode operation unit 124, the DMAC 328 controls the selecting units 326 and 327 so as to connect the bus control unit 121 to the integrated buffer 325, and connect the video encode/decode operation unit 124 to the integrated buffer 325, as shown in FIG. 28B. This mode is referred to as the connection mode 2.

Figure 29A:
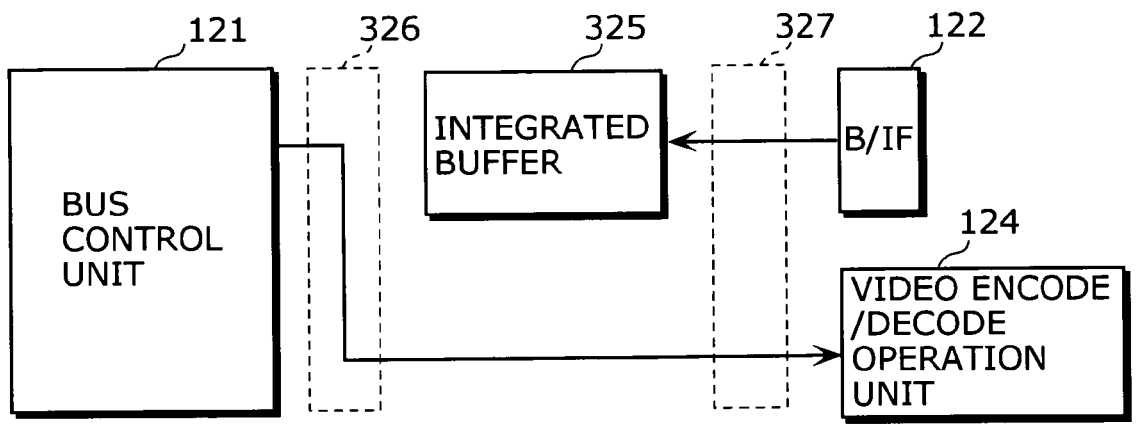
FIG. 29 is a second rough schema showing a connection state among the bus control unit, the B/IF, the video encode/decode operation unit, and the integrated buffer.

In a case where the decoding operation is performed when: the VBV buffer 11*b* is not null; the OP area of the integrated buffer 325 is null; and the IO area of the integrated buffer 325 is not full, the DMAC 328 controls the selecting units 326 and 327 so as to connect the bus control unit 121 to the video encode/decode operation unit 124, and connect the B/IF 122 to the integrated buffer 325, as shown in FIG. 29A. This mode is referred to as the connection mode 3. In the present case of the connection mode 3, the bitstream read from the encoded-video recorder 13 is written into the IO area of the integrated buffer 325 and, at the same time, the bitstream read from the VBV buffer 11*b* is inputted to the video encode/decode operation unit 124.

Figure 29B:
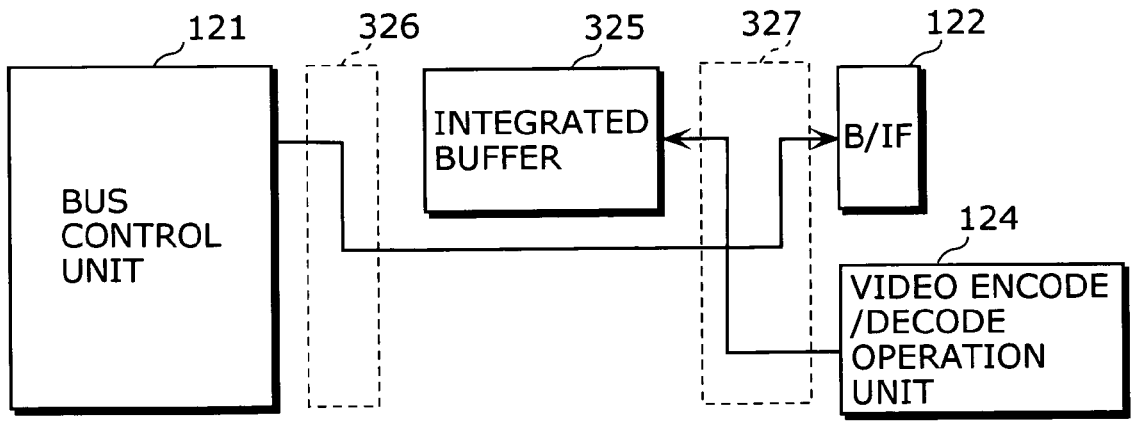

In a case where the encoding operation is performed when: the VBV buffer 11*b* is not null; the IO area of the integrated buffer 325 is null; and the OP area of the integrated buffer 325 is not full, the DMAC 328 controls the selecting units 326 and 327 so as to connect the bus control unit 121 to the B/IF 122, and connect the video encode/decode operation unit 124 to the integrated buffer 325, as shown in FIG. 29B. This mode is referred to as the connection mode 4. In the present case of the connection mode 4, the bitstream outputted from the video encode/decode operation unit 124 is written into the OP area of the integrated buffer 325 and, at the same time, the bitstream read from the VBV buffer 11*b* is written into the encoded-video recorder 13.

Figure 30A:
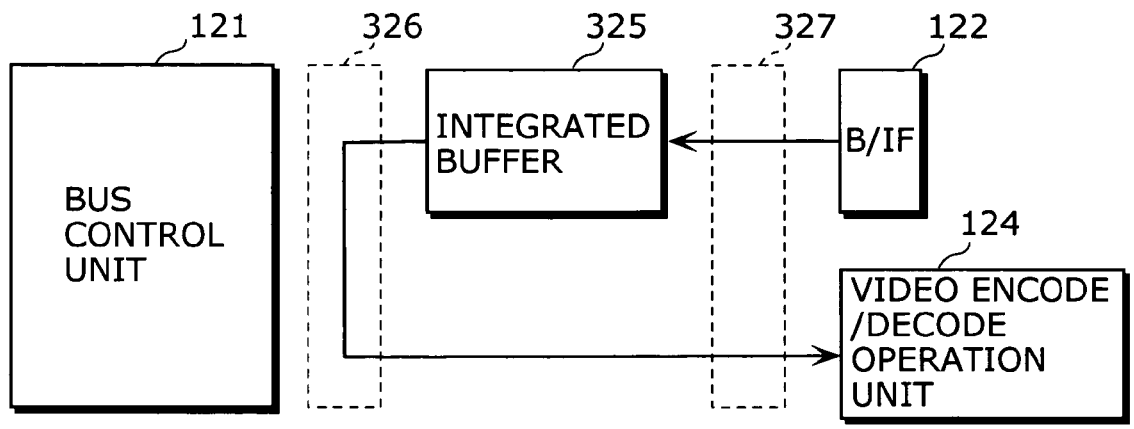
FIG. 30 is a third rough schema showing a connection state among the bus control unit, the B/IF, the video encode/decode operation unit, and the integrated buffer.

When the decoding operation is performed in the following cases (5-1) and (5-2), the DMAC 328 controls the selecting units 326 and 327 so as to connect the B/IF 122 to the integrated buffer 325, and connect the video encode/decode operation unit 124 to the integrated buffer 325, as shown in FIG. 30A. This mode is referred to as the connection mode 5.

(5-1) The VBV buffer 11*b* is null; the IO area of the integrated buffer 325 is null; and the OP area of the integrated buffer 325 is not full. In this case, the bitstream read from the encoded-video recorder 13 is written not into the IO area but directly into the OP area of the integrated buffer 325 and, at the same time, the bitstream read from the OP area is written into the video encode/decode operation unit 124.

(5-2) The VBV buffer 11*b* is null; and the IO area of the integrated buffer 325 is not full. In this case, the bitstream read from the encoded-video recorder 13 is written into the IO area of the integrated buffer 325 and, at the same time, the bitstream read from the OP area of the integrated buffer 325 is written into the video encode/decode operation unit 124.

Figure 30B:
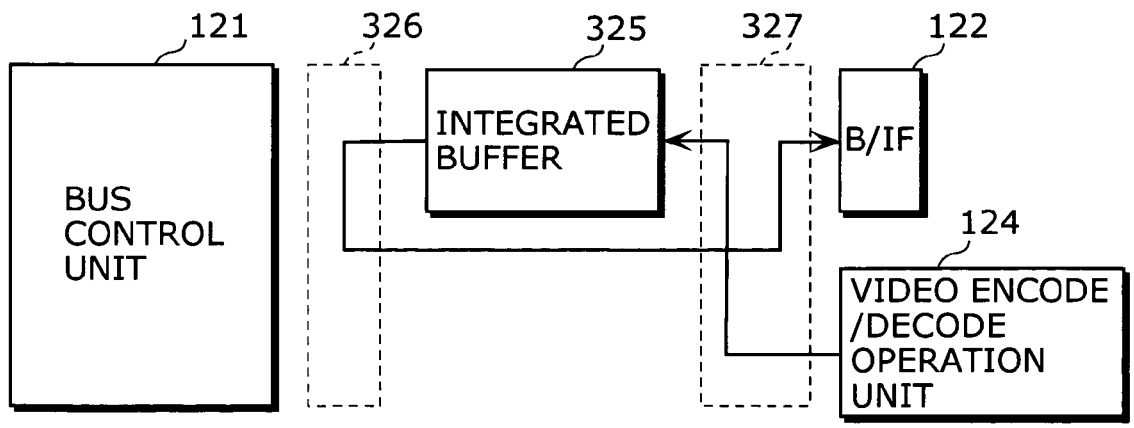

When the encoding operation is performed in the following cases (6-1) and (6-2), the DMAC 328 controls the selecting units 326 and 327 so as to connect the B/IF 122 to the integrated buffer 325, and connect the video encode/decode operation unit 124 to the integrated buffer 325, as shown in FIG. 30B. This mode is referred to as the connection mode 6.

(6-1) The VBV buffer 11*b* is null; the OP area of the integrated buffer 325 is null; and the IO area of the integrated buffer 325 is not full. In this case, the bitstream read from the video encode/decode operation unit 124 is written not into the OP area but directly into the IO area of the integrated buffer 325 and, at the same time, the bitstream read from the IO area is written into the encoded-video recorder 13.

(6-2) The VBV buffer 11*b* is null; and the OP area of the integrated buffer 325 is not full. In this case, the bitstream outputted from the video encode/decode operation unit 124 is written into the OP area of the integrated buffer 325 and, at the same time, the bitstream read from the 10 area of the integrated buffer 325 is written into the encoded-video recorder 13.

For the sake of simplicity, the DMAC 28 sets the mode to either the connection mode 1 or the connection mode 2 for the bitstream transfer in the description below. As should be understood, the DMAC 328 may set the mode to either the connection mode 3 or the connection mode 5. Also, when the encoding operation is performed, the DMAC 328 may set the mode to either the connection mode 4 or the connection mode 6 for the video signal transfer. However, due to the limit to the number of ports provided for the integrated buffer 325, the DMAC 328 cannot set the connection modes as described in the following (a) and (b).

(a) The integrated buffer 325 cannot be simultaneously connected to the bus control unit 121, the B/IF 122, and the video encode/decode operation unit 124.

(b) The IO and OP areas of the integrated buffer 325 cannot be simultaneously connected to the bus control unit 121.

Note that, as to the case of (b), since there is only one route to access the main memory 11 anyway, it does not lead up to degradation in performance even though the bus control unit 121 cannot be simultaneously connected to both the IO and OP areas.

Next, an explanation is given as to an operation performed by the video codec 302 constructed as described so far. In the present embodiment, the following cases (a) and (b) are mainly explained.

(a) The bitstream read from the encoded-video recorder 13 via the B/IF 122 is decoded into the video signal by the video encode/decode operation unit 124. Then, the video signal obtained through the decoding operation is outputted to the video I/O unit 14 via the P/IF 123. This process flow will be referred to simply as the "decoding operation".

(b) The video signal inputted from the video I/O unit 14 via the P/IF 123 is encoded into the bitstream by the video encode/decode operation unit 124. Then, the bitstream obtained through the encoding operation is written into the encoded-video recorder 13 via the B/IF 122. This process flow will be referred to simply as the "encoding operation".

FIG. 31 is a flowchart showing the decoding operation performed by the video codec 302 of the third embodiment.

As shown by the flowchart, the DMAC 328 executes one of the following (a) to (d) in accordance with a logic table 340 (see FIG. 32) (step S311).

(a) The DMAC 328 controls the B/IF 122 to directly write the bitstream read from the encoded-video recorder 13 into the OP area (step S312).

(b) The DMAC 328 controls the B/IF 122 to write the bitstream read from the encoded-video recorder 13 into the IO area (step S313), then to write the bitstream read from the IO area into the OP area (step S314).

(c) The DMAC 328 controls the B/IF 122 to write the bitstream read from the encoded-video recorder 13 into the IO area (step S315), then to write the bitstream read from the IO area into the OP area (step S316). Moreover, the DMAC 328 controls the bus control unit 121 to write the bitstream read from the IO area into the VBV buffer 11b (step S317).

(d) The DMAC 328 controls the B/IF 122 to write the bitstream read from the encoded-video recorder 13 into the IO area (step S318), then controls the bus control unit 121 to write the bitstream read from the IO area into the VBV buffer 11b (step S319). Moreover, the DMAC 328 controls the bus control unit 121 to write the bitstream read from the VBV buffer 1b into the OP area (step S320).

Then, using the video encode/decode operation unit 124, the DMAC 328 decodes the bitstream read from the OP area into the video signal (step S14). The DMAC 328 controls the bus control unit 121 to write the video signal obtained through the decoding operation performed by the video encode/decode operation unit 124 into the frame memory 11a (step S15). The DMAC 328 further controls the bus control unit 121 to write the video signal read from the frame memory 11a into the video data buffer 127 (step S16), and controls the P/IF 123 to output the video signal read from the video data buffer 127 to the video I/O unit 14 (step S17).

FIG. 32 shows the logic table 340 related to the state transition in a case where the video codec 302 of the third embodiment performs the decoding operation. The logic table 340 shows a state in a column 341, a hold state of the VBV buffer 11b in a column 342, a hold state of the OP area in a column 343, a hold state of the IO area in a column 344, a transfer path from the B/IF 122 to video encode/decode operation unit 124 in a column 345, transition of the pointers of the IO area in a column 346, transition of the pointers of the VBV buffer 11b in a column 347, and transition of the pointers of the OP area in a column 348.

Figure 33:
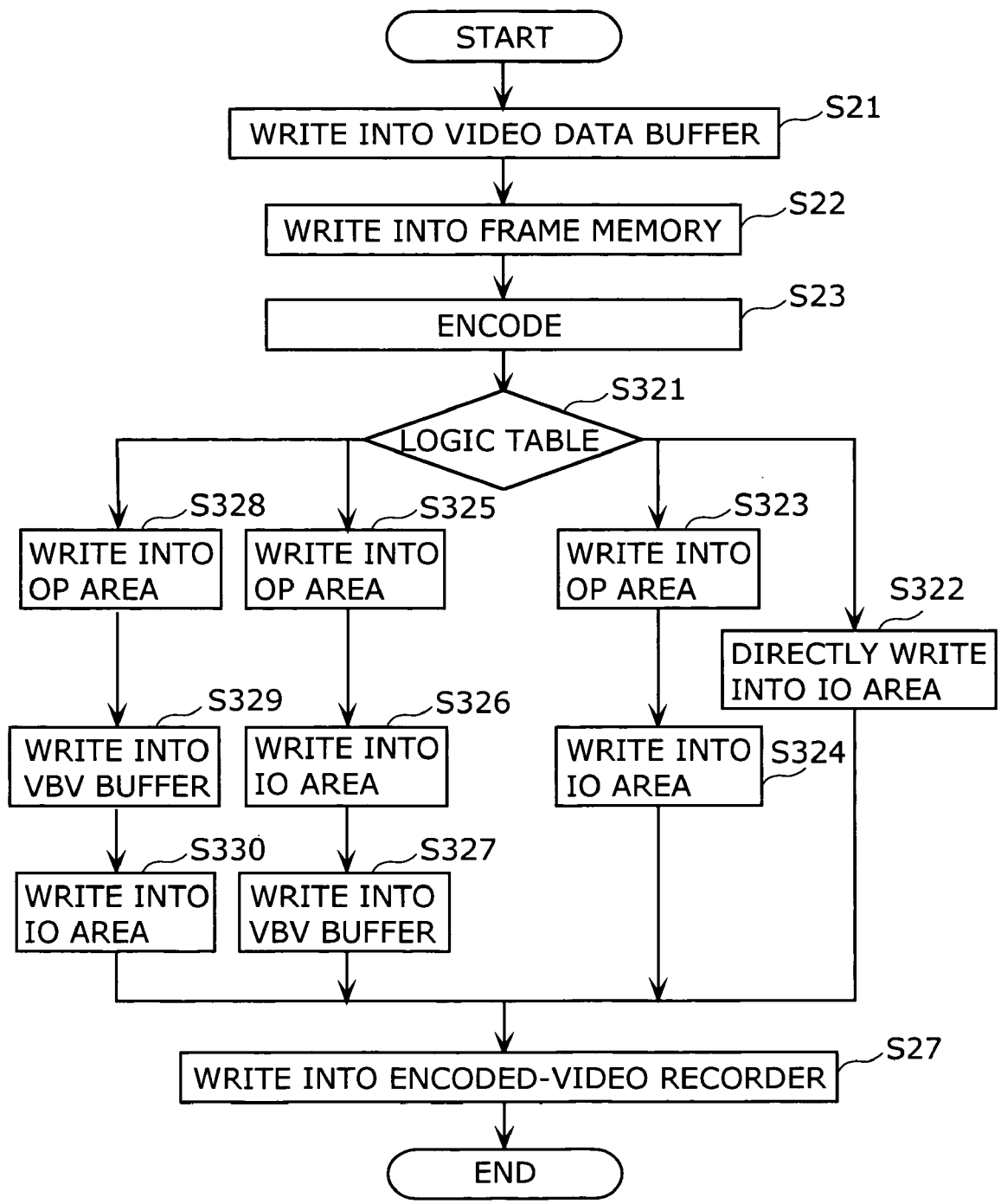
FIG. 33 is a flowchart showing the encoding operation performed by the video codec of the third embodiment.

FIG. 33 is a flowchart showing the encoding operation performed by the video codec 302 of the third embodiment.

As shown in this figure, the DMAC 328 controls the P/IF 123 to write the video signal inputted from the video I/O unit 14 into the video data buffer 127 (step S21). Then, the DMAC 328 controls the bus control unit 121 to write the video signal read from the video data buffer 127 into the frame memory 11a (step S22). The DMAC 328 further controls the bus control unit 121 to have the video encode/decode operation unit 124 encode the video signal read from the frame memory 11a into the bitstream (step S23). After this, the DMAC 328 executes one of the following (a) to (d) in accordance with a logic table 350 (see FIG. 34) (step S321).

(a) The DMAC 328 directly writes the bitstream encoded from the video signal by the video encode/decode operation unit 124 into the IO area (step S322).

(b) The DMAC 328 writes the bitstream encoded from the video signal by the video encode/decode operation unit 124 into the OP area (step S323), then writes the bitstream read from the OP area into the IO area (step S324).

(c) The DMAC 328 writes the bitstream encoded from the video signal by the video encode/decode operation unit 124 into the OP area (step S325), then writes the bitstream read from the OP area into the IO area (step S326). Moreover, the DMAC 328 controls the bus control unit 121 to write the bitstream read from the OP area into the VBV buffer 11b (step S327).

(d) The DMAC 328 writes the bitstream encoded from the video signal by the video encode/decode operation unit 124 into the OP area (step S328), then controls the bus control unit 121 to write the bitstream read from the OP area into the VBV buffer 11b (step S329). Moreover, the DMAC 328 controls the bus control unit 121 to write the bitstream read from the VBV buffer 11b into the IO area (step S330).

After this, the DMAC 328 controls the B/IF 122 to write the bitstream read from the IO area into the encoded-video recorder 13 (step S27).

FIG. 34 shows the logic table 350 related to the state transition in a case where the video codec 302 of the third embodiment performs the encoding operation. The logic table 350 shows a state in a column 351, a hold state of the VBV buffer 11b in a column 342, a hold state of the IO area in a column 353, a hold state of the OP area in a column 354, a transfer path from the video encode/decode operation unit 124 to the B/IF 122 in a column 355, transition of the pointers of the OP area in a column 356, transition of the pointers of the VBV buffer 11b in a column 357, and transition of the pointers of the IO area in a column 358.

The following describes an example of an operation performed by the video codec 302 of the third embodiment. As can be understood by comparison between the logic tables 340 and 350, the transfer path taken in the encoding operation is the reverse of the transfer path taken in the decoding operation. For the sake of simplicity, an explanation is given only as to the case of the decoding operation and the case of the encoding operation is omitted. Also note that states D3 to D6 are the same as the states D3 to D6 described in the first embodiment (see FIG. 8), therefore the explanation is omitted.

Figure 35:
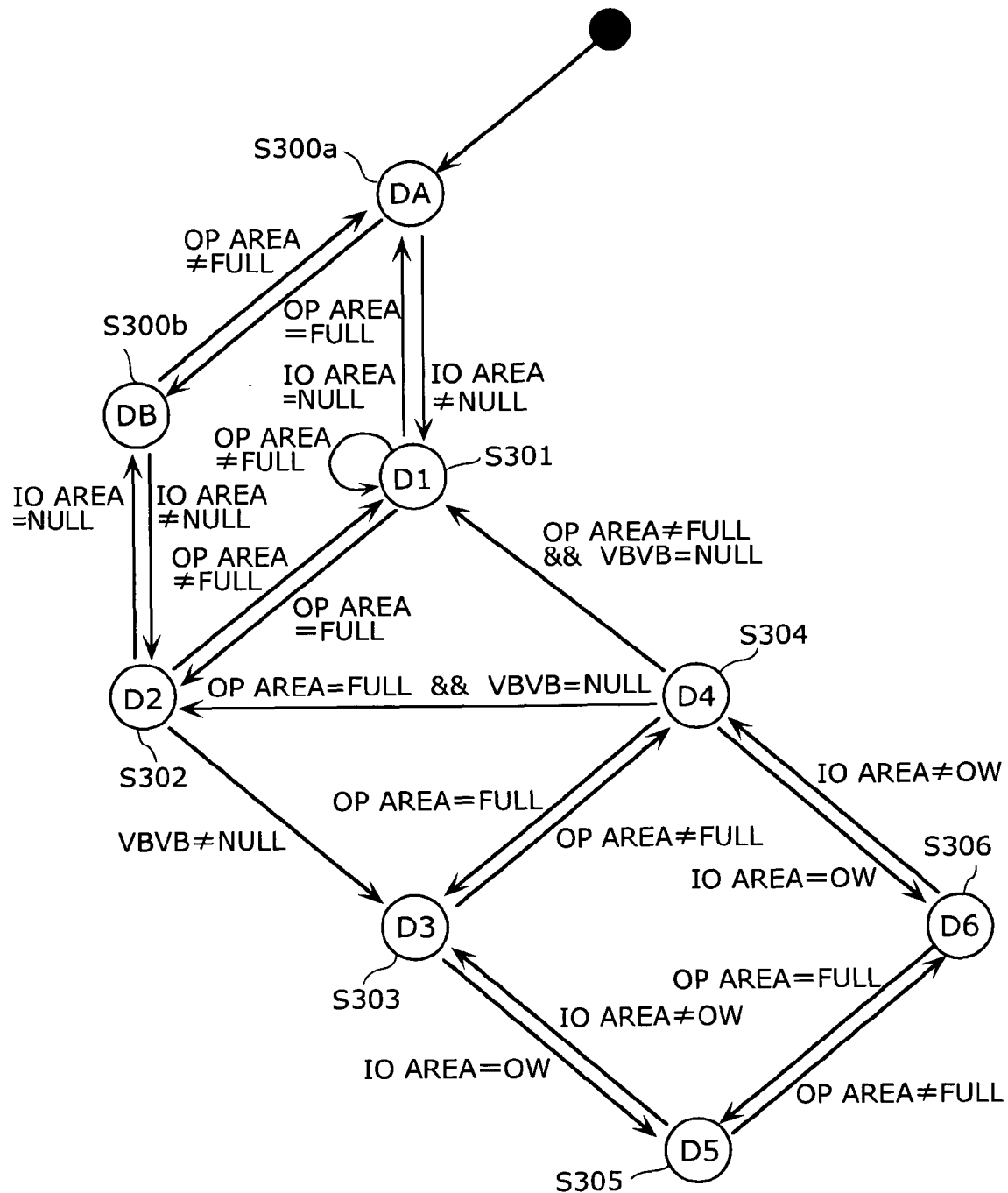
FIG. 35 is a state machine diagram showing the state transition in a case where the video codec of the third embodiment performs the decoding operation.

FIG. 35 is a state machine diagram showing the state transition in a case where the video codec 302 of the third embodiment performs the decoding operation.

First, a transition takes place from an initial state to a state DA, as shown in this diagram. In the state DA, if the OP area is full, i.e., OP area=FULL, the state goes to a state DB. If the IO area is not null, i.e., IO area≠NULL, the state goes to a state D1.

In the state DB, if the OP area is not null, i.e., OP area≠NULL, the state goes to the state DA. If the IO area is not null, i.e., IO area≠NULL, the state goes to the state D2.

In the state D1, if the IO area is null, i.e., IO area=NULL, the state goes to the state DA. If the OP area is full, i.e., OP area=FULL, the state goes to the state D2.

In the state D2, if the IO area is null, i.e., IO area=NULL, the state goes to the state DB. If the OP area is not full, i.e., OP area≠FULL, the state goes to the state D1.

FIGS. 36 to 39 are rough schemas showing address transitions of the integrated buffer 325 and the VBV buffer 11b in the states DA and DB.

Note that rectangular boxes drawn in a thick line represent the buffers 325 and 11b in these figures. In the integrated buffer 325, an area from IO_LB to IO_UB is the IO area, and an area from OP_LB to OP_UB is the OP area. Also note that, in this figure, black triangles drawn outside the buffers indicate the write pointers, which are VBV_WP, IO_WP, and OP_WP, and that white triangles indicate the readout pointers, which are VBV_RP, IO_RP, and OP_RP.

As to the IO area shown in the figures, each white triangle with a numeric character "1" inside indicates a first readout pointer, which is IO_RP1, and each white triangle with a numeric character "2" inside indicates a second readout pointer, which is IO_RP2. A black arrow indicates that the data has been written while a white arrow indicates that the data has been read out.

Regarding the states D1 to D6, the address transitions are the same as in the first embodiment (see FIGS. 9 to 24) if the IO buffer 125 is replaced by the IO area and that the OP buffer 126 is replaced by the OP area. Therefore, the explanation as to these states is omitted.

Figure 37:
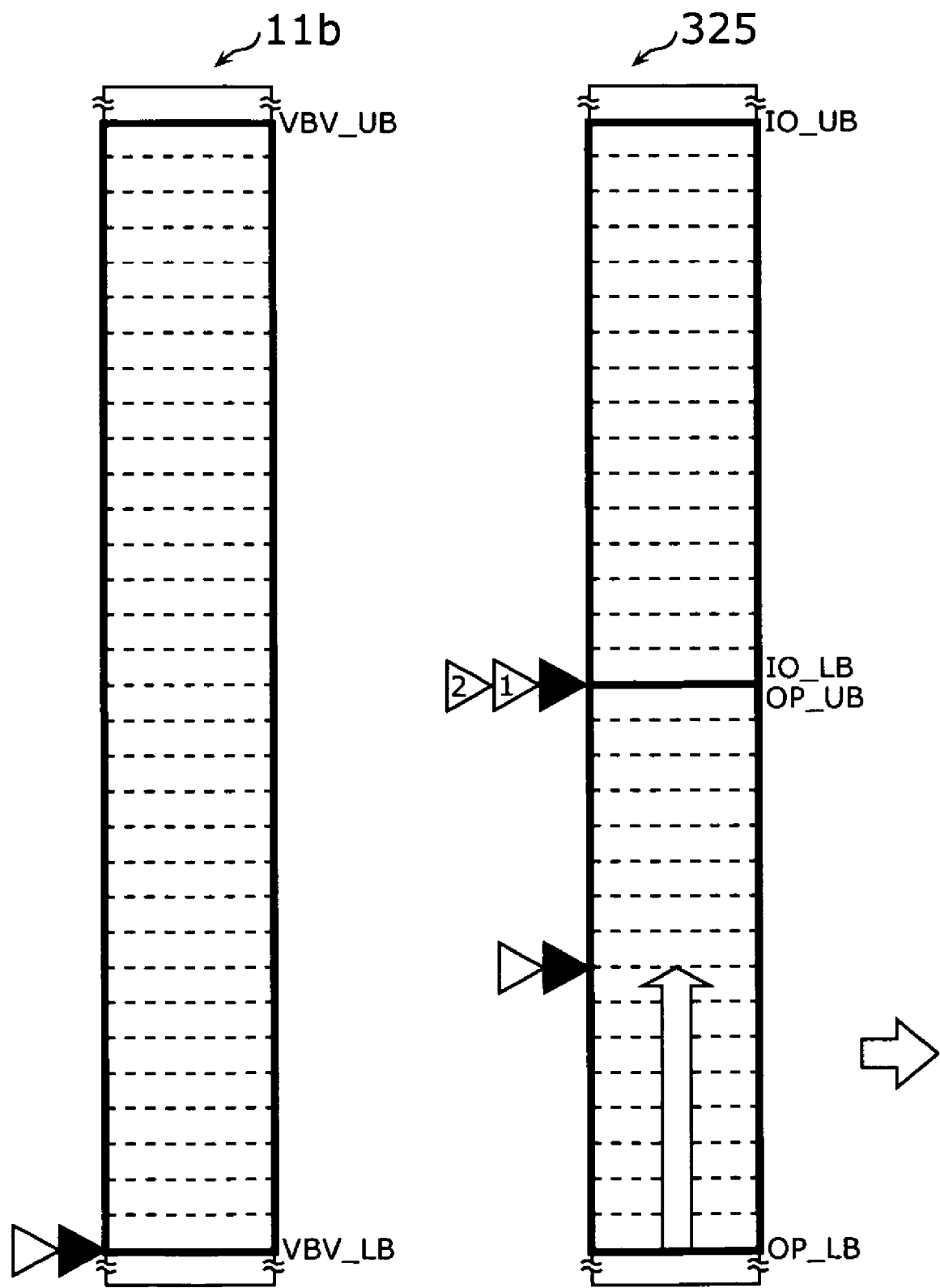
FIG. 37 is a second rough schema showing address transitions of the integrated buffer and the VBV buffer in the state DA.

As shown in FIGS. 36 and 37: the IO area is null; the OP area is not full; and the VBV buffer 11b is null (see FIG. 36A) in the state DA (see FIGS. 32 and 35). Thus, the DMAC 328 controls the B/IF 122 to directly write the bitstream read from the encoded-video recorder 13 into the OP area. Following this, the integrated buffer 325 advances OP_WP by the size of the bitstream written into the OP area (see FIG. 36B).

Moreover, the DMAC 328 controls the video encode/decode operation unit 124 to read the bitstream from the OP area. Following this, the integrated buffer 325 advances OP_RP by the size of the bitstream read from the OP area (see FIG. 37).

As shown in FIGS. 38 and 39: the IO area is null; the OP area is full; and the VBV buffer 11b is null (see FIG. 38A) in the state DB (see FIGS. 32 and 35). Thus, the DMAC 328 controls the B/IF 122 to write the bitstream read from the encoded-video recorder 13 into the IO area. Following this, the integrated buffer 325 advances IO_WP by the size of the bitstream written into the IO area (see FIG. 38B).

Moreover, the DMAC 328 controls the video encode/decode operation unit 124 to read the bitstream from the OP area. Following this, the integrated buffer 325 advances OP_RP by the size of the bitstream read from the OP area (see FIG. 39A).

The DMAC 328 then writes the bitstream read from the IO area into the OP area. Following this, the IO area advances IO_RP1 and IO_RP2 by the size of the read bitstream, and the OP area also advances OP_WP by the size of the written bitstream (see FIG. 39B).

According to the video codec 302 of the third embodiment as described so far, in the connection modes 1 and 2 (see FIGS. 28A and 28B), the bitstream transfers cannot be executed simultaneously: between the main memory 11 and the encoded-video recorder 13; and between the main memory 11 and the video encode/decode operation unit 124. However, the frequency with which the main memory 11 is accessed is not high in the case of a bitstream transfer. Therefore, the limit to the access to the main memory 11 does not lead up to degradation in performance. Besides, it is possible that the bus control unit 121 may be provided with a function of monitoring free space which is caused by the bus access to the main memory 11 and of supplying a bitstream to the integrated buffer 325 in a free cycle. With this function, the bitstream can be read ahead before being requested. Meanwhile, in the connection modes 3 and 4 (see FIGS. 29A and 29B, if the VBV buffer 11b is null, the main memory 11 is not accessed. Consequently, the bottleneck in the bus access to the main memory 11 can be eliminated.

Modifications

As to the first embodiment, the description may be read by replacing the bitstream with the video signal and replacing the frame memory 11a with the VBV buffer 11b. In addition to these replacements, the video codec system 100 of the first embodiment may have the construction including the video I/O unit 14 in place of the encoded-video recorder 13, the P/IF 123 in place of the B/IF 122, and the video data buffer 127 in place of the IO buffer 125. With this construction, as in the case of the relation between the IO buffer 125 and the OP buffer 126 in the first embodiment, the video data buffer 127 and the OP buffer 126 may be connected to each other so that the video signal are directly transferred between them. Moreover, without access to the main memory 11, the video signal may be transferred between the P/IF 123 and the video encode/decode operation unit 124. Here, the video signal inputted into or outputted from the video encode/decode operation unit 124 is stored into the OP buffer 126.

As to the second embodiment, the description may be read by replacing the bitstream with the video signal and replacing the frame memory 11a with the VBV buffer 11b. In addition to these replacements, the video codec system 200 of the second embodiment may have the construction including the video I/O unit 14 in place of the encoded-video recorder 13, the P/IF 123 in place of the B/IF 122, and the video data buffer 127 in place of the IO buffer 125. With this construction, the DMAC 228 performs as in the case of the stated second embodiment. To be more specific, when the encoding operation is performed, the DMAC 228 detects the transfer request signal asserted from the video encode/decode operation unit 124 to the OP buffer 126 on the line connecting the unit 124 and the buffer 126. If detecting the transfer request signal when the OP buffer 126 is full, the DMAC 228 predicts that the OP buffer 126 will have free space in a next cycle. When the decoding operation is performed, the DMAC 228 detects the transfer request signal asserted from the P/IF 123 to the video data buffer 127 on the line connecting the two. If detecting the transfer request signal when the video data buffer 127 is full, the DMAC 228 predicts that the video data buffer 127 will have free space in a next cycle.

As to the third embodiment, the description may be read by replacing the bitstream with the video signal and replacing the frame memory 11a with the VBV buffer 11b. In addition to these replacements, the video codec system 300 of the third embodiment may have the construction including the video I/O unit 14 in place of the encoded-video recorder 13, the P/IF 123 in place of the B/IF 122, and the video data buffer 127 in place of the integrated buffer 325. With this construction, the video data buffer 127 may be treated as a buffer which is logically divided into two areas as is the case with the integrated buffer 325. Then, without access to the main memory 11, the video signal may be transferred between the P/IF 123 and the video encode/decode operation unit 124. Here, the video signal inputted into or outputted from the video encode/decode operation unit 124 is stored into the video data buffer 127.

It should be noted that the main memory 11 may be integrated into the system LSI together with the video codec.

Also note that the present invention is not limited to a video codec, and can be applied to other kinds of apparatuses such as an encrypting/decrypting apparatus, an encoding/decoding apparatus, and a signal converting apparatus. Here, the encrypting/decrypting apparatus is provided with an encrypting/decrypting unit, in place of the video encode/decode operation unit, that encrypts plain text and decrypts encrypted text. The encoding/decoding apparatus is provided with an encoding/decoding unit, in place of the video encode/decode operation unit, that encodes first kind of data into second kind of data and decodes the second kind of data into the first kind of data. The signal converting apparatus is provided with a signal converting unit, in place of the video encode/decode operation unit, that converts a parallel signal into a serial signal and vice versa.

The video codec of each embodiment described above may be realized by a full-custom LSI, or a semi-custom LSI such as an ASIC (Application Specific Integrated Circuit). Alternatively, the video codec may be realized by a programmable logic device such as an FPGA or a CPLD. Also, it may be realized by a dynamic reconfigurable device whose circuit construction is dynamically rewritable.

Moreover, design data that forms one or more functions making up the video codec on the LSI may be a program described in a hardware description language, such as VHDL (Very high speed integrated circuit Hardware Description Language), Verilog-HDL, or System C. The program is referred to as the HDL program hereafter. Also, the design data may be a gate-level netlist obtained by logically synthesizing the HDL program, or may be microcell information that is formed by adding layout information, process conditions, etc. to the gate-level netlist. Alternatively, the design data may be mask data in which dimension, timing, etc. are defined.

Furthermore, the design data may be recorded into a computer-readable recording medium so as to be read by a computer system or a hardware system such as an embedded system. The recording medium may be an optical recording medium such as a CD-ROM, a magnetic recording medium such as a hard disk, a magneto-optical recording medium such as an MO, or a semiconductor memory such as a RAM. In addition, the design data read by another hardware system from such a recording medium may be downloaded to a programmable logic device via a download cable.

Moreover, the design data may be held in a hardware system located on a transmission line so that another hardware system can obtain the data via the transmission line such as a network. The design data transmitted from the hardware system to the other hardware system via the transmission line may be downloaded to a programmable logic device via a download cable.

Furthermore, the design data on which logic synthesis, layout, and wiring has been done may be recorded on a serial ROM so as to be transferred to an FPGA upon energization. The design data recorded into the serial ROM may be directly downloaded to the FPGA upon energization.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention can be used as a system LSI which performs high-speed data transfer, and in particular as a system LSI which performs the high-speed data transfer when an apparatus including such a system LSI, such as a digital television, a digital video camera, a digital video recorder, or a mobile telephone, decodes a bitstream or encodes a video signal.

What is claimed is:

1. A data converting apparatus, comprising:
   a converting unit configured to convert a first type data into a second type data, the second type data being different from the first type data;
   a storing unit configured to store the first type data transferred from an external apparatus; and
   a control unit configured to determine one of a first path going through a main memory and a second path bypassing the main memory as a transfer path, and configured to have the first type data, which is stored in the storing unit, inputted into the converting unit via the determined transfer path,
   wherein the converting unit is one of a video codec, an encrypting unit, a decrypting unit, and a signal converter, and
   the storing unit includes:
   a first buffer into which the first type data transferred from the external apparatus is stored according to a first-in first-out method; and
   a second buffer into which the first type data received by the converting unit is stored according to the first-in first-out method, and
   the control unit is configured to determine the transfer path in accordance with whether or not the second buffer is full and whether or not a third buffer in the main memory is empty.

2. The data converting apparatus according to claim 1, wherein the first buffer is managed using first, second, and third pointers,
   the first pointer being used for managing the first type data written into the first buffer,
   the second pointer being used for managing the first type data that is read from the first buffer and written into the second buffer, and
   the third pointer being used for managing the first type data read from the first buffer.

3. The data converting apparatus according to claim 2, wherein when the first pointer has not yet passed the second pointer and the second buffer is not full, the control unit is configured to determine the second path as the transfer path and configured to have the first type data, which is read from the first buffer, transferred to the second buffer, and
   when the first pointer has passed the second pointer or the second buffer is full, the control unit is configured to determine the first path as the transfer path, and configured to have the first type data, which is read from the first buffer, transferred to the main memory and have the first type data, which is read from the main memory, stored into the second buffer.

4. The data converting apparatus according to claim 3, wherein after determining the second path as the transfer path and having the first type data, which is read from the first buffer, transferred to the second buffer, the control unit is configured to:
   determine the first path as the transfer path;
   have the first type data, which is read from the first buffer, transferred to the main memory; and
   have the first type data, which is read from the second buffer, inputted into the converting unit.

5. The data converting apparatus according to claim 3, wherein the control unit is configured to:
   predict whether or not the second buffer will not be full by monitoring a data transfer performed between the second buffer and the converting unit;
   determine the first path as the transfer path when judging, based on the prediction, that the second buffer will be full; and
   determine the second path as the transfer path when judging, based on the prediction, that the second buffer will not be full.

6. The data converting apparatus according to claim 1, wherein the first type data is a bitstream,
   the second type data is a video signal, and
   the converting unit is configured to decode the bitstream into the video signal.

7. The data converting apparatus according to claim 1,
wherein the first type data is a video signal,
the second type data is a bitstream, and
the converting unit is configured to encode the video signal into the bitstream.

8. A data converting apparatus comprising:
a converting unit configured to convert a first type data into a second type data, the second type data being different from the first type data;
a storing unit configured to store the first type data transferred from an external apparatus; and
a control unit configured to determine one of a first path going through a main memory and a second path bypassing the main memory as a transfer path, and configured to have the first type data, which is stored in the storing unit, inputted into the converting unit via the determined transfer path,
wherein the converting unit is one of a video codec, an encrypting unit, a decrypting unit, and a signal converter, and
the storing unit is a buffer that is logically divided into:
a first area into which the first type data transferred from the external apparatus is stored according to a first-in first-out method; and
a second area into which the first type data to be inputted into the converting unit is stored according to the first-in first-out method, and
the control unit is operable to determine the transfer path in accordance with whether or not the second area is full and whether or not a third buffer in the main memory is empty.

9. The data converting apparatus according to claim 8,
wherein the data converting apparatus further comprises:
a first interface which is connected to the external apparatus and configured to perform a data transfer with the external apparatus;
a second interface which is connected to the main memory and configured to perform a data transfer with the main memory;
a first selecting unit which has four ports and is configured to switch respective connection states of the four ports in accordance with control operations of the control unit; and
a second selecting unit which has three ports and is configured to switch respective connection states of the three ports in accordance with control operations of the control unit,
wherein the first selecting unit is connected to the first interface, the converting unit, the storing unit, and the second selecting unit respectively via the four ports,
the second selecting unit is connected to the second interface, the storing unit, and the first selecting unit respectively via the three ports, and
the control unit is configured to determine one of the first path and the second path as the transfer path by controlling the first selecting unit and the second selecting unit.

10. The data converting apparatus according to claim 9,
wherein the control unit is configured to:
connect the first interface to the storing unit via the first selecting unit when having the first type data, which is transferred from the external apparatus, stored into the storing unit;
connect the storing unit to the second interface via the second selecting unit when having the first type data, which is read from the storing unit, transferred to the main memory;
connect the second interface to the storing unit via the second selecting unit when having the first type data, which is read from the main memory, stored into the storing unit; and
connect the storing unit to the converting unit via the first selecting unit when having the first type data, which is read from the storing unit, inputted into the converting unit.

11. The data converting apparatus according to claim 10,
wherein the first area is a ring area that is managed using first, second, and third pointers,
the first pointer being used for managing the first type data written into the first area,
the second pointer being used for managing the first type data that is read from the first area and written into the second area, and
the third pointer being used for managing the first type data read from the first area,
wherein when the first pointer has not yet passed the second pointer and the second area is not full, the control unit is configured to determine the second path as the transfer path and to have:
the first type data, which is read from the external apparatus, stored into the first area;
the first type data, which is stored in the first area, transferred to the second area; and
the first type data, which is read from the second area, inputted into the converting unit.

12. The data converting apparatus according to claim 11,
wherein after determining the second path as the transfer path and having the first type data, which is stored in the first area, transferred to the second area, the control unit is configured to:
determine the first path as the transfer path;
have the first type data, which is read from the first area, transferred to the main memory; and
have the first type data, which is read from the second area, inputted into the converting unit.

13. The data converting apparatus according to claim 10,
wherein the first area is a ring area that is managed using first, second, and third pointers,
the first pointer being used for managing the first type data written into the first area,
the second pointer being used for managing the first type data that is read from the first area and written into the second area, and
the third pointer being used for managing the first type data read from the first area,
wherein when the first area is full or the second area is full and when the first pointer has passed the second pointer, the control unit is configured to determine the first path as the transfer path and to have:
the first type data, which is transferred from the external apparatus, stored into the first area;
the first type data, which is read from the first area, transferred to the main memory;
the first type data, which is read from the second area, inputted into the converting unit; and
the first type data, which is read from the main memory, stored into the second area.

14. The data converting apparatus according to claim 13,
wherein when the second area is not full, the control unit is configured to:
have the first type data, which is transferred from the external apparatus, stored into the first area, then have the first type data, which is read from the first area, transferred to the main memory, and have the first type data, which is read from the main memory, stored into the second area, then have the first type data, which is read from the second area, inputted into the converting unit.

15. The data converting apparatus according to claim 10, wherein when the first type data which has not been transferred to the second area does not exist in the main memory, and the first area is not full, and said second area is not full, the control unit is configured to:

determine the second path as the transfer path;

have the first type data, which is transferred from the external apparatus, stored into the second area; and have the first type data, which is read from the second area, inputted into the converting unit, and when the first type data which has not been transferred to the second area does not exist in the main memory, the first area is not full and the second area is full, the control unit is configured to:

determine the second path as the transfer path;

have the first type data, which is transferred from the external apparatus, stored into the first area;

have the first type data, which is read from the second area, inputted into the converting unit; and have the first type data, which is stored in the first area, transferred to the second area.

16. The data converting apparatus according to claim 10, wherein when having the first type data, which is transferred from the external apparatus, stored into the storing unit while concurrently having the first type data, which is read from the main memory, inputted into the converting unit, the control unit is configured to connect the first interface to the storing unit via the first selecting unit and to connect the second interface to the converting unit via the first and second selecting units, when the first type data which has not been transferred to the second area exists in the main memory and, the second area is not full, and the first area is not full, the control unit is configured to determine the first path as the transfer path and to have the first type data, which is transferred from the external apparatus, stored into the first area while concurrently having the first type data, which is read from the main memory, inputted into the converting unit.

17. The data converting apparatus according to claim 10, wherein when having the first type data, which is transferred from the external apparatus, stored into the storing unit while concurrently having the first type data, which is read from the storing unit, inputted into the converting unit, the control unit is configured to connect the first interface to the storing unit via the first selecting unit and to connect the storing unit to the converting unit via the first and second selecting units, when the first type data which has not been transferred to the second area does not exist in the main memory and the first and second areas area is not full and the second area is not full have free space, the control unit is configured to determine the second path as the transfer path and to have the first type data, which is transferred from the external apparatus, stored into the second area while concurrently having the first type data, which is read from the second area, inputted into the converting unit, and when the first type data which has not been transferred to the second area does not exist in the main memory and the first area has free space is not full, the control unit is configured to determine the second path as the transfer path and to have the first type data, which is transferred from the external apparatus, stored into the first area while concurrently having the first type data, which is read from the second area, inputted into the converting unit.

18. A data converting apparatus comprising:

a converting unit configured to convert a first type data into a second type data, the second type data being different from the first type data;

a storing unit configured to store the second type data outputted from the converting unit; and a control unit configured to determine one of a first path going through a main memory and a second path bypassing the main memory as a transfer path, and configured to have the second type data, which is stored in the storing unit, transferred to an external apparatus via the determined transfer path, wherein the converting unit is one of a video codec, an encrypting unit, a decrypting unit, and a signal converter, and the storing unit includes:

a first buffer into which the second type data to be transferred to the external apparatus is stored according to a first-in first-out method; and a second buffer into which the second type data outputted from the converting unit is stored according to the first-in first-out method, and the control unit is configured to determine the transfer path in accordance with whether or not the second buffer is full and whether or not a third buffer in the main memory is empty.

19. The data converting apparatus according to claim 18, wherein the second buffer is managed using first, second, and third pointers, the first pointer being used for managing the second type data written into the second buffer, the second pointer being used for managing the second type data that is read from the second buffer and written into the first buffer, and the third pointer being used for managing the second type data read from the second buffer.

20. The data converting apparatus according to claim 19, wherein when the first pointer has not yet passed the second pointer and the first buffer is not full, the control unit is configured to determine the second path as the transfer path and to have the second type data, which is read from the second buffer, transferred to the first buffer, when the first pointer has passed the second pointer or the first buffer is full, the control unit is configured to determine the first path as the transfer path, and configured to have the second type data, which is read from the second buffer, transferred to the main memory and have the second type data, which is read from the main memory, stored into the first buffer.

21. The data converting apparatus according to claim 20, wherein after determining the second path as the transfer path and having the second type data, which is read from the second buffer, transferred to the first buffer, the control unit is configured to:

determine the first path as the transfer path;

have the second type data, which is read from the second buffer, transferred to the main memory; and have the second type data, which is read from the first buffer, transferred to the external apparatus.

22. The data converting apparatus according to claim 10, wherein the control unit is configured to:

predict whether the first buffer will not be full by monitoring a data transfer performed between the first buffer and the external apparatus;

determine the first path as the transfer path when judging, based on the prediction, that the first buffer will be full; and determine the second path as the transfer path when judging, based on the prediction, that the first buffer will not be full.

23. The data converting apparatus according to claim 18,
a converting unit configured to convert the first type data into the second type data which is different from the first type data;
a storing unit configured to store the second type data outputted from the converting unit; and
a control unit configured to determine one of a first path going through a main memory and a second path bypassing the main memory as a transfer path, and configured to have the second type data, which is stored in the storing unit, transferred to an external apparatus via the determined transfer path,
wherein the converting unit is one of a video codec, an encrypting unit, a decrypting unit, and a signal converter, and
wherein the storing unit is a buffer that is logically divided into:
a first area into which the second type data to be transferred to the external apparatus is stored according to a first-in first-out method; and
a second area into which the second type data outputted from the converting unit is stored according to the first-in first-out method, and
the control unit is configured to determine the transfer path in accordance with whether or not the first area is full and whether or not a third buffer in the main memory is empty.

24. The data converting apparatus according to claim 23,
wherein the data converting apparatus further comprises:
a first interface which is connected to the external apparatus and configured to perform a data transfer with the external apparatus;
a second interface which is connected to the main memory and configured to perform a data transfer with the main memory;
a first selecting unit which has four ports and is configured to switch respective connection states of the four ports in accordance with control operations of the control unit; and
a second selecting unit which has three ports and is configured to switch respective connection states of the three ports in accordance with control operations of the control unit,
wherein the first selecting unit is connected to the first interface, the converting unit, the storing unit, and the second selecting unit respectively via the four ports,
the second selecting unit is connected to the second interface, the storing unit, and the first selecting unit respectively via the three ports, and
the control unit is configured to determine one of the first path and the second path as the transfer path by controlling the first selecting unit and the second selecting unit.

25. The data converting apparatus according to claim 24,
wherein the control unit is configured to:
connect the first interface to the storing unit via the first selecting unit when having the second type data, which is outputted from the converting unit, stored into the storing unit;

connect the storing unit to the second interface via the second selecting unit when having the second type data, which is read from the storing unit, transferred to the main memory;

connect the second interface to the storing unit via the second selecting unit when having the second type data, which is read from the main memory, stored into the storing unit; and connect the storing unit to the first interface via the first selecting unit when having the second type data, which is read from the storing unit, transferred to the external apparatus.

26. The data converting apparatus according to claim 25,
wherein the second area is a ring area that is managed using first, second, and third pointers,
the first pointer being used for managing the second type data written into the second area,
the second pointer being used for managing the second type data that is read from the second area and written into the first area,
the third pointer being used for managing the second type data read from the second area, and
wherein when the first pointer has not yet passed the second pointer and the first area is not full, the control unit is configured to determine the second path as the transfer path and to have:
the second type data, which is outputted from the converting unit, stored into the second area;
the second type data, which is stored in the second area, transferred to the first area; and
the second type data, which is read from the first area, transferred to the external apparatus.

27. The data converting apparatus according to claim 26,
wherein after determining the second path as the transfer path and having the second type data, which is stored in the second area, transferred to the first area, the control unit is configured to:
determine the first path as the transfer path;
have the second type data, which is read from the second area, transferred to the main memory; and
have the second type data, which is read from the first area, transferred to the external apparatus.

28. The data converting apparatus according to claim 25,
wherein the second area is a ring area that is managed using first, second, and third pointers,
the first pointer being used for managing the second type data written into the second area,
the second pointer being used for managing the second type data that is read from the second area and written into the first area, and
the third pointer being used for managing the second type data read from the second area, and
when said the second area is not empty or the first area is full; and when the first pointer has passed the second pointer, the control unit is configured to determine the first path as the transfer path and to have:
the second type data, which is outputted from the converting unit, stored into the second area;
the second type data, which is read from the second area, transferred to the main memory;
the second type data, which is read from the first area, transferred to the external apparatus; and
the second type data, which is read from the main memory, stored into the first area.

29. The data converting apparatus according to claim 28,
wherein when the first area is not full, the control unit is configured to:

have the second type data, which is outputted from the converting unit, stored into the second area, then have the second type data, which is read from the second area, transferred to the main memory, and have the second type data, which is read from the main memory, stored into the first area, then have the second type data, which is read from the first area, transferred to the external apparatus.

30. The data converting apparatus according to claim 25, wherein when the second type data which has not been transferred to the first area does not exist in the main memory, the second area is not full, and the first space is not full, the control unit is configured to:

determine the second path as the transfer path;

have the second type data, which is outputted from the converting unit, stored into the first area; and have the second type data, which is read from the first area, transferred to the external apparatus, and when the second type data which has not been transferred to the first area does not exist in the main memory, the first area is full, and the second area is not full, the control unit is configured to:

determine the second path as the transfer path;

have the second type data, which is outputted from the converting unit, stored into the second area;

have the second type data, which is read from the first area, transferred to the external apparatus; and have the second type data, which is stored in the second area, transferred to the first area.

31. The data converting apparatus according to claim 25, wherein when having the second type data, which is outputted from the converting unit, stored into the storing unit while concurrently having the second type data, which is read from the main memory, transferred to the external apparatus, the control unit is configured to connect the first interface to the storing unit via the first selecting unit and to connect the second interface to the first interface via the first and second selecting units, when the second type data which has not been transferred to the first area exists in the main memory, the first area is not full, and the second is not full, the control unit is configured to determine the first path as the transfer path and to have the second type data, which is outputted from the converting unit, stored into the second area while concurrently having the second type data, which is read from the main memory, transferred to the external apparatus.

32. The data converting apparatus according to claim 25, wherein when having the second type data, which is outputted from the converting unit, stored into the storing unit while concurrently having the second type data, which is read from the storing unit, inputted into the external apparatus, the control unit is configured to connect the first interface to the storing unit via the first selecting unit and to connect the storing unit to the converting unit via the first and second selecting units, when the second type data which has not been transferred to the first area does not exist in the main memory, the second is not full, and the first space is not full, the control unit is configured to determine the second path as the transfer path and to have the second type data, which is outputted from the converting unit, stored into the first area while concurrently having the second type data, which is read from the first area, transferred to the external apparatus, and when the second type data which has not been transferred to the first area does not exist in the main memory and the second area has free space, is not full, the control unit is configured to determine the second path as the transfer path and to have the second type data, which is outputted from the converting unit, stored into the second area while concurrently having the second type data, which is read from the first area, transferred to the external apparatus.

33. The data converting apparatus according to claim 18, wherein the first type data is a bitstream, the second type data is a video signal, and the converting unit is configured to decode the bitstream into the video signal.

34. The data converting apparatus according to claim 18, wherein the first type data is a video signal, the second type data is a bitstream, and the converting unit is configured to encode the video signal into the bitstream.

35. A method for controlling a data converting apparatus which comprises a converting unit configured to convert a first type data into a second type data, the second type data being different from the first type data, and a storing unit configured to store the first type data transferred from an external apparatus, the storing unit including:

a first buffer into which the first type data transferred from the external apparatus is stored according to a first-in first-out method;

a second buffer into which the first type data to be inputted into the converting unit is stored according to the first-in first-out method, and the converting unit being one of a video codec, an encrypting unit, a decrypting unit, and a signal converter, the method comprising:

one of a first path going through a main memory and a second path bypassing the main memory as a transfer path, and having the first type data, which is stored in the storing unit, inputted into the converting unit via the determined transfer path, wherein, in the determining step, the transfer path is determined in accordance with whether or not the second buffer is full and whether or not a third buffer in the main memory is empty.

36. A method for controlling a data converting apparatus which comprises a converting unit configured to convert a first type data into a second type data, the second type data being different from the first type data, and a storing unit configured to store the second type data outputted from the converting unit, the storing unit including:

a first buffer into which the second type data to be transferred to the external apparatus is stored according to a first-in first-out method; and a second buffer into which the second type data outputted from the converting unit is stored according to the first-in first-out method, the method comprising:

determining one of a first path going through a main memory and a second path bypassing the main memory as a transfer path, and having the second type data, which is stored in the storing unit, transferred to an external apparatus, wherein, in the determining step, the transfer path is determined in accordance with whether or not the first buffer is full and whether or not a third buffer in the main memory is empty.

* * * * *